United States Patent
Ikefuji et al.

(10) Patent No.: US 10,601,258 B2
(45) Date of Patent: Mar. 24, 2020

(54) NON-CONTACT POWER SUPPLY SYSTEM AND POWER TRANSMISSION DEVICE

(71) Applicant: Rohm Co., Ltd., Kyoto (JP)

(72) Inventors: Yoshihiro Ikefuji, Kyoto (JP); Junya Sato, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 124 days.

(21) Appl. No.: 15/804,611

(22) Filed: Nov. 6, 2017

(65) Prior Publication Data
US 2018/0138757 A1 May 17, 2018

(30) Foreign Application Priority Data
Nov. 16, 2016 (JP) .................. 2016-223418

(51) Int. Cl.
*H02J 50/60* (2016.01)
*H02J 50/80* (2016.01)
*H02J 50/12* (2016.01)
*H02J 7/02* (2016.01)
*H04B 5/00* (2006.01)

(52) U.S. Cl.
CPC .............. *H02J 50/60* (2016.02); *H02J 7/025* (2013.01); *H02J 50/12* (2016.02); *H02J 50/80* (2016.02); *H04B 5/0037* (2013.01)

(58) Field of Classification Search
CPC .. H02J 50/60; H02J 50/80; H02J 50/12; H02J 7/025; H04B 5/0037
See application file for complete search history.

(56) References Cited

U.S. PATENT DOCUMENTS

| 2015/0280453 | A1 | 10/2015 | Ikefuji | |
|---|---|---|---|---|
| 2018/0262049 | A1* | 9/2018 | Ikefuji | H02J 50/12 |
| 2018/0331575 | A1* | 11/2018 | Ikefuji | H02J 7/00 |
| 2018/0342898 | A1* | 11/2018 | Ikefuji | H02J 7/00 |

FOREIGN PATENT DOCUMENTS

JP    2015-202025    11/2015

* cited by examiner

*Primary Examiner* — Jared Fureman
*Assistant Examiner* — Duc M Pham
(74) *Attorney, Agent, or Firm* — Fish & Richardson P.C.

(57) ABSTRACT

A non-contact power supply system includes a power transmission device including a first resonance circuit having a first coil for transmitting electric power; and a power reception device including a second resonance circuit having a second coil for receiving the electric power. The system is configured to transmit and receive the electric power by a magnetic field resonance method, and to communicate between the power transmission device and the power reception device. The power transmission device includes a power transmission circuit for supplying an AC voltage to the first resonance circuit; a detection circuit configured to detect an amplitude of a current flowing through the first coil; and a control circuit configured to control the power transmission circuit to perform power transmission control of the electric power.

16 Claims, 31 Drawing Sheets

Separated state

Reference arrangement state

Voltage drop of sense resistor

Reference arrangement state | Separated state | Reference arrangement state

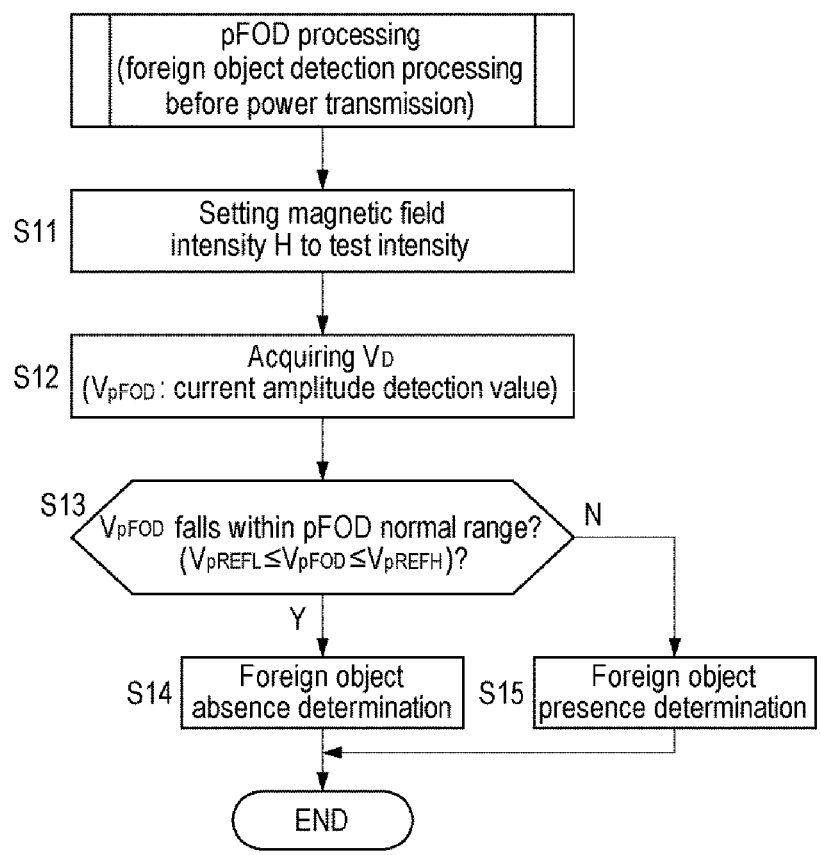

First case

Second case

Third case

Fourth case

At the time of starting up power supply device and electronic device
{ Load change flag FL1: OFF
  mFOD detection flag FLm: OFF
  Load change flag FL2: OFF

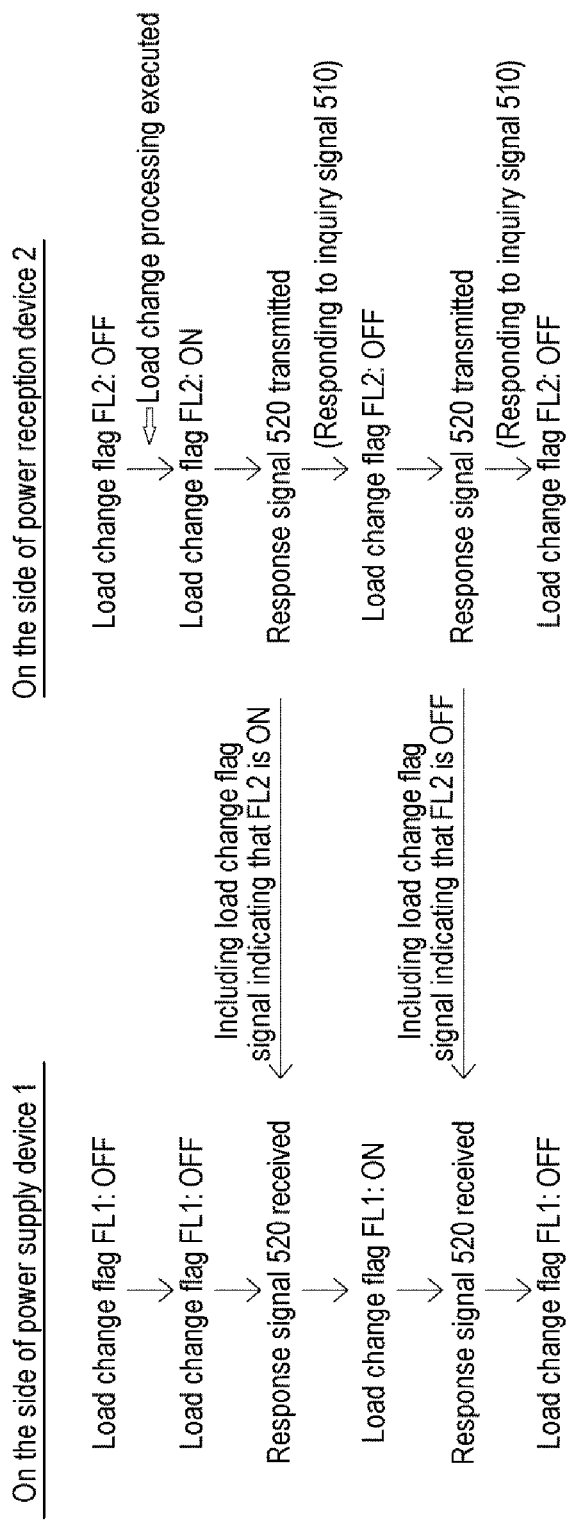

FIG. 30
[Case A]
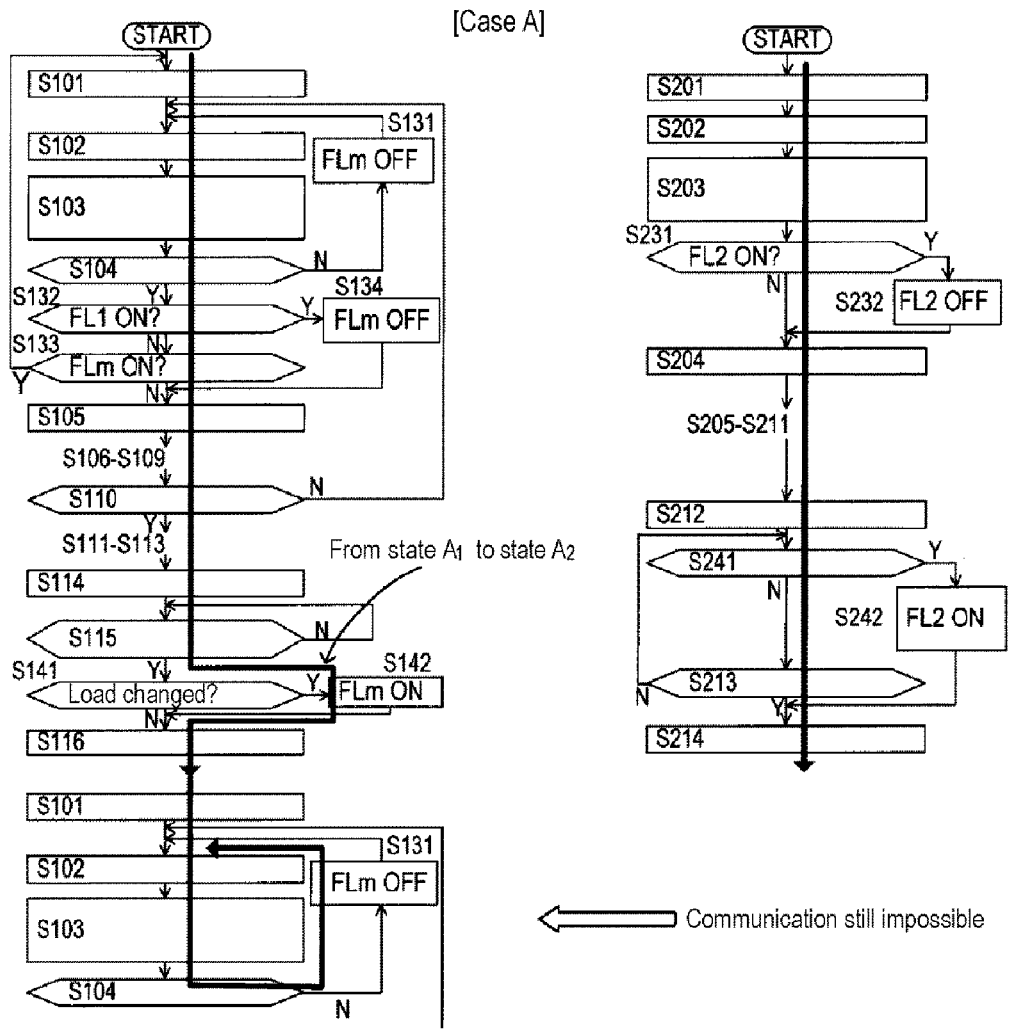
To state A₃ when foreign object removed
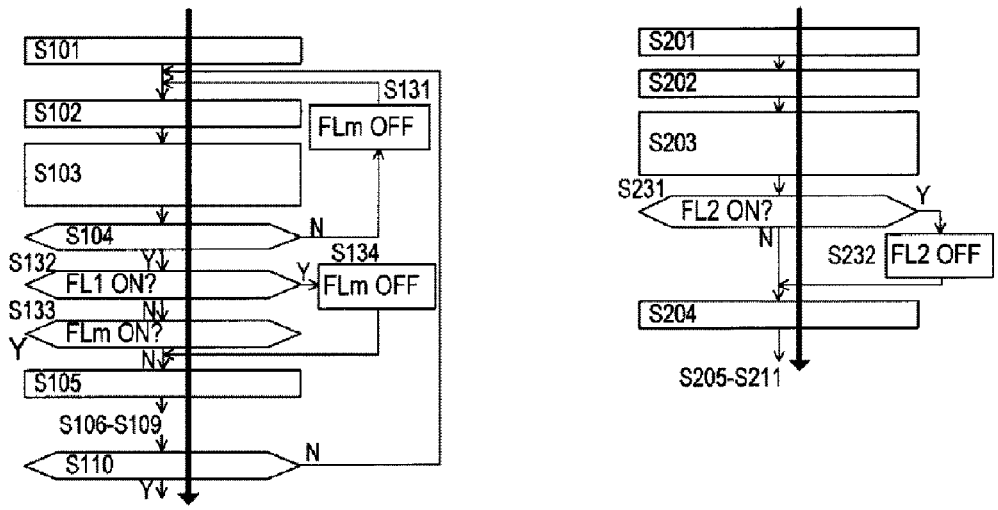

FIG. 31
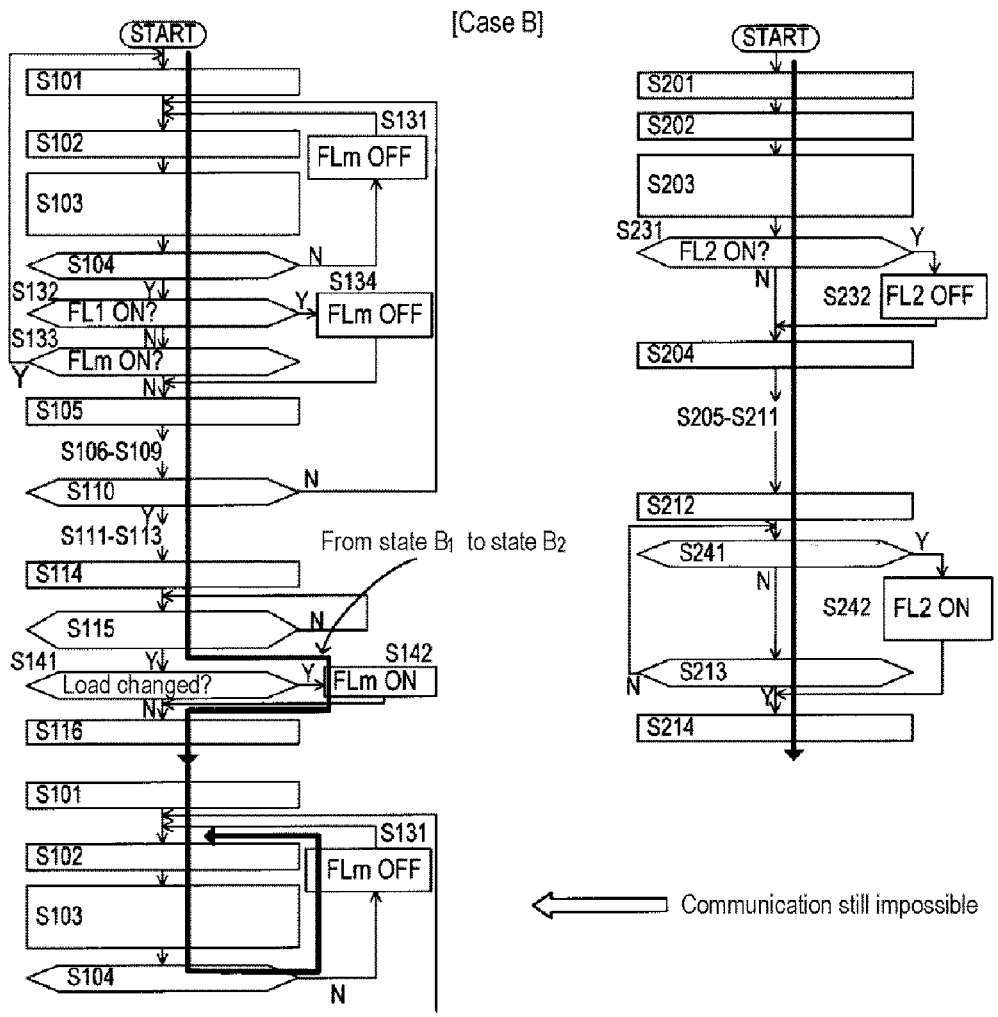
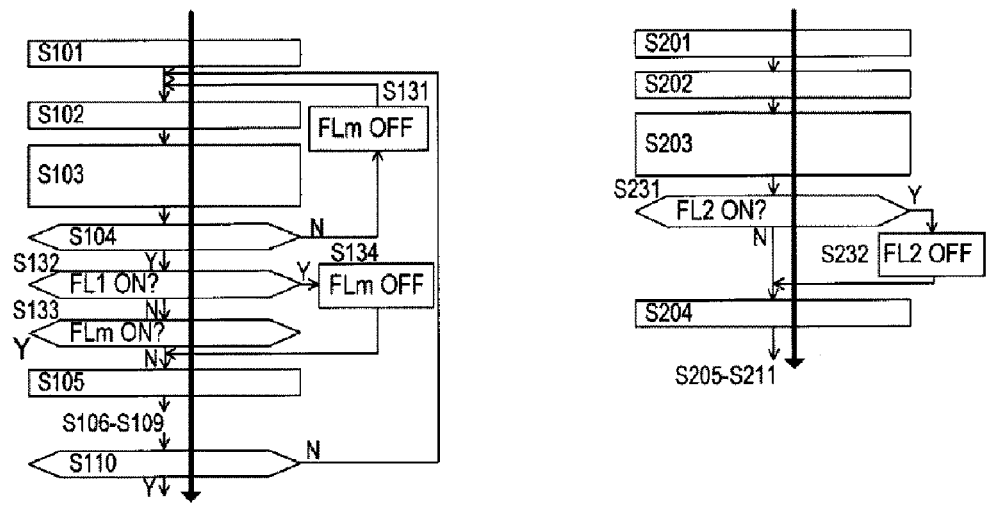

NON-CONTACT POWER SUPPLY SYSTEM AND POWER TRANSMISSION DEVICE

CROSS-REFERENCE TO RELATED APPLICATION

This application is based upon and claims the benefit of priority from Japanese Patent Application No. 2016-223418, filed on Nov. 16, 2016, the entire contents of which are incorporated herein by reference.

TECHNICAL FIELD

The present disclosure relates to a non-contact power supply system and a power transmission device.

BACKGROUND

As one type of close proximity wireless communication, there is radio communication by NFC (Near field communication) using 13.56 MHz as a carrier frequency. Meanwhile, a technique for performing non-contact power supply by a magnetic field resonance method using a coil used for NFC communication has also been proposed.

In the non-contact power supply utilizing magnetic field resonance, a power transmission side resonance circuit including a power transmission side coil is disposed in a power supply device, and a power reception side resonance circuit including a power reception side coil is arranged in an electronic device as a power reception device. Resonance frequencies of these resonance circuits are set to a common reference frequency. Then, by supplying an alternating current to the power transmission side coil, an alternating magnetic field having the reference frequency is generated in the power transmission side coil. Then, the alternating magnetic field is transmitted to the power reception side resonance circuit resonating at the reference frequency, whereby an alternating current flows through the power reception side coil. In other words, power is transmitted from the power transmission side resonance circuit including the power transmission side coil to the power reception side resonance circuit including the power reception side coil.

In general, only the electronic device corresponding to the power supply device is disposed on a power supply base (a power supply mat or a power supply cradle) of the power supply device, whereby desired power supply (power transmission) is performed. However, a foreign object not corresponding to the power supply device may be erroneously placed on the power supply base. The foreign object referred to herein is, for example, an object (a card or the like) which includes a wireless IC tag having an antenna coil of 13.56 MHz that does not respond to NFC communication. Moreover, for example, the foreign object is an electronic device that has an NFC communication function which is invalid. For example, a smart phone having an NFC communication function which is turned off by software setting may become a foreign object. In addition, a smart phone having a valid NFC communication function and not having a power reception function is classified as a foreign object.

If such a foreign object is placed on the power supply base when a power transmission operation is being performed, the foreign object may be destroyed by the strong magnetic field generated by the power transmission side coil. For example, the strong magnetic field during the power transmission operation may increase the terminal voltage of the coil of the foreign object on the power supply base to 100 V to 200 V. If the foreign object is not formed so as to withstand such a high voltage, the foreign object is destroyed. Incidentally, an iron plate or the like may become a foreign object. Depending on the carrier wave frequency of power transmission, a foreign object such as an iron plate or the like may generate heat due to the magnetic field generated by the power transmission side coil.

It is essential to detect the presence or absence of such a foreign object and to take necessary measures. In this case, it is also necessary to consider the state of the electronic device as a power reception device (the reason why consideration is necessary will be explained in detail later).

SUMMARY

Some embodiments of the present disclosure provide a non-contact power supply system and a power transmission device which appropriately cope with various situations and contribute to prevention of breakage or the like of a foreign object.

According to an aspect of the present disclosure, there is provided a non-contact power supply system, including a power transmission device including a first resonance circuit having a first coil for transmitting electric power, and a power reception device including a second resonance circuit having a second coil for receiving the electric power, wherein the non-contact power supply system is configured to transmit and receive the electric power by a magnetic field resonance method, and to communicate between the power transmission device and the power reception device, wherein the power transmission device includes a power transmission circuit for supplying an AC voltage to the first resonance circuit, a detection circuit configured to detect an amplitude of a current flowing through the first coil, and a control circuit configured to control the power transmission circuit to perform power transmission control of the electric power, wherein the control circuit is capable of, when power transmission of the electric power is performed, executing power transmission stop processing for stopping the power transmission based on a change in an amplitude detection value of the detection circuit, wherein the power reception device is capable of, when the power transmission of the electric power is performed, executing load change processing for changing a magnitude of a load of the power reception device, which is viewed from the power transmission device, so as to change the amplitude of the current, and is configured to, when the load change processing is executed, perform communication to transmit a load change signal indicating that the load change processing is executed to the power transmission device, and wherein the control circuit is configured to, after executing the power transmission stop processing, control resumption of the power transmission based on whether or not the load change signal is received.

Further, in the non-contact power supply system, after execution of the power transmission stop processing, the control circuit may allow the resumption of the power transmission when the load change signal is received, and restricts the resumption of the power transmission when the load change signal is not received.

Furthermore, in the non-contact power supply system, in a state where the load change signal is received after execution of the power transmission stop processing, the control circuit may restrict the resumption of the power transmission if a predetermined signal is received from the power reception device through communication.

In addition, when the power transmission is performed, the control circuit may distinguish between, based on whether or not the load change signal is received, a case where the amplitude is changed due to an influence of a foreign object different from the power reception device and a case where the amplitude is changed due to the load change processing executed by the power reception device.

Further, in the non-contact power supply system, the control circuit may set the amplitude detection value after a lapse of a predetermined time from a start of the power transmission as a reference value, and controls whether to execute the power transmission stop processing by comparing the amplitude detection value obtained during the power transmission with the reference value.

Furthermore, in the non-contact power supply system, the control circuit may execute the power transmission stop processing when a difference between the amplitude detection value obtained during the power transmission and the reference value is equal to or greater than a predetermined threshold value.

In addition, in the power reception device of the non-contact power supply system, the electric power received by the second resonance circuit may be supplied to one or more subsequent circuits via a pair of power lines, and in the load change processing, the power reception device may cause the change in the magnitude of the load of the power reception device, which is viewed from the power transmission device, by reducing or increasing an impedance between the pair of power lines as viewed from the second resonance circuit.

Further, in the non-contact power supply system, in the load change processing, the power reception device may cause the change in the magnitude of the load of the power reception device, which is viewed from the power transmission device, by changing a resonance frequency of the second resonance circuit from a reference frequency that is a resonance frequency set for receiving the electric power, or by short-circuiting the second coil in the second resonance circuit.

Furthermore, in the non-contact power supply system, the control circuit may keep a predetermined flag in a set state when the power transmission stop processing is executed based on the change in the amplitude detection value of the detection circuit, and restrict the resumption of the power transmission when the flag is in the set state.

In addition, in the non-contact power supply system, after executing the power transmission stop processing, the control circuit may set the flag to a reset state to allow the resumption of the power transmission when communication with the power reception device is operable and the load change signal is received, and keep the set state of the flag to restrict the resumption of the power transmission when the communication with the power reception device is operable and the load change signal is not received.

Further, in the non-contact power supply system, after keeping the set state of the flag to restrict the resumption of the power transmission, the control circuit may set the flag to the reset state when the communication with the power reception device is not operable, and then allow the resumption of the power transmission when the communication with the power reception device becomes operable.

Furthermore, in the non-contact power supply system, after keeping the predetermined flag in the set state, the control circuit may set the flag to a reset state when communication with the power reception device is not operable, and then allow the resumption of the power transmission when the communication with the power reception device becomes operable.

According to another aspect of the present disclosure, there is provided a power transmission device for transmitting electric power to a power reception device by a magnetic field resonance method and communicating with the power reception device, including a first resonance circuit including a first coil for transmitting the electric power, a power transmission circuit for supplying an AC voltage to the first resonance circuit, a detection circuit configured to detect an amplitude of a current flowing through the first coil, and a control circuit configured to control the power transmission circuit to perform power transmission control of the electric power, wherein the control circuit is capable of, when power transmission of the electric power is performed, executing power transmission stop processing for stopping the power transmission based on a change in an amplitude detection value of the detection circuit and is configured to, after execution of the power transmission stop processing, control resumption of the power transmission based on whether a load change signal indicating that load change processing for changing a magnitude of a load of the power reception device, which is viewed from the power transmission device, so as to change the amplitude of the current, is executed by the power reception device is received from the power reception device.

BRIEF DESCRIPTION OF DRAWINGS

FIG. 12 is an operation flowchart of pFOD processing executed by a power supply device.

FIG. 25C is a view showing a state change of a load change flag held by each of the power supply device and the electronic device.

FIG. 30 is a view showing a flow of operations of a power supply device and an electronic device in case A according to the second embodiment of the present disclosure.

FIG. 31 is a view showing a flow of operations of a power supply device and an electronic device in case B according to the second embodiment of the present disclosure.

DETAILED DESCRIPTION

Figure 1A:
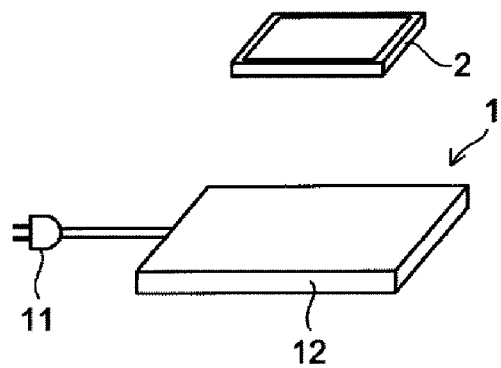
FIGS. 1A and 1B are schematic external views of a power supply device and an electronic device according to a first embodiment of the present disclosure.

Hereinafter, embodiments of the present disclosure will be specifically described with reference to the drawings. In the drawings to be referred to, the same parts are denoted by the same reference numerals, and redundant explanations on the same parts are omitted in principle. In the subject specification, for the sake of simplicity of description, by indicating a sign or a symbol that refers to information, a signal, a physical quantity, a state quantity, a member or the like, the information, the signal, the physical quantity, the state quantity, the member or the like may be omitted or abbreviated in some cases. In an arbitrary flowchart to be described later, a plurality of processes in arbitrary plural steps may be executed in an arbitrarily changed execution order or may be executed in parallel as long as there is no inconsistency in the processing contents.

First Embodiment

Figure 1B:
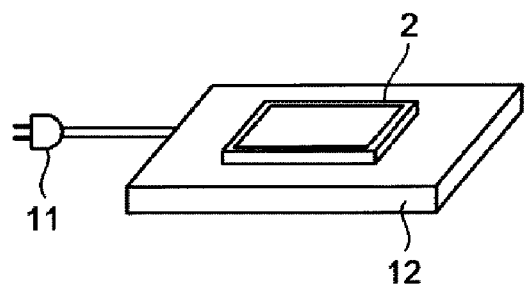

A first embodiment of the present disclosure will be described. FIGS. 1A and 1B are schematic external views of a power supply device 1 and an electronic device 2 according to the present embodiment. FIG. 1A is an external view of the power supply device 1 and the electronic device 2 in a separated state, and FIG. 1B is an external view of the power supply device 1 and the electronic device 2 in a reference arrangement state. The meaning of the separated state and the reference arrangement state will be described in detail later. A non-contact power supply system is formed by the power supply device 1 and the electronic device 2. The power supply device 1 includes a power supply plug 11 for receiving commercial AC power and a power supply base 12 made of a resin material.

Figure 2:
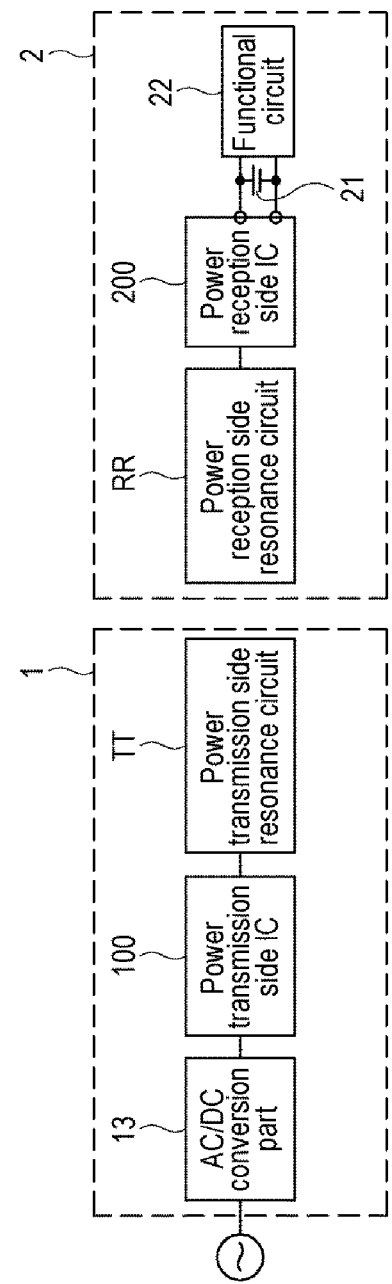
FIG. 2 is a schematic internal configuration diagram of the power supply device and the electronic device according to the first embodiment of the present disclosure.

FIG. 2 is a schematic internal configuration diagram of the power supply device 1 and the electronic device 2. The power supply device 1 includes an AC/DC conversion part 13 that generates and outputs a DC voltage having a predetermined voltage value from a commercial AC voltage input via the power supply plug 11, a power transmission side IC 100 (hereinafter also referred to as an IC 100) which is an integrated circuit to be driven using the power voltage of the AC/DC conversion part 13, and a power transmission side resonance circuit TT (hereinafter also referred to as a resonance circuit TT) connected to the IC 100. The AC/DC conversion part 13, the power transmission side IC 100 and the resonance circuit TT may be arranged in the power supply base 12. In addition to the IC 100, a circuit to be driven using the output voltage of the AC/DC conversion part 13 may be provided in the power supply device 1.

The electronic device 2 includes a power reception side IC 200 (hereinafter also referred to as an IC 200) which is an integrated circuit, a power reception side resonance circuit RR (hereinafter also referred to as a resonance circuit RR) connected to the IC 200, a battery 21 which is a secondary battery, and a functional circuit 22 driven based on the output voltage of the battery 21. Although details will be described later, the IC 200 may supply charging power to the battery 21. The IC 200 may be driven by the output voltage of the battery 21 or may be driven based on a voltage supplied from a voltage source other than the battery 21. Alternatively, a DC voltage obtained by rectifying a signal for NFC communication (details will be described later) received from the power supply device 1 may be used as the driving voltage of the IC 200. In this case, the IC 200 can be driven even when the remaining capacity of the battery 21 is exhausted.

The electronic device 2 may be an arbitrary electronic device and may be, for example, a mobile phone (including a mobile phone classified as a smart phone), a portable information terminal, a tablet type personal computer, a digital camera, an MP3 player, a pedometer, or a Bluetooth (registered trademark) headset. The functional circuit 22 realizes an arbitrary function to be realized by the electronic device 2. Therefore, for example, if the electronic device 2 is a smart phone, the functional circuit 22 includes a call processing part for realizing a call with a counterpart device, a communication processing part for transmitting and receiving information to and from another device via a network, and the like. Alternatively, for example, if the electronic device 2 is a digital camera, the functional circuit 22 includes a drive circuit for driving an image pickup element, an image processing circuit for generating image data from an output signal of the image pickup element, and the like. The functional circuit 22 may be regarded as a circuit provided in an external device of the electronic device 2.

Figure 3:
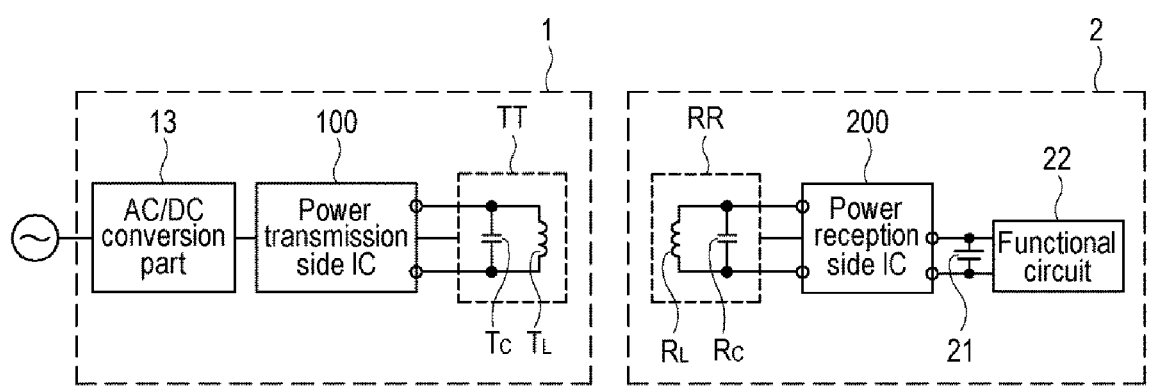
FIG. 3 is a schematic internal configuration diagram of the power supply device and the electronic device according to the first embodiment of the present disclosure.

As shown in FIG. 3, the resonance circuit TT includes a coil $T_L$ which is a power transmission side coil, and a capacitor $T_C$ which is a power transmission side capacitor. The resonance circuit RR includes a coil $R_L$ which is a power reception side coil, and a capacitor $R_C$ which is a power reception side capacitor. In the following description, for the sake of concrete description, it is assumed that the power transmission side coil $T_L$ and the power transmission side capacitor $T_C$ are connected in parallel to each other so that the resonance circuit TT is formed as a parallel resonance circuit and further that the power reception side coil $R_L$ and the power reception side capacitor $R_C$ are connected in parallel to each other so that the resonance circuit RR is formed as a parallel resonance circuit. However, the power transmission side coil $T_L$ and the power transmission side capacitor $T_C$ may be connected in series to each other so that the resonance circuit TT is formed as a series resonance circuit. The power reception side coil $R_L$ and the power reception side capacitor $R_C$ may be connected in series to each other so that the resonance circuit RR is formed as a series resonance circuit.

As shown in FIG. 1B, when the electronic device 2 is placed within a predetermined range on the power supply base 12, communication, power transmission and power reception can be performed between the devices 1 and 2 by a magnetic field resonance method (i.e., using magnetic field resonance). The magnetic field resonance is also called magnetic field resonation or the like.

Communication between the devices 1 and 2 is wireless communication based on Near Field Communication (NFC) (hereinafter referred to as NFC communication). The frequency of a carrier wave for communication is 13.56 MHz (megahertz). Hereinafter, 13.56 MHz is referred to as a reference frequency. Since the NFC communication between the devices 1 and 2 is performed by the magnetic field resonance method using the resonance circuits TT and RR, the resonance frequencies of the resonance circuits TT and RR are both set to the reference frequency. However, as will be described later, the resonance frequency of the resonance circuit RR may be temporarily changed from the reference frequency.

Power transmission and power reception between the devices 1 and 2 are power transmission from the power supply device 1 to the electronic device 2 by NFC and power reception in the electronic device 2 by NFC. These power transmission and reception are collectively referred to as NFC power transmission or simply referred to as power transmission. By transmitting electric power from the coil $T_L$ to the coil $R_L$ by the magnetic field resonance method, power transmission is realized in a non-contact manner.

In the power transmission utilizing magnetic field resonance, an alternating current is caused to flow through the power transmission side coil $T_L$ to generate an alternating magnetic field having a reference frequency in the power transmission side coil $T_L$. Then, the alternating magnetic field is transmitted to the resonance circuit RR resonating at the reference frequency, whereby an alternating current flows through the power reception side coil $R_L$. In other words, power is transmitted from the resonance circuit TT including the power transmission side coil $T_L$ to the resonance circuit RR including the power reception side coil $R_L$. Although the description may be omitted herein below, the magnetic field generated by the coil $T_L$ or the coil $R_L$ in the NFC communication or the power transmission is an alternating magnetic field that oscillates at the reference frequency unless specifically mentioned otherwise.

A state in which the electronic device 2 is placed within a predetermined range on the power supply base 12 so that the above-described NFC communication and power transmission can be realized is referred to as a reference arrangement state (see FIG. 1B). When magnetic resonance is used, communication and power transmission are possible even if the distance to the counterpart is relatively large. However, if the electronic device 2 is away from the power supply base 12 by a considerable distance, NFC communication and power transmission cannot be realized. A state in which the electronic device 2 is sufficiently away from the power supply base 12 so that the above-described NFC communication and power transmission cannot be realized is referred to as a separated state (see FIG. 1A). Although the surface of the power supply base 12 shown in FIG. 1A is flat, a recess or the like may be formed on the power supply base 12 depending on the shape of the electronic device 2 to be placed.

Figure 4:
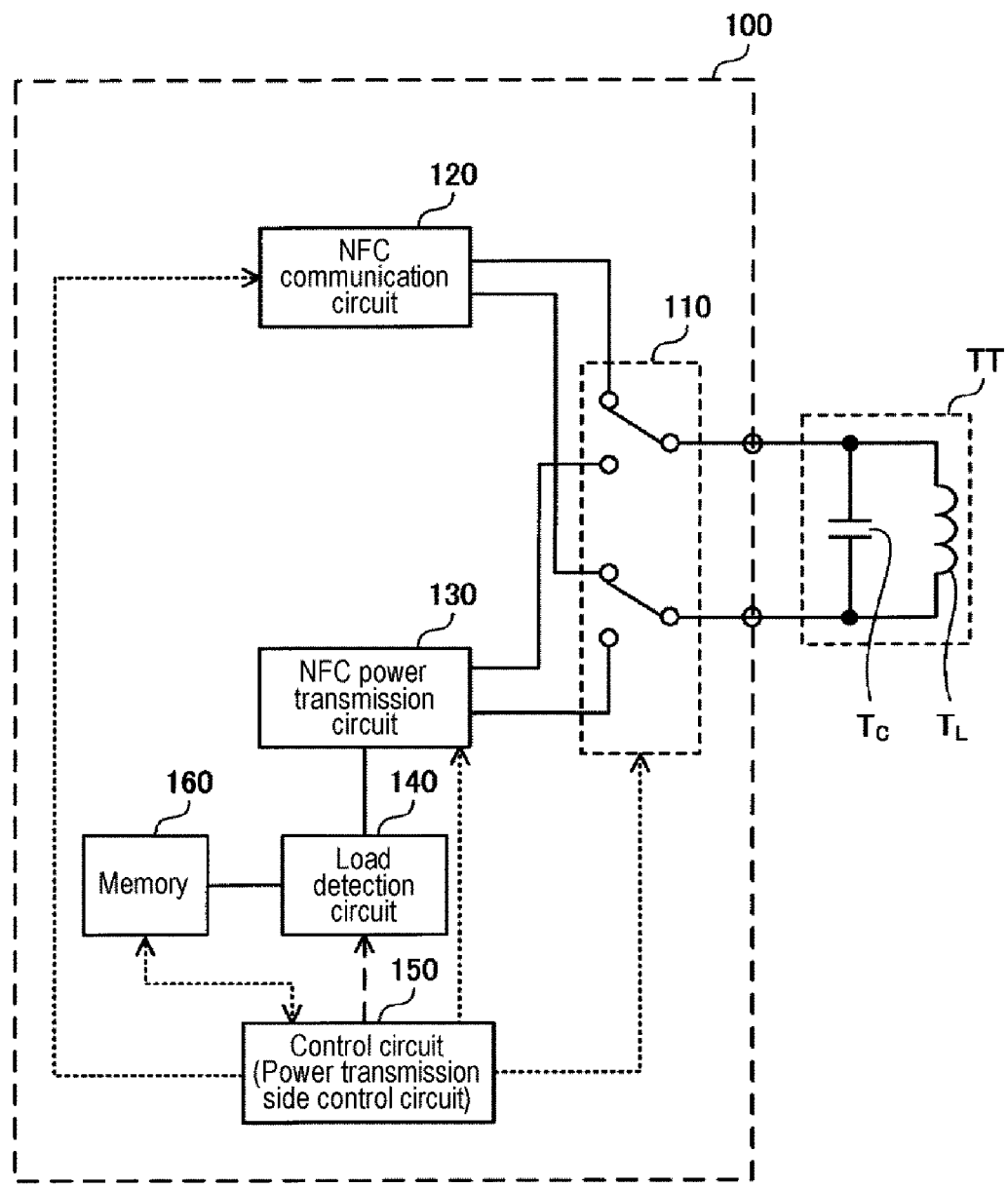
FIG. 4 is a partial configuration diagram of the power supply device including an internal block diagram of an IC in the power supply device according to the first embodiment of the present disclosure.
Figure 5:
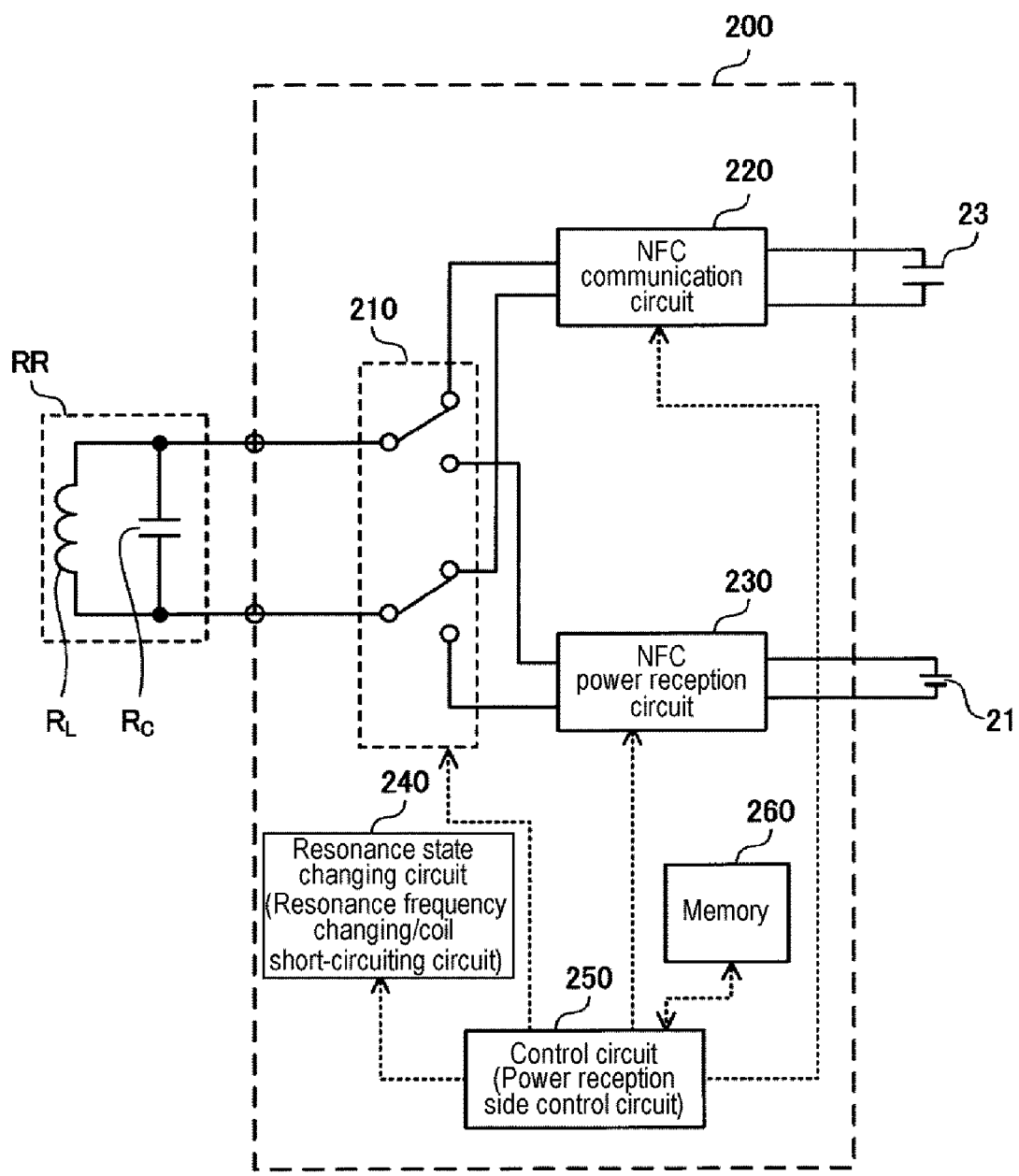
FIG. 5 is a partial configuration diagram of an electronic device including an internal block diagram of an IC in the electronic device according to the first embodiment of the present disclosure.

FIG. 4 is a configuration diagram of a part of the power supply device 1 including an internal block diagram of the IC 100. The respective parts denoted by reference numerals 110, 120, 130, 140, 150 and 160 are provided in the IC 100. FIG. 5 is a configuration diagram of a part of the electronic device 2 including an internal block diagram of the IC 200. The respective parts denoted by reference numerals 210, 220, 230, 240, 250 and 260 are provided in the IC 200. In addition, a capacitor 23 that outputs a drive voltage of the IC 200 may be connected to the IC 200. The capacitor 23 is capable of outputting a DC voltage obtained by rectifying a signal for NFC communication received from the power supply device 1.

A switching circuit 110 connects either an NFC communication circuit 120 or an NFC power transmission circuit 130 to the resonance circuit TT under the control of a control circuit 150. The switching circuit 110 may be configured by a plurality of switches interposed between the resonance circuit TT and the circuits 120 and 130. An arbitrary switch described in the subject specification may be formed using a semiconductor switching element such as a field effect transistor or the like.

A switching circuit 210 connects the resonance circuit RR to either an NFC communication circuit 220 or a NFC power reception circuit 230 under the control of a control circuit 250. The switching circuit 210 may be configured by a plurality of switches interposed between the resonance circuit RR and the circuits 220 and 230.

A state in which the resonance circuit TT is connected to the NFC communication circuit 120 via the switching circuit 110 and the resonance circuit RR is connected to the NFC communication circuit 220 via the switching circuit 210 is called a communication connection state. NFC communication becomes possible in the communication connection state. In the communication connection state, the NFC communication circuit 120 can supply an AC signal (AC voltage) having a reference frequency to the resonance circuit TT. NFC communication between the devices 1 and 2 is executed in a half-duplex manner.

When the power supply device 1 is on a transmission side in the communication connection state, if an arbitrary information signal is superimposed on the AC signal supplied to the resonance circuit TT by the NFC communication circuit 120, the information signal is transmitted from the coil $T_L$ as a power supply device side antenna coil and is received by the coil $R_L$ as an electronic device side antenna coil. The information signal received by the coil $R_L$ is extracted by the NFC communication circuit 220. When the electronic device 2 is on a transmission side in the communication connection state, the NFC communication circuit 220 can transmit an arbitrary information signal (response signal) from the coil $R_L$ of the resonance circuit RR to the coil $T_L$ of the resonance circuit TT. As is well known, this transmission is realized by a load modulation method that changes the impedance of the coil $R_L$ (electronic device side antenna coil) viewed from the coil $T_L$. (power supply device side antenna coil) based on the ISO standard (for example, the ISO 14443 standard). The information signal transmitted from the electronic device 2 is extracted by the NFC communication circuit 120.

A state in which the resonance circuit TT is connected to the NFC power transmission circuit 130 via the switching circuit 110 and the resonance circuit RR is connected to the NFC power reception circuit 230 via the switching circuit 210 is referred to as a power supply connection state.

In the power supply connection state, the NFC power transmission circuit 130 can perform a power transmission operation, and the NFC power reception circuit 230 can perform a power reception operation. Power transmission is realized by the power transmission operation and the power reception operation. In the power transmission operation, the power transmission circuit 130 generates a power transmission magnetic field (power transmission alternating magnetic field) having a reference frequency in the power transmission side coil $T_L$ by supplying a power transmission AC signal (power transmission AC voltage) having a reference frequency to the resonance circuit TT, whereby electric power is transmitted from the resonance circuit TT (power transmission side coil $T_L$) to the resonance circuit RR in a magnetic field resonance manner. The electric power received by the power reception side coil $R_L$ based on the power transmission operation is sent to the power reception circuit 230. In the power reception operation, the power reception circuit 230 generates arbitrary DC power from the received electric power and outputs the DC power. The battery 21 can be charged with the output power of the power reception circuit 230.

Figure 6:
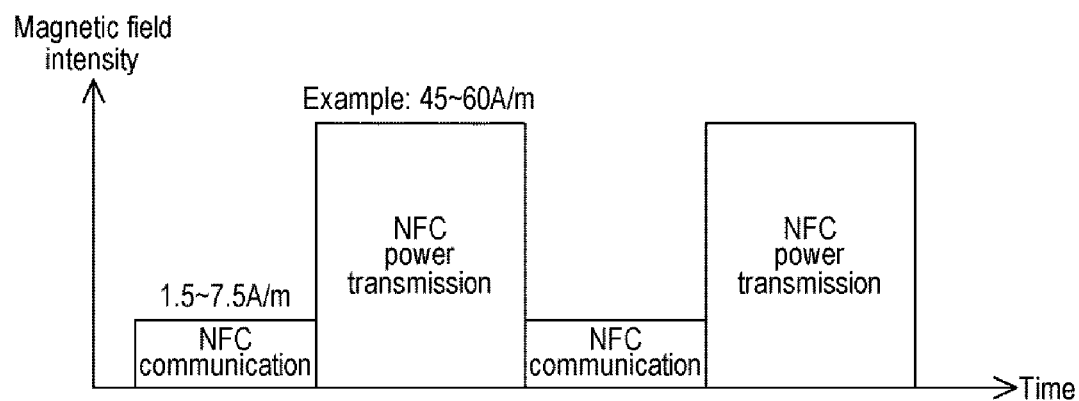
FIG. 6 is a view showing how magnetic field intensity changes when NFC communication and power transmission are performed alternately.

Even when NFC communication is performed in the communication connection state, a magnetic field is generated by the coil $T_L$ or $R_L$, and the magnetic field intensity in NFC communication falls within a predetermined range. The lower limit value and the upper limit value of the range are determined by the NFC standard and are 1.5 A/m and 7.5 A/m, respectively. On the other hand, the intensity of the magnetic field generated by the power transmission side coil $T_L$ during the power transmission (i.e., the power transmission operation) (the magnetic field intensity of the power transmission magnetic field) is larger than the above upper limit value and is, for example, about 45 to 60 A/m. NFC communication and power transmission (NFC power transmission) can be performed alternately in the non-contact power supply system including the devices 1 and 2. The state of the magnetic field intensity at that time is shown in FIG. 6.

Figure 7:
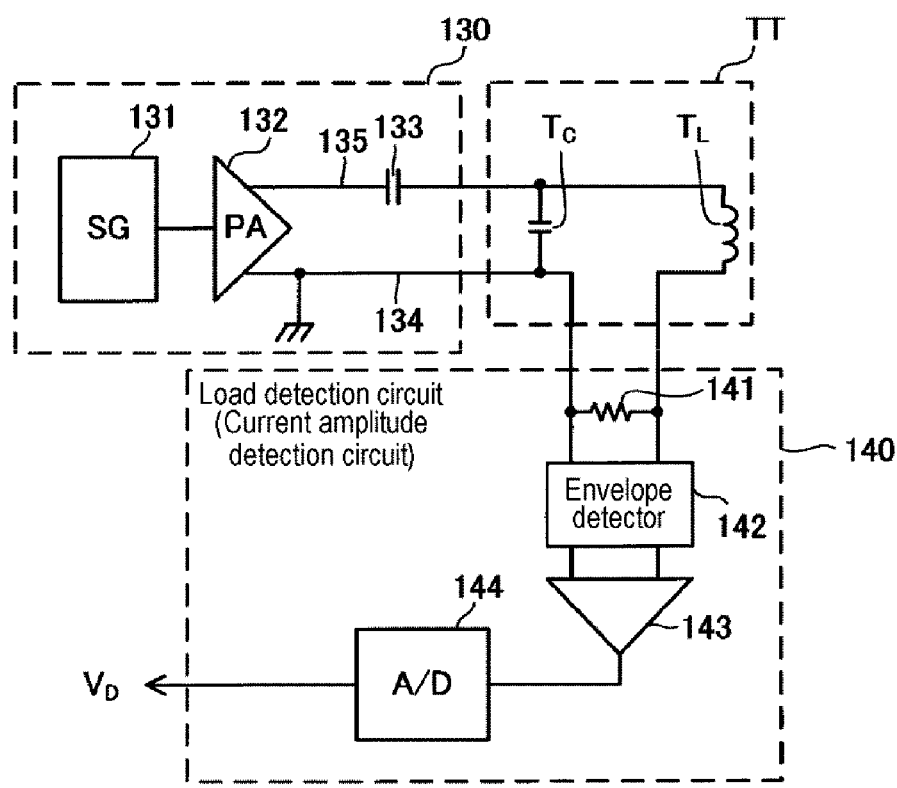
FIG. 7 is a view showing a relationship between a power transmission circuit, a load detection circuit and a resonance circuit in a power supply device.

The load detection circuit 140 detects the magnitude of the load of the power transmission side coil $T_L$, i.e., the magnitude of the load in the power transmission side coil $T_L$ when an AC signal is supplied from the power transmission circuit 130 to the power transmission side coil $T_L$. FIG. 7 shows the relationship between the power transmission circuit 130, the load detection circuit 140 and the resonance circuit TT in the power supply connection state. In FIG. 7, illustration of the switching circuit 110 is omitted.

The power transmission circuit 130 includes a signal generator 131 for generating a sine wave signal having a reference frequency, an amplifier (power amplifier) 132 for amplifying the sine wave signal generated by the signal generator 131 and outputting the amplified sine wave signal to between lines 134 and 135 based on the potential of the line 134, and a capacitor 133. On the other hand, the load detection circuit 140 includes a sense resistor 141, an envelope detector 142, an amplifier 143, and an A/D converter 144. Although the signal intensity of the sine wave signal generated by the signal generator 131 is fixed to a constant value, the amplification factor of the amplifier 132 is variably set by the control circuit 150.

One end of the capacitor 133 is connected to the line 135. In the power supply connection state, the other end of the capacitor 133 is commonly connected to one end of the capacitor $T_C$ and the coil $T_L$. The other end of the coil $T_L$ is commonly connected to the line 134 and the other end of the capacitor $T_C$ via the sense resistor 141.

Figure 8:
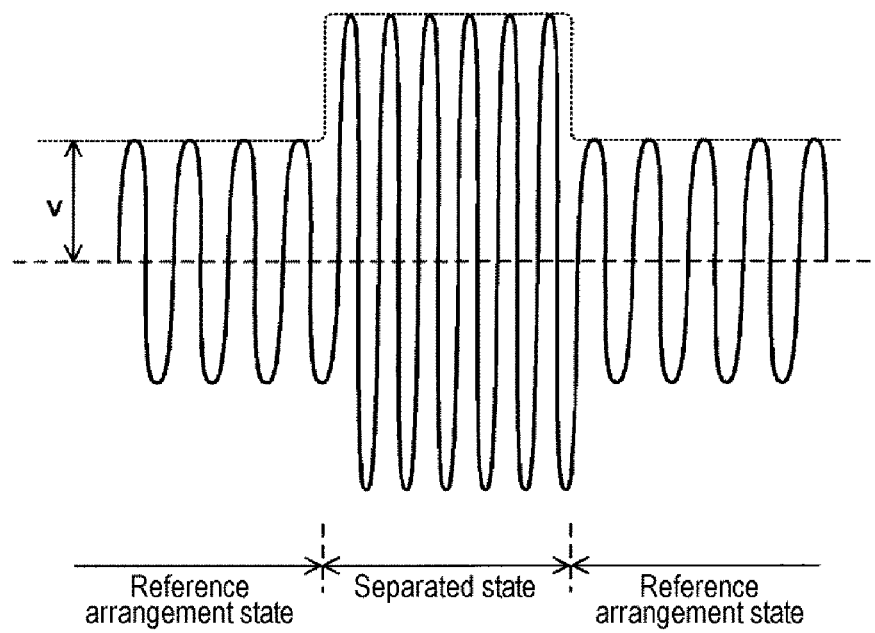
FIG. 8 is a waveform diagram of a voltage drop of a sense resistor in the load detection circuit of FIG. 7.

The power transmission operation is realized by supplying an AC signal (power transmission AC voltage) from the amplifier 132 to the resonance circuit TT via the capacitor 133. When the AC signal from the amplifier 132 is supplied to the resonance circuit TT in the power supply connection state, an alternating current having a reference frequency flows through the power transmission side coil $T_L$. As a result, an AC voltage drop occurs in the sense resistor 141. The solid line waveform in FIG. 8 is a voltage waveform of the voltage drop in the sense resistor 141. With respect to the resonance circuit TT, when the generated magnetic field intensity of the power transmission side coil $T_L$ is constant and when the electronic device 2 is brought closer to the power supply base 12, a current based on the generated magnetic field of the power transmission side coil $T_L$ flows through the power reception side coil $R_L$. A counter electromotive force based on the current flowing through the power reception side coil $R_L$ is generated in the power transmission side coil $T_L$. The counter electromotive force acts to reduce the current flowing through the power transmission side coil $T_L$. Therefore, as shown in FIG. 8, the amplitude of the voltage drop of the sense resistor 141 in the reference arrangement state is smaller than that in the separated state.

The envelope detector 142 detects an envelope of the voltage drop signal in the sense resistor 141 and outputs an analog voltage signal proportional to the voltage v in FIG. 8. The amplifier 143 amplifies the output signal of the envelope detector 142 and outputs the amplified output signal. The A/D converter 144 converts the output voltage signal of the amplifier 143 into a digital signal and outputs a digital voltage value $V_D$. As understood from the above description, the voltage value $V_D$ has a value proportional to the amplitude of the current flowing through the sense resistor 141 (i.e., the amplitude of the current flowing through the power transmission side coil $T_L$) (as the amplitude increases, the voltage value $V_D$ also increases). Therefore, the load detection circuit 140 may also be said to be a current amplitude detection circuit for detecting the amplitude of the current flowing through the power transmission side coil $T_L$. It may be considered that the amplitude detection value is the voltage value $V_D$. Incidentally, the envelope detector 142 may be provided behind the amplifier 143. However, as shown in FIG. 7, it is advantageous to provide the envelope detector 142 in front of the amplifier 143. The reason is that by doing so, an amplifier having lower response performance to a high frequency can be adopted as the amplifier 143.

For the power transmission side coil $T_L$ that generates a magnetic field, a coil such as the power reception side coil $R_L$ or the like magnetically coupled to the power transmission side coil $T_L$ may be considered to be a load. Depending on the magnitude of the load, the voltage value $V_D$ which is the detection value of the load detection circuit 140 changes. Therefore, it may be considered that the load detection circuit 140 detects the magnitude of the load according to the output of the voltage value $V_D$. The magnitude of the load referred to herein may be said to be the magnitude of the load in the power transmission side coil $T_L$ at the time of power transmission and may also be said to be the magnitude of the load of the electronic device 2 as viewed from the power supply device 1 at the time of power transmission. The sense resistor 141 may be provided inside the IC 100 or outside the IC 100.

The memory 160 (see FIG. 4) is configured to include a nonvolatile memory and a volatile memory and is capable of storing arbitrary information. The control circuit 150 comprehensively controls the operation of each part in the IC 100. The control performed by the control circuit 150 includes, for example, the control of a switching operation of the switching circuit 110, the control of the contents and execution or non-execution of a communication operation and a power transmission operation by the communication circuit 120 and the power transmission circuit 130, the control of an operation of the load detection circuit 140, and the control of storage and readout of the memory 160. The control circuit 150 includes a built-in timer (not shown) and can measure the time length between arbitrary timings.

The resonance state changing circuit 240 (see FIG. 5) in the electronic device 2 is a resonance frequency changing circuit capable of changing the resonance frequency of the resonance circuit RR from the reference frequency to another predetermined frequency $f_M$, or a coil short-circuiting circuit capable of short-circuiting the power reception side coil $R_L$ in the resonance circuit RR.

Figure 9:
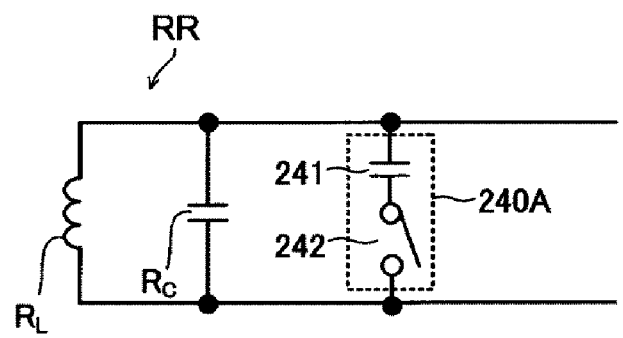
FIG. 9 is a circuit diagram showing an example of a resonance state changing circuit according to the first embodiment of the present disclosure.

The resonance frequency changing circuit 240A shown in FIG. 9 is an example of a resonance frequency changing circuit as the resonance state changing circuit 240. The resonance frequency changing circuit 240A is composed of a series circuit of a capacitor 241 and a switch 242. One end of the series circuit is commonly connected to one end of the capacitor $R_C$ and the coil $R_L$, and the other end of the series circuit is commonly connected to the other end of the capacitor $R_C$ and the coil $R_L$. The switch 242 is turned on or off under the control of a control circuit 250. When the switch 242 is turned off, the capacitor 241 is disconnected from the capacitor $R_C$ and the coil $R_L$. Therefore, the resonance circuit RR is formed of only the coil $R_L$ and the capacitor $R_C$ when ignoring the parasitic inductance and the parasitic capacitance. Thus, the resonance frequency of the resonance circuit RR coincides with the reference frequency. That is to say, when the switch 242 is turned off, the power reception side capacitance that determines the resonance frequency of the resonance circuit RR is the capacitor $R_C$ itself. Since the capacitor 241 is connected in parallel to the capacitor $R_C$ when the switch 242 is turned on, the resonance circuit RR is formed of the coil $R_L$ and the combined capacitance of the capacitors $R_C$ and 241. As a result, the resonance frequency of the resonance circuit RR is the frequency $f_M$ lower than the reference frequency. That is to say, when the switch 242 is turned on, the power reception side capacitance that determines the resonance frequency of the resonance circuit RR is the above-described combined capacitance. Now, it is assumed that the frequency $f_M$ is away from the reference frequency to the extent that when the switch 242 is turned on, the resonance circuit RR does not function as a load of the power transmission side coil $T_L$ (i.e., to the extent that magnetic resonance does not occur sufficiently between the resonance circuits TT and RR). For example, the resonance frequency (i.e., the frequency $f_M$) of the resonance circuit RR when the switch 242 is turned on is several hundred kHz to 1 MHz.

As long as the resonance frequency of the resonance circuit RR can be changed to the frequency $f_M$, the resonance frequency changing circuit as the changing circuit 240 is not limited to the resonance frequency changing circuit 240A, and the frequency $f_M$ may be higher than the reference frequency. That is to say, considering that the power reception side resonance circuit RR may be a series resonance circuit, the following can be said. The power reception side resonance circuit RR includes a parallel circuit or a series circuit of the power reception side coil $R_L$ and the power reception side capacitance. When the power reception side capacitance coincides with a predetermined reference capacitance, the resonance frequency $f_O$ of the power reception side resonance circuit RR coincides with the reference frequency. The resonance frequency changing circuit increases or decreases the power reception side capacitance from the reference capacitance at a necessary timing. Thus, in the power reception side resonance circuit RR, a parallel circuit or a series circuit is formed with the power reception side coil $R_L$ and the power reception side capacitance is larger or smaller than the reference capacitance. As a result, the resonance frequency $f_O$ of the power reception side resonance circuit RR is changed from the reference frequency.

Figure 10:
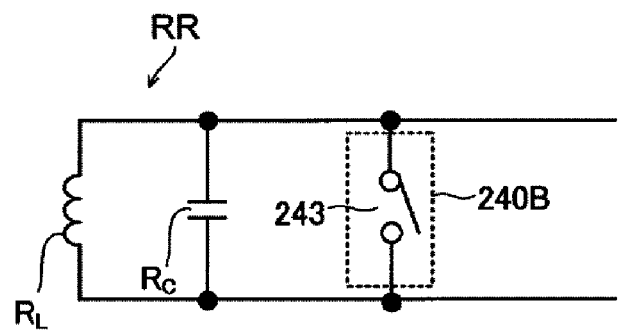
FIG. 10 is a circuit diagram showing another example of the resonance state changing circuit according to the first embodiment of the present disclosure.

The coil short-circuiting circuit 240B shown in FIG. 10 is an example of a coil short-circuiting circuit as the resonance state changing circuit 240. The coil short-circuiting circuit 240B is formed of a switch 243 connected (inserted) between a node to which one end of the capacitor $R_C$ and one end of the coil $R_L$ in the resonance circuit RR are commonly connected and a node to which the other end of the capacitor $R_C$ and the other end of the coil $R_L$ in the resonance circuit RR are commonly connected. The switch 243 is turned on or off under the control of the control circuit 250. When the switch 243 is turned on, the coil $R_L$ in the resonance circuit RR is short-circuited (more specifically, both ends of the coil $R_L$ are short-circuited). In the state in which the power reception side coil $R_L$ is short-circuited, the power reception side resonance circuit RR does not exist (there is available a state equivalent to the state in which the power reception side resonance circuit RR does not exist). Therefore, when the power reception side coil $R_L$ is short-circuited, the load on the power transmission side coil $T_L$ becomes sufficiently light (namely, there is a state in which the electronic device 2 does not exist on the power supply base 12). As long as the power reception side coil $R_L$ can be short-circuited, the coil short-circuiting circuit as the changing circuit 240 is not limited to the coil short-circuiting circuit 240B.

Hereinafter, the operation of changing the resonance frequency $f_O$ of the power reception side resonance circuit RR from the reference frequency to the predetermined frequency $f_M$ will be referred to as a resonance frequency changing operation, and the operation of short-circuiting the power reception side coil $R_L$ using the coil short-circuiting circuit will be referred to as a coil short-circuiting operation. In addition, for the sake of simplicity of description, the resonance frequency changing operation or the coil short-circuiting operation will be often referred to as $f_O$ changing/short-circuiting operation.

The memory 260 (see FIG. 5) is configured to include a nonvolatile memory and a volatile memory and is capable of storing arbitrary information. The control circuit 250 (see FIG. 5) comprehensively controls the operation of each part in the IC 200. The control performed by the control circuit 250 includes, for example, the control of a switching operation of the switching circuit 210, the control of the contents and execution or non-execution of a communication operation and a power reception operation by the communication circuit 220 and the power reception circuit 230, the control of an operation of the changing circuit 240, and the control of storage and readout of the memory 260. The control circuit 250 includes a built-in timer (not shown) and can measure the time length between arbitrary timings. For example, the timer in the control circuit 250 can perform the measurement of the time during which the changing of the resonance frequency $f_O$ to the predetermined frequency $f_M$ or the short-circuiting of the power reception side coil $R_L$ is maintained by the $f_O$ changing/short-circuiting operation (i.e., the measurement of the time $T_M$ to be described later; see step S207 in FIG. 19).

In addition, the control circuit 150 can determine the presence or absence of a foreign object on the power supply base 12 and can control the power transmission circuit 130 so as to perform the power transmission operation only when there is no foreign object. Unlike the electronic device 2 and the components of the electronic device 2 (such as the power reception side coil $R_L$, etc.), the foreign object in the present embodiment includes an object that when approaching the power supply device 1, generates a current (a current within a foreign object) based on the magnetic field generated by the power transmission side coil $T_L$. In the present embodiment, the presence of a foreign object may mean that a foreign object exists at a position where a current which is not negligible flows through the foreign object based on the magnetic field generated by the power transmission side coil $T_L$. The current flowing through the foreign object based on the magnetic field generated by the power transmission side coil $T_L$ generates an electromotive force (or a counter electromotive force) in the coil ($T_L$ or $R_L$) opposed to and coupled to the foreign object. Thus, an influence which is not negligible may be given to the characteristics of the circuit including the coil.

Figure 11A:
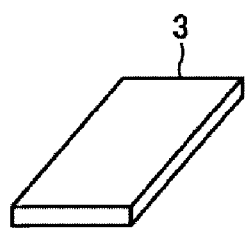
FIGS. 11A and 11B are a schematic outline diagram and a schematic internal configuration diagram of a foreign object according to the first embodiment of the present disclosure.
Figure 11B:
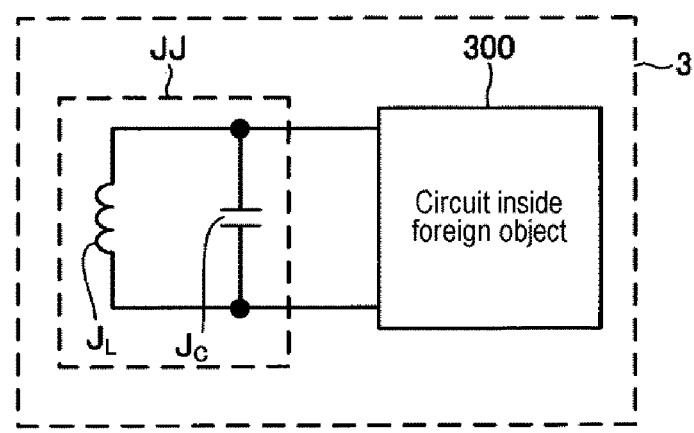

FIG. 11A is a schematic outline view of a foreign object 3 which is a kind of foreign object, and FIG. 11B is a schematic internal configuration diagram of the foreign object 3. The foreign object 3 includes a resonance circuit JJ composed of a parallel circuit of a coil $J_L$ and a capacitor $J_C$, and a circuit 300 inside the foreign object 3 connected to the resonance circuit JJ. The resonance frequency of the resonance circuit JJ is set to a reference frequency. Unlike the electronic device 2, the foreign object 3 is a device that does not correspond to the power supply device 1. For example, the foreign object 3 is an object (a non-contact IC card or the like) including a wireless IC tag having an antenna coil (coil $J_L$) of 13.56 MHz which does not respond to NFC communication. Furthermore, for example, the foreign object 3 is an electronic device having an NFC communication function which is invalid. For example, a smart phone having an NFC communication function which is turned off by the software setting may become the foreign object 3. In addition, a smart phone having a valid NFC communication function and not having a power reception function is also classified as the foreign object.

If the power supply device 1 performs a power transmission operation in a state in which such a foreign object 3 is disposed on the power supply base 12, the foreign object 3 may be destroyed by a strong magnetic field generated by the power transmission side coil $T_L$ (for example, a magnetic field having a magnetic field intensity of 12A/m or greater). For example, the strong magnetic field during the power transmission operation may increase the terminal voltage of the coil $J_L$ of the foreign object 3 on the power supply base 12 to 100 V to 200 V. Unless the foreign object 3 is formed so as to withstand such a high voltage, the foreign object 3 is destroyed.

[pFOD Processing (pFOD Processing Before Power Transmission)]

Foreign object detection processing for detecting the presence or absence of a foreign object will be described with reference to FIG. 12. FIG. 12 is a flowchart of foreign object detection processing (hereinafter referred to as pFOD processing) executed by the power supply device 1 before power transmission.

When the pFOD processing is executed, the power transmission circuit 130 is connected to the resonance circuit TT. In the pFOD processing, the control circuit 150 first sets the magnetic field intensity H by the power transmission side coil $T_L$ to predetermined test intensity in step S11. The magnetic field intensity H is the generated magnetic field intensity of the power transmission side coil $T_L$ and, more specifically, denotes the magnetic field intensity of the alternating magnetic field generated by the power transmission side coil $T_L$ and oscillating at the reference frequency. Setting the magnetic field intensity H to the test intensity means controlling the power transmission circuit 130 so that a predetermined test AC signal (test AC voltage) is supplied to the resonance circuit TT, whereby a test magnetic field which is an alternating magnetic field having test intensity and oscillating at the reference frequency is generated in the power transmission side coil $T_L$. The test intensity which is the magnetic field intensity of the test magnetic field is considerably smaller than the generated magnetic field intensity of the power transmission side coil $T_L$ (i.e., the magnetic field intensity of the power transmission magnetic field; for example, 45 to 60 A/m) in the power transmission (i.e., the power transmission operation) and falls within a range of from a lower limit value "1.5 A/m" of the communication magnetic field intensity to an upper limit value "7.5 A/m" thereof. Therefore, there is no or little possibility that the foreign object 3 is damaged by the test magnetic field. The control circuit 150 can variably set the magnetic field intensity H by controlling the amplification factor of the amplifier 132 (see FIG. 7). In the case of generating the test magnetic field, the amplification factor of the amplifier 132 may be controlled so that a predetermined test AC voltage is supplied and applied to the resonance circuit TT. In the case of generating the power transmission magnetic field, the amplification factor of the amplifier 132 may be controlled so that a predetermined power transmission AC voltage having an amplitude larger than the test AC voltage is supplied and applied to the resonance circuit TT.

In step S12 following step S11, the control circuit 150 uses the load detection circuit 140 to acquire a voltage value $V_D$ when the test magnetic field is being generated, as a current amplitude detection value $V_{pFOD}$. The current amplitude detection value $V_{pFOD}$ has a value corresponding to the amplitude of the current flowing through the power transmission side coil $T_L$ when the test magnetic field is generated in the power transmission side coil $T_L$. During the period in which the pFOD processing is executed, the $f_O$ changing/short-circuiting operation (the resonance frequency changing operation or the coil short-circuiting operation) is executed in the electronic device 2 in response to an instruction supplied from the power supply device 1 via NFC communication. Therefore, the resonance circuit RR (the power reception side coil $R_L$) does not substantially function as a load of the power transmission side coil $T_L$ and causes no or little reduction in the current amplitude detection value $V_{pFOD}$.

In step S13 following step S12, the control circuit 150 determines whether the current amplitude detection value $V_{pFOD}$ falls within a predetermined pFOD normal range. Then, when the current amplitude detection value $V_{pFOD}$ falls within the pFOD normal range, the control circuit 150 determines that the foreign object 3 is not present on the power supply base 12 (step S14). This determination is referred to as foreign object absence determination. On the other hand, when the current amplitude detection value $V_{pFOD}$ deviates from the pFOD normal range, the control circuit 150 determines that the foreign object 3 is present on the power supply base 12 (step S15). This determination is referred to as foreign object presence determination. When the foreign object absence determination is rendered, the control circuit 150 determines that it is possible to execute the power transmission operation by the power transmission circuit 130, and permits the execution of the power transmission operation (the power transmission using the resonance circuit TT). When the foreign object presence determination is rendered, the control circuit 150 determines that the execution of the power transmission operation by the power transmission circuit 130 is impossible, and prohibits the execution of the power transmission operation. When it is determined that the power transmission operation can be executed, in the power transmission operation, the control circuit 150 may control the power transmission circuit 130 so that a predetermined power transmission magnetic field is generated in the power transmission side coil $T_L$.

The pFOD normal range is a range between a predetermined lower limit value $V_{pREFL}$ and a predetermined upper limit value $V_{pREFH}$ ($0<V_{pREFL}<V_{pREFH}$). Therefore, if a determination inequality "$V_{pREF}\leq V_{pFOD}\leq V_{pREFH}$" is satisfied, the foreign object absence determination is rendered. If not, the foreign object presence determination is rendered.

When the foreign object 3 is present on the power supply base 12 at the time of executing the pFOD processing, the resonance circuit JJ (the coil $J_L$) of the foreign object 3 functions as a load of the power transmission side coil $T_L$. As a result, the current amplitude detection value $V_{pFOD}$ decreases as compared with a case where the foreign object 3 is not present on the power supply base 12.

Furthermore, as the foreign object, a foreign object 3a (not shown) different from the foreign object 3 is also conceivable. The foreign object 3a is, for example, a metal body formed of aluminum (an aluminum foil or an aluminum plate) or a metal body formed of copper. When the foreign object 3a is present on the power supply base 12 at the time of execution of the pFOD processing, as compared with a case where the foreign object 3a is not present on the power supply base 12, the current amplitude detection value $V_{pFOD}$ increases due to electrical and magnetic actions.

Before executing the power transmission, a lower limit value $V_{pREFL}$ and an upper limit value $V_{pREFH}$ are preset and stored in the memory 160 through experiments or the like so that the current amplitude detection value $V_{pFOD}$ is lower than the lower limit value $V_{pREFL}$ when the foreign object 3 is present on the power supply base 12, the current amplitude detection value $V_{pFOD}$ is higher than the upper limit value $V_{pREFH}$ when the foreign object 3a is present on the power supply base 12, and the current amplitude detection value $V_{pFOD}$ falls within the pFOD normal range when the foreign object 3 or 3a is not present on the power supply base 12. The lower limit value $V_{pREFL}$ and the upper limit value $V_{pREFH}$ are stored in the nonvolatile memory in the memory 160 so as to be held in the memory 160 even when the power supply of the power supply device 1 is cut off.

Incidentally, if a power transmission magnetic field is generated in a state in which the foreign object 3a is present on the power supply base 12, electric power is absorbed by the foreign object 3a. Thus, there is a possibility that the foreign object 3a generates heat. In the present embodiment, it is assumed that the reference frequency as the carrier wave frequency for power transmission is 13.56 MHz. Therefore, it can be said that the possibility of such heat generation is sufficiently low. Accordingly, without considering the presence of the foreign object 3a, foreign object presence determination may be rendered only when the current amplitude detection value $V_{pFOD}$ falls below the lower limit value $V_{pREFL}$. Foreign object absence determination may always be rendered when the current amplitude detection value $V_{pFOD}$ is not less than the lower limit value $V_{pREFL}$, (that is to say, the upper limit value $V_{pREFH}$ may be eliminated). However, in the present disclosure, the reference frequency is not limited to 13.56 MHz. In the case where the reference frequency is set to, for example, several hundred kHz, the possibility of heat generation of the foreign object 3a increases. Therefore, it is desirable to adopt the abovementioned method in which not only the lower limit value $V_{pREFL}$ but also the upper limit value $V_{pREFH}$ is used to define the pFOD normal range.

Figure 13:
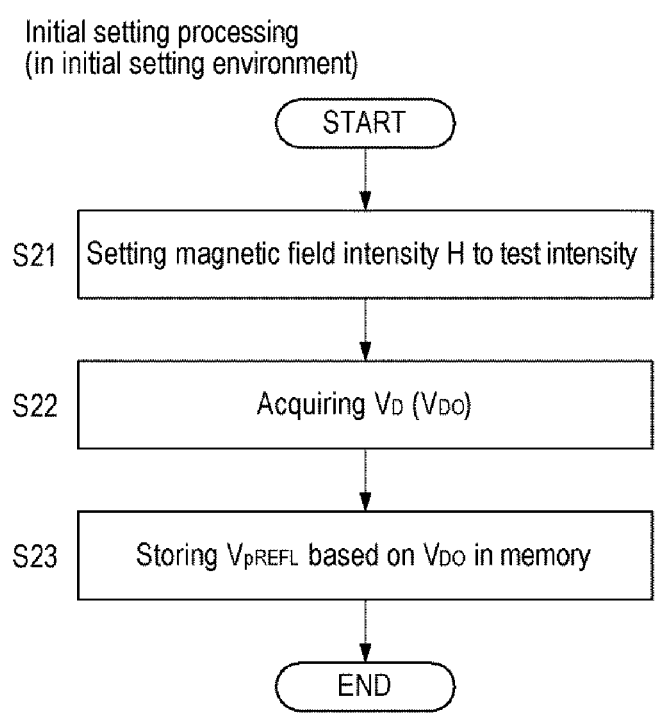
FIG. 13 is an operation flowchart of initial setting processing executed by a power supply device.

A method of determining the lower limit value $V_{pREFL}$ will be described. The lower limit value $V_{pREFL}$ is determined by initial setting processing. FIG. 13 is an operation flowchart of the initial setting processing. The initial setting processing is executed by the IC 100 under the following initial setting environment. In the initial setting environment, an object (including a coil magnetically coupled to the power transmission side coil $T_L$) which has no or a negligibly small load with respect to the power transmission side coil $T_L$ and which generates a current due to the magnetic field generated by the power transmission side coil $T_L$ is not present except for the components of the power supply device 1. The separated state shown in FIG. 1A may be considered to satisfy the initial setting environment. In order to guarantee the initial setting environment, the initial setting processing may be performed, for example, at the time of manufacturing or shipping the power supply device 1. However, the initial setting processing may be performed at an arbitrary timing as long as the initial setting environment can be secured.

When the initial setting processing is executed, the power transmission circuit 130 is connected to the resonance circuit TT. In step S21, the magnetic field intensity H by the power transmission side coil $T_L$ is set to a predetermined test intensity. In the subsequent step S22, the voltage value $V_D$ acquired from the A/D converter 144 in the setting state is set as a voltage value $V_{DO}$. In the subsequent step S23, the lower limit value $V_{pREFL}$ based on the voltage value $V_{DO}$ is stored in the memory 160. The lower limit value $V_{pREFL}$ is set to a value lower than the voltage value $V_{DO}$ so that foreign object presence determination is rendered in the pFOD processing only under the presence of the foreign object 3. For example, it is preferable that "$V_{pREFL}=V_{DO}-\Delta V$" or "$V_{pREFL}=V_{DO}\times k$". $\Delta V$ is a predetermined positive minute value (however, $\Delta V$ may be set to 0). k is a coefficient having a positive predetermined value less than 1. The voltage value $V_D$ that can be obtained when the magnetic field intensity H is set to a predetermined test intensity under the initial setting environment may be estimated at the design stage. The lower limit value $V_{pREFL}$ may be determined based on the value derived by this estimation and may be stored in the memory 160 without performing the initial setting processing.

First to fourth cases concerning the detection of the foreign object 3 will be considered with reference to FIGS. 14A to 14D. In the first case, only the electronic device 2 is present on the power supply base 12. In the second case, the electronic device 2 and the foreign object 3 are present on the power supply base 12. In the third case, only the foreign object 3 is present on the power supply base 12. In the fourth case, neither the electronic device 2 nor the foreign object 3 is present on the power supply base 12.

As described above, the $f_O$ changing/short-circuiting operation is executed in the electronic device 2 during the period in which the pFOD processing is executed. Therefore, in the first case, the load on the power transmission side coil $T_L$ is sufficiently reduced (that is to say, there is an available state in which the electronic device 2 is not present on the power supply base 12), the current amplitude detection value $V_{pFOD}$ becomes sufficiently large, and the foreign object absence determination is rendered. On the other hand, in the second case, the resonance frequency of the resonance circuit RR is changed to the frequency $f_M$ or the power reception side coil $R_L$ is short-circuited. However, the foreign object 3 continues to exist as a load of the power transmission side coil $T_L$ (the resonance frequency of the resonance circuit JJ of the foreign object 3 remains at the reference frequency). Therefore, the current amplitude detection value $V_{pFOD}$ becomes sufficiently small, and the foreign object presence determination is rendered.

Figure 15:
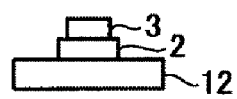
FIG. 15 is a view showing one arrangement relationship of a power supply base, an electronic device and a foreign object.

In the third and fourth cases, the electronic device 2 responding to the NFC communication is not present on the power supply base 12. Therefore, the power transmission operation is unnecessary and, hence, the pFOD processing itself is not executed. The power supply device 1 can determine through the NFC communication whether the electronic device 2 capable of coping with power transmission is present on the power supply base 12. The state in which the foreign object 3 is present on the power supply base 12 is not limited to a state in which the foreign object 3 makes direct contact with the power supply base 12. For example, as shown in FIG. 15, the state in which the electronic device 2 is present in direct contact with the power supply base 12 and the foreign object 3 is present on the electronic device 2 also belongs to the state in which the foreign object 3 is present on the power supply base 12, as long as the foreign object presence determination is rendered.

Figure 16:
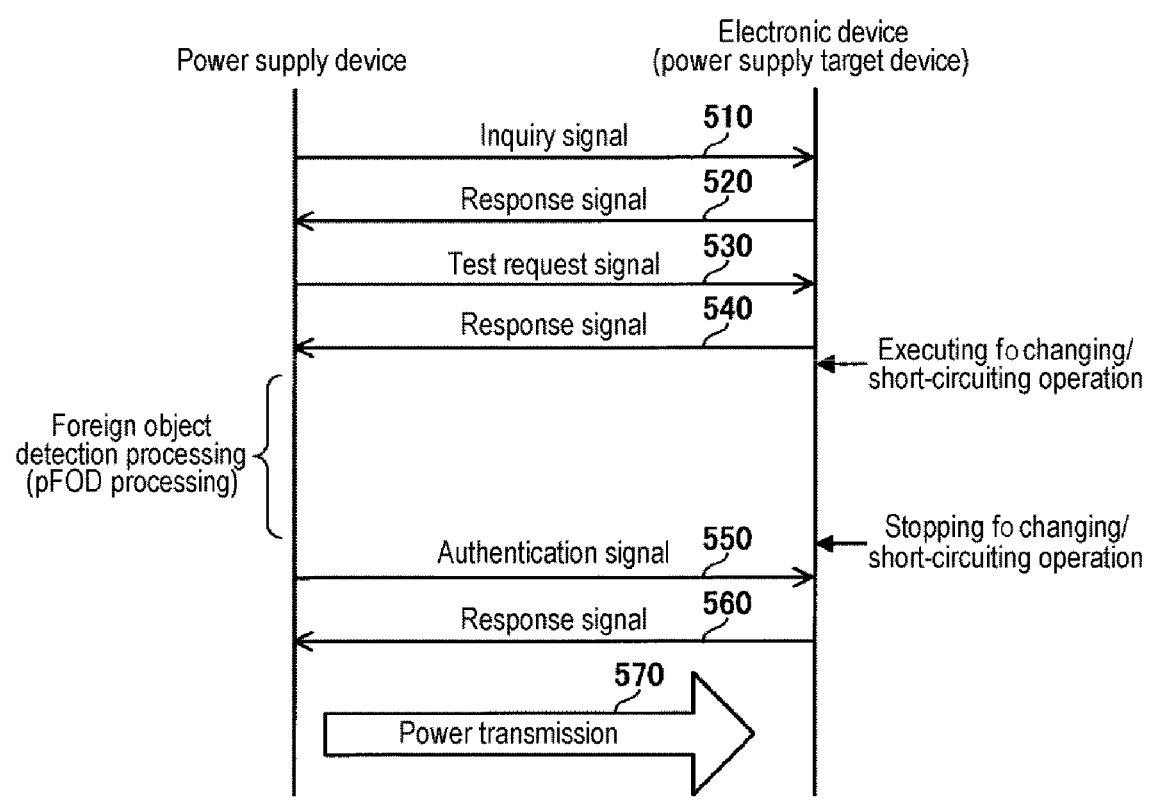
FIG. 16 is a view for explaining signal exchange between a power supply device and an electronic device according to the first embodiment of the present disclosure.

[Signal Exchange Until Power Transmission: FIG. 16]

The exchange of signals between the devices 1 and 2 until the power transmission is performed will be described with reference to FIG. 16. In the following description, unless specifically mentioned otherwise, it is assumed that the electronic device 2 is present on the power supply base 12 in the reference arrangement state (FIG. 1B).

First, the power supply device 1 becomes the transmission side and the electronic device 2 becomes the reception side. The power supply device 1 (IC 100) transmits an inquiry signal 510 to the device on the power supply base 12 (hereinafter also referred to as a power supply target device) through NFC communication. The power supply target device includes the electronic device 2 and may include the foreign object 3. The inquiry signal 510 includes, for example, a signal for inquiring the unique identification information of the power supply target device, a signal for inquiring whether the power supply target device is in a state capable of executing NFC communication, and a signal for inquiring whether the power supply target device is capable of receiving electric power or is requesting transmission of electric power.

Upon receiving the inquiry signal 510, the electronic device 2 (IC 200) transmits a response signal 520 responding to the inquiry contents of the inquiry signal 510 to the power supply device 1 through NFC communication. Upon receiving the response signal 520, the power supply device 1 (IC 100) analyzes the response signal 520. When the power supply target device is capable of making NFC communication and when the power supply target device is capable of receiving electric power or is requesting transmission of electric power, the power supply device 1 transmits a test request signal 530 to the power supply target device through NFC communication. The electronic device 2 (IC 200) as the power supply target device which has received the test request signal 530 transmits a response signal 540 responding to the test request signal 530 to the power supply device 1 through NFC communication and then promptly executes the $f_O$ changing/short-circuiting operation (a resonance frequency changing operation or a coil short-circuiting operation). The test request signal 530 is, for example, a signal requesting and instructing execution of the $f_O$ changing/short-circuiting operation. The control circuit 250 of the electronic device 2 causes the resonance state changing circuit 240 to execute the $f_O$ changing/short-circuiting operation using the reception of the test request signal 530 as a trigger. Before receiving the test request signal 530, the $f_O$ changing/short-circuiting operation is not executed. The test request signal 530 may be any signal as long as it serves as a trigger for executing the $f_O$ changing/short-circuiting operation. The test request signal 530 may be included in the inquiry signal 510.

Upon receiving the response signal 540, the power supply device 1 (IC 100) executes the pFOD processing described above. During the execution of the pFOD processing, the electronic device 2 (IC 200) continues to execute the $f_O$ changing/short-circuiting operation. Specifically, the electronic device 2 (IC 200) uses the built-in timer to maintain the execution of the $f_O$ changing/short-circuiting operation for a period of time corresponding to the length of the execution period of the pFOD processing. Thereafter, the electronic device 2 (IC 200) stops the $f_O$ changing/short-circuiting operation.

In the pFOD processing, if it is determined that there is no foreign object on the power supply base 12, the power supply device 1 (IC 100) transmits an authentication signal 550 to the power supply target device through NFC communication. The authentication signal 550 includes, for example, a signal notifying the power supply target device that power transmission is to be performed from now. Upon receiving the authentication signal 550, the electronic device 2 (IC 200) transmits a response signal 560 responding to the authentication signal 550 to the power supply device 1 through NFC communication. The response signal 560 includes, for example, a signal notifying that the content indicated by the authentication signal 550 is recognized or a signal giving permission to the content indicated by the authentication signal 550. Upon receiving the response signal 560, the power supply device 1 (IC 100) connects the power transmission circuit 130 to the resonance circuit TT and executes a power transmission operation, whereby power transmission 570 is realized.

Figure 14A:
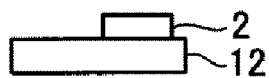
FIGS. 14A to 14D are views illustrating arrangement relationships of a power supply base, an electronic device and a foreign object.
Figure 14B:
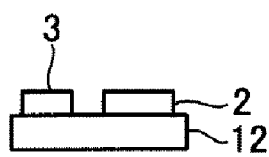
Figure 14C:
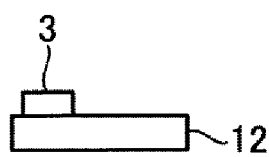
Figure 14D:
Figure 17:
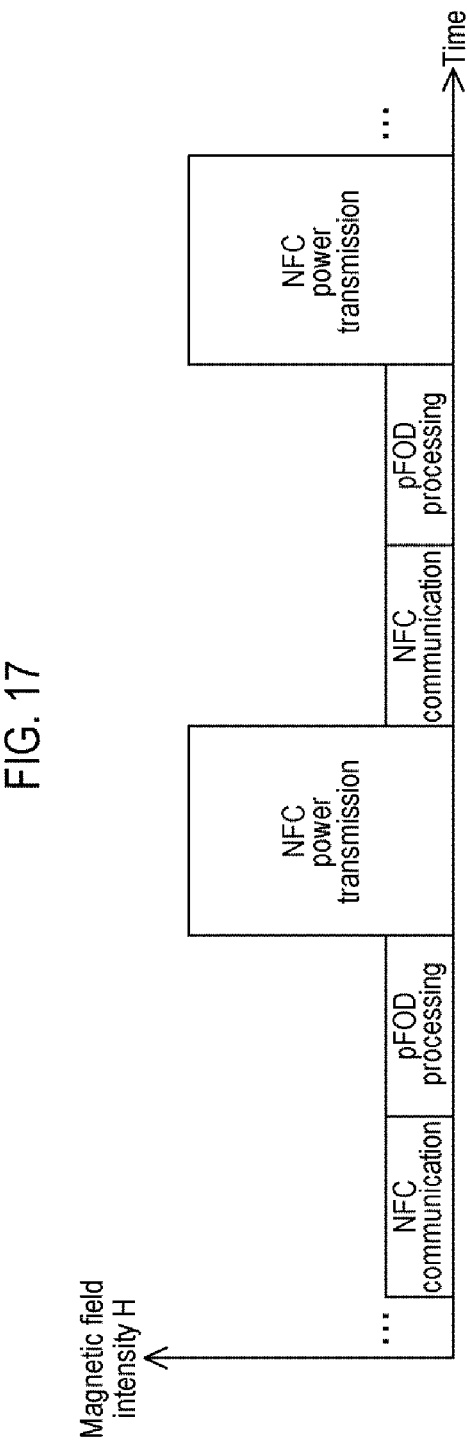
FIG. 17 is a view showing how NFC communication, pFOD processing and power transmission are repeatedly executed in order according to the first embodiment of the present disclosure.

In the first case shown in FIG. 14A, the power transmission 570 is executed according to the flow described above. In the case of the second case shown in FIG. 14B, the processing proceeds until the transmission and reception of the response signal 540. However, the power transmission 570 is not executed because it is determined that a foreign object is present on the power supply base 12 in the pFOD processing. The power transmission 570 may be performed once only for a predetermined time period, or a series of processes from the transmission of the inquiry signal 510 to the power transmission 570 may be repeatedly executed. Actually, as shown in FIG. 17, the NFC communication, the pFOD processing and the power transmission (NFC power transmission) may be executed sequentially and repeatedly. That is to say, in the non-contact power supply system, an operation of performing the NFC communication, an operation of performing the pFOD processing and an operation of performing the power transmission (NFC power transmission) may be performed sequentially and repeatedly in a time divisional manner.

[Operation Flowchart of Power Supply Device and Electronic Device]

Figure 18:
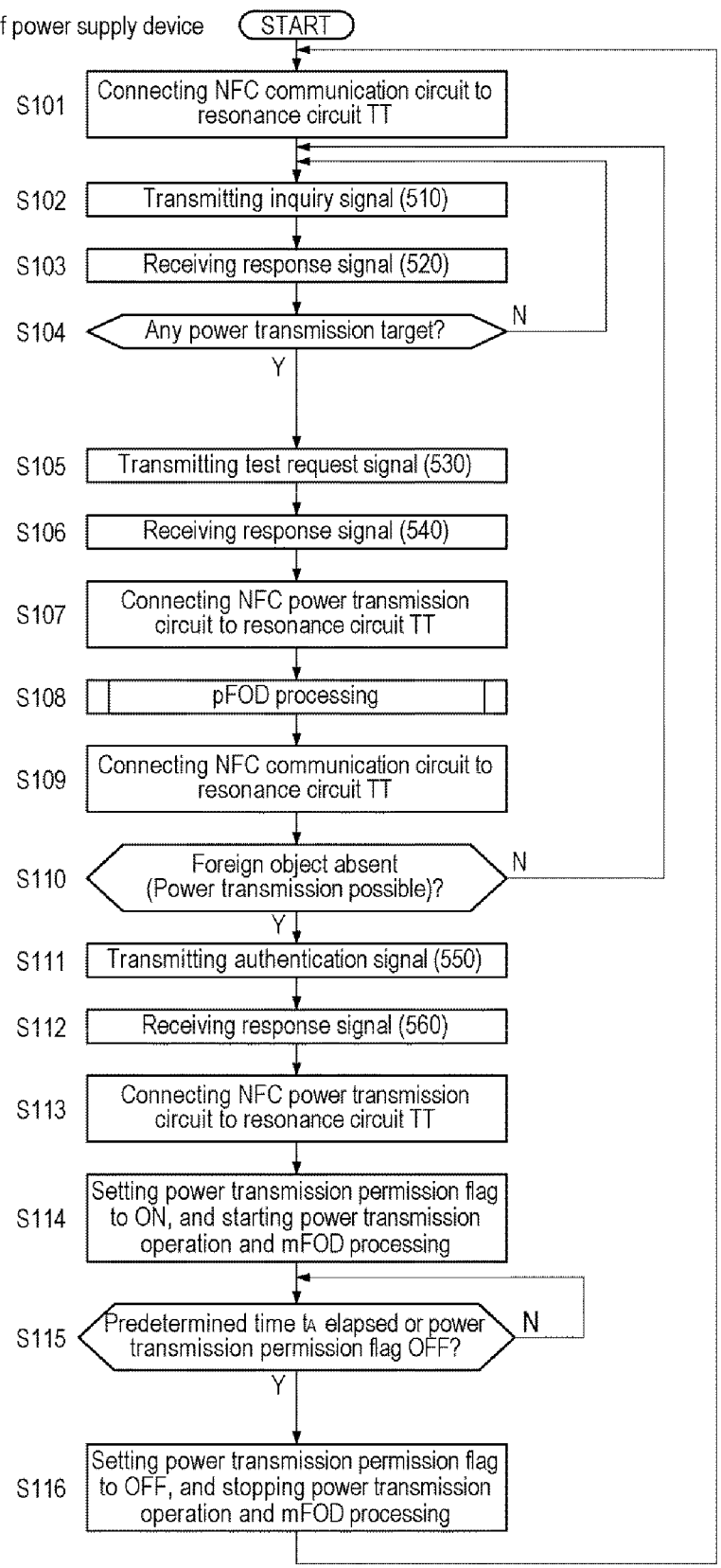
FIG. 18 is an operation flowchart of a power supply device according to the first embodiment of the present disclosure.

Next, the flow of the operation of the power supply device 1 will be described. FIG. 18 is an operation flowchart of the power supply device 1 according to a first embodiment. The operations of the communication circuit 120 and the power transmission circuit 130 are executed under the control of the control circuit 150 (hereinafter also referred to as a power transmission side control circuit 150).

When the power supply device 1 is started up, in step S101, the power transmission side control circuit 150 first connects the communication circuit 120 to the resonance circuit TT through the control of the switching circuit 110. In the subsequent step S102, the power transmission side control circuit 150 transmits the inquiry signal 510 to the power supply target device by NFC communication using the communication circuit 120 and the resonance circuit TT. Thereafter, in step S103, the power transmission side control circuit 150 waits for reception of the response signal 520. When the response signal 520 is received by the communication circuit 120, the power transmission side control circuit 150 analyzes the response signal 520. If the power supply target device is capable of making NFC communication and if the power supply target device is capable of receiving electric power or is requesting transmission of electric power, the power transmission side control circuit 150 determines that there is a power transmission target ("Y" in step S104). The process proceeds to step S105. If not ("N" in step S104), the process returns to step S102.

In step S105, the power transmission side control circuit 150 transmits the test request signal 530 to the power supply target device by the NFC communication using the communication circuit 120 and the resonance circuit TT. Thereafter, in step S106, the power transmission side control circuit 150 waits for reception of the response signal 540. When the response signal 540 is received by the communication circuit 120, in step S107, the power transmission side control circuit 150 connects the power transmission circuit 130 to the resonance circuit TT through the control of the switching circuit 110. In the subsequent step S108, the pFOD processing described above is performed.

After the pFOD processing, in step S109, the power transmission side control circuit 150 connects the communication circuit 120 to the resonance circuit TT through the control of the switching circuit 110. Then, the process proceeds to step S110. In the pFOD processing of step S108, if foreign object presence determination is rendered, the process returns from step S110 to step S102. However, if foreign object absence determination is rendered, the process proceeds from step S110 to step S111.

In step S111, the power transmission side control circuit 150 transmits the authentication signal 550 to the power supply target device by the NFC communication using the communication circuit 120 and the resonance circuit TT. Thereafter, in step S112, the power transmission side control circuit 150 waits for reception of the response signal 560. When the response signal 560 is received by the communication circuit 120, in step S113, the power transmission side control circuit 150 connects the power transmission circuit 130 to the resonance circuit TT through the control of the switching circuit 110. Then, the process proceeds to step S114.

In step S114, the power transmission side control circuit 150 sets ON in a power transmission permission flag and starts the power transmission operation and the mFOD processing. Thereafter, the process proceeds to step S115. Although details will be described later, the presence or absence of a foreign object (the presence or absence of a possibility of presence of a foreign object) during power transmission is detected by the mFOD processing. If the possibility of presence of a foreign object is recognized, the power transmission permission flag is turned OFF. The power transmission side control circuit 150 measures the elapsed time from the start point of the power transmission operation. In step S115, the power transmission side control circuit 150 compares the elapsed time with a predetermined time $t_A$ (for example, 10 minutes) and checks the state of the power transmission permission flag. If the elapsed time reaches the predetermined time $t_A$ or if the power transmission permission flag is set to OFF by the mFOD processing, the process proceeds to step S116. In step S116, the power transmission side control circuit 150 switches the power transmission permission flag from ON to OFF or keeps the power transmission permission flag OFF. The power transmission side control circuit 150 stops the power transmission operation and the mFOD processing. Thereafter, the process returns to step S101.

Figure 19:
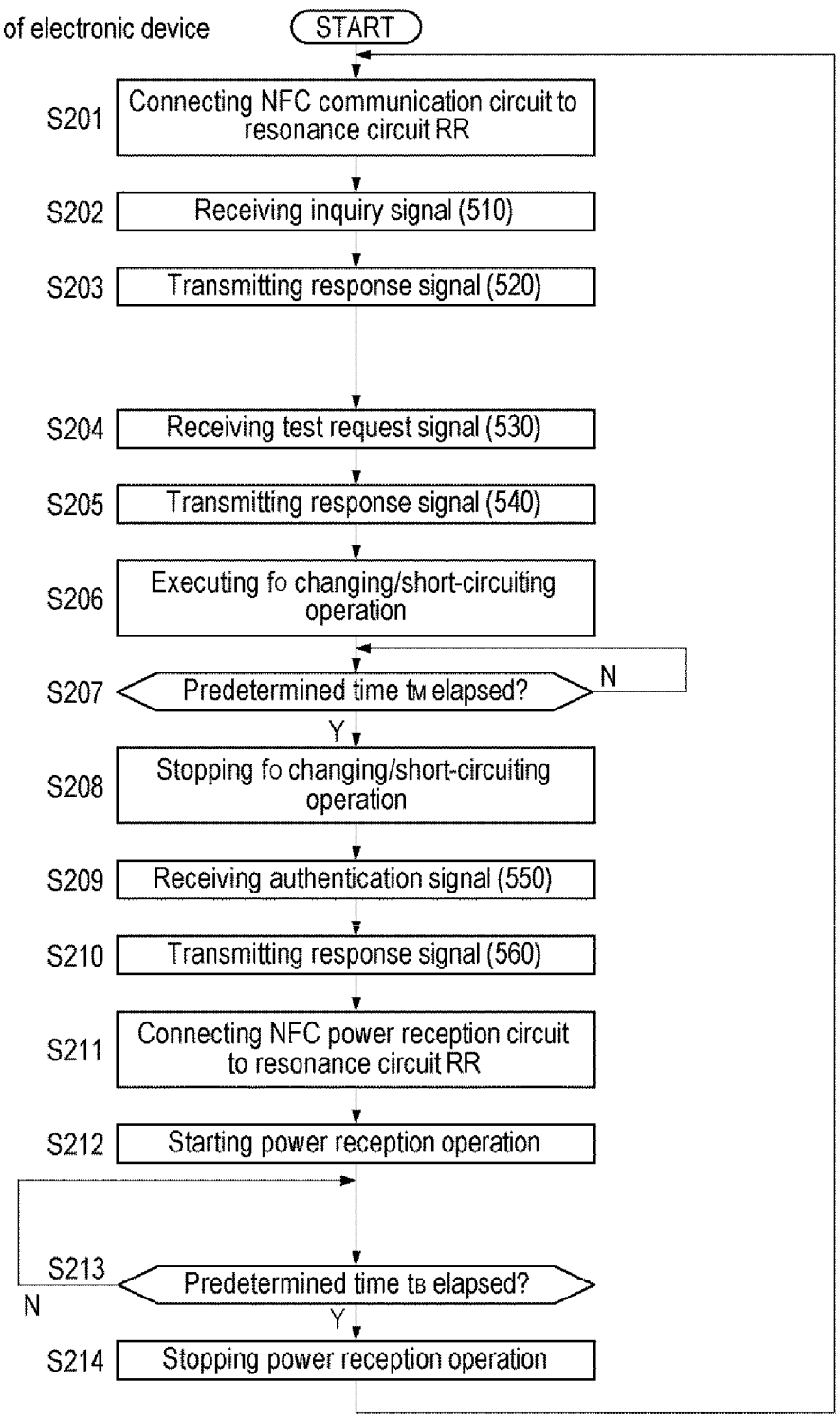
FIG. 19 is an operation flowchart of an electronic device according to the first embodiment of the present disclosure.

Next, the flow of the operation of the electronic device 2 will be described. FIG. 19 is an operation flowchart of the electronic device 2 according to the first embodiment. The processes starting from step S201 are executed in conjunction with the operation of the power supply device 1 shown in FIG. 18. The operations of the communication circuit 220 and the power reception circuit 230 are executed under the control of the control circuit 250 (hereinafter also referred to as the power reception side control circuit 250).

When the electronic device 2 is started up, in step S201, the power reception side control circuit 250 first connects the communication circuit 220 to the resonance circuit RR through control of the switching circuit 210. At the time of activation of the electronic device 2, the $f_O$ changing/short-circuiting operation is not executed. In the subsequent step S202, the power reception side control circuit 250 waits for reception of the inquiry signal 510 by using the communication circuit 220. When the inquiry signal 510 is received by the communication circuit 220, in step S203, the power reception side control circuit 250 analyzes the inquiry signal 510 to generate a response signal 520. The power reception side control circuit 250 transmits the response signal 520 to the power supply device 1 by the NFC communication using the communication circuit 220. At this time, the power reception side control circuit 250 checks the state of the battery 21. If the battery 21 is not in the fully charged state and if no abnormality is recognized in the battery 21, the power reception side control circuit 250 causes the response signal 520 to include a signal indicating that electric power is receivable or transmission of electric power is requested. On the other hand, if the battery 21 is in a fully charged state or if an abnormality is found in the battery 21, the power reception side control circuit 250 causes the response signal 520 to include a signal indicating that electric power is not receivable.

When the test request signal 530 is received by the communication circuit 220 in the subsequent step S204, the process proceeds to step S205. In step S205, the power reception side control circuit 250 transmits the response signal 540 to the power supply device 1 by NFC communication using the communication circuit 220. In the subsequent step S206, the power reception side control circuit 250 executes the $f_O$ changing/short-circuiting operation using the resonance state changing circuit 240. That is to say, the resonance frequency $f_O$ is changed from the reference frequency to the frequency $f_M$, or the power reception side coil $R_L$ is short-circuited. The power reception side control circuit 250 measures the elapsed time from the start of execution of the $f_O$ changing/short-circuiting operation (step S207), and stops the $f_O$ changing/short-circuiting operation when the elapsed time reaches a predetermined time $t_M$ (step S208). That is to say, the resonance frequency $f_O$ is returned to the reference frequency, or the short-circuiting of the power reception side coil $R_L$ is canceled. Thereafter, the process proceeds to step S209. The time $t_M$ is preset so that the execution of the $f_O$ changing/short-circuiting operation is maintained during the period in which the pFOD processing is being executed in the power supply device 1 (i.e., the period in which the test magnetic field is being generated) and so that the $f_O$ changing/short-circuiting operation is rapidly stopped when the period terminates. The time $t_M$ may be specified in the test request signal 530.

In step S209, the power reception side control circuit 250 waits for reception of the authentication signal 550 by using the communication circuit 220. When the authentication signal 550 is received by the communication circuit 220, in step S210, the power reception side control circuit 250 transmits the response signal 560 responding to the authentication signal 550 to the power supply device 1 by NFC communication using the communication circuit 220. Incidentally, when a foreign object is present on the power supply base 12, the authentication signal 550 is not transmitted from the power supply device 1 (see step S110 in FIG. 18). Therefore, if the authentication signal 550 is not received for a certain time in step S209, the process may return to step S201.

After transmitting the response signal 560, in step S211, the power reception side control circuit 250 connects the power reception circuit 230 to the resonance circuit RR through the control of the switching circuit 210. In the subsequent step S212, the power reception side control circuit 250 starts the power reception operation using the power reception circuit 230. The power reception side control circuit 250 measures the elapsed time from the start point of the power reception operation and compares the elapsed time with a predetermined time $t_B$ (step S213). Then, when the elapsed time reaches the time $t_B$ ("Y" in step S213), in step S214, the power reception side control circuit 250 stops the power reception operation. The process returns to step S201.

The time $t_B$ is predetermined or specified in the authentication signal 550 so that the period in which the power reception operation is performed substantially coincides with the period in which the power transmission operation is performed in the power supply device 1. After the start of the power reception operation, the power reception side control circuit 250 may monitor the charging current flowing to the battery 21, may determine that the power transmission operation has ended when a charging current value becomes equal to or smaller than a predetermined value, and may stop the power reception operation and the shift to step S201.

[mFOD Processing]

A foreign object may be placed on the power supply base 12 after the start of the power transmission operation. The mFOD processing functions as foreign object detection processing during power transmission. The presence or absence of a foreign object during power transmission is continuously monitored by the mFOD processing.

Figure 20:
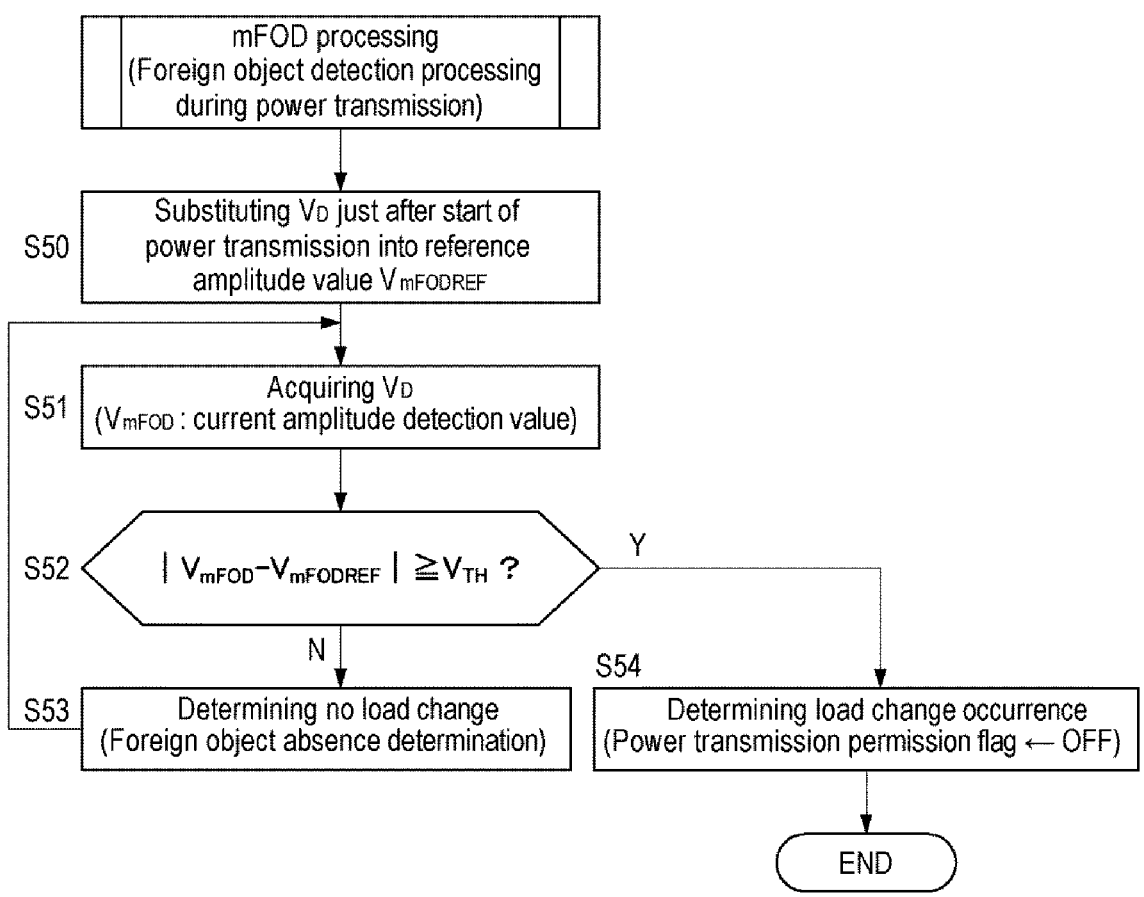
FIG. 20 is an operation flowchart of mFOD processing executed by a power supply device.

FIG. 20 is an operation flowchart of the mFOD processing. Upon starting the mFOD processing, the power transmission side control circuit 150 first performs the process of step S50. Power transmission from the power supply device 1 to the electronic device 2 is started at the start of the power transmission operation in step S114 shown in FIG. 18 (or step S114 in FIG. 26 to be described later). In step S50, the voltage value $V_D$ available immediately after the start of the power transmission is substituted into a reference amplitude value $V_{mFODREF}$. More specifically, the voltage value $V_D$ available at the time when a predetermined time (for example, 5 milliseconds) has elapsed from the start timing of the power transmission is substituted into the reference amplitude value $V_{mFODREF}$. The reference amplitude value $V_{mFODREF}$ is stored and held in the memory 160. The voltage value $V_D$ available during the power transmission operation has a value corresponding to the amplitude of the current flowing through the power transmission side coil $T_L$ when the power transmission side coil $T_L$ is generating a power transmission magnetic field.

After step S50, the processes of steps S51 to S53 are repeatedly executed during the period in which the power transmission operation is performed. However, when the process is shifted from step S52 to step S54, the mFOD processing is ended after execution of the process of step S54. In step S51, the power transmission side control circuit 150 acquires the latest voltage value $V_D$ as a current amplitude detection value $V_{mFOD}$. In the subsequent step S52, the power transmission side control circuit 150 compares the latest current amplitude detection value $V_{mFOD}$ with the reference amplitude value $V_{mFODREF}$, and determines whether the following equation (1) is established with respect to the absolute value ($|V_{mFOD}-V_{mFODREF}|$) of the difference between them. $V_{TH}$ is a predetermined positive threshold value. Two kinds of $V_{TH}$ values may be prepared, and the $V_{TH}$ values may be made mutually different when "$V_{mFOD}>V_{mFODREF}$" and "$V_{mFOD}<V_{mFODREF}$".

$$|V_{mFOD}-V_{mFODREF}| \geq V_{TH} \tag{1}$$

If equation (1) is not established ("N" in step S52), it is determined in step S53 that there is no load change. The process returns to step S51, and the processes of steps S51 and S52 are repeated. On the other hand, if equation (1) is established ("Y" in step S52), the process proceeds to step S54 where it is determined that there is a load change. OFF is set in the power transmission permission flag.

As used herein, the term "load change" refers to a change in the "magnitude of a load" described above. That is to say, the load change is a change in the magnitude of a load on the power transmission side coil $T_L$ at the time of power transmission and may be said to be a change in magnitude as the load of the electronic device 2 as viewed from the power supply device 1 at the time of power transmission. Incidentally, the absence of a load change does not mean that there is no load change at all, but means that the load change is so small that equation (1) is not established.

The power transmission permission flag is a flag managed by the power transmission side control circuit 150 and is set to ON or OFF. When the power transmission permission flag is ON, the power transmission side control circuit 150 permits execution of the power transmission operation. When the power transmission permission flag is OFF, the power transmission side control circuit 150 prohibits execution of the power transmission operation or stops the power transmission operation.

Incidentally, in order to reduce the influence of noise, the voltage value $V_D$ acquired and used in the mFOD processing may be actually a value obtained by applying a moving average (for example, 16 times of the moving averages) to the output value of the A/D converter 144 shown in FIG. 7. The voltage value $V_D$ acquired and used in the pFOD processing (FIG. 12) and the initial setting processing (FIG. 13) may be similar. Instead of using the moving average, a high frequency reduction circuit (not shown) may be inserted between the envelope detector 142 and the A/D converter 144.

Further, the amplification factor of the amplifier 143 shown in FIG. 7 is variable. The amplitude of the current flowing through the power transmission side coil $T_L$ when performing the power transmission operation and the mFOD processing is considerably greater than the amplitude of the current flowing through the power transmission side coil $T_L$ when performing the pFOD processing. Therefore, the power transmission side control circuit 150 sets the amplification factor of the amplifier 143 when performing the mFOD processing to become smaller than the amplification factor of the amplifier 143 when performing the pFOD processing, whereby the input signal range of the A/D converter 144 is set to the same level between the pFOD processing and the mFOD processing.

Figure 21A:
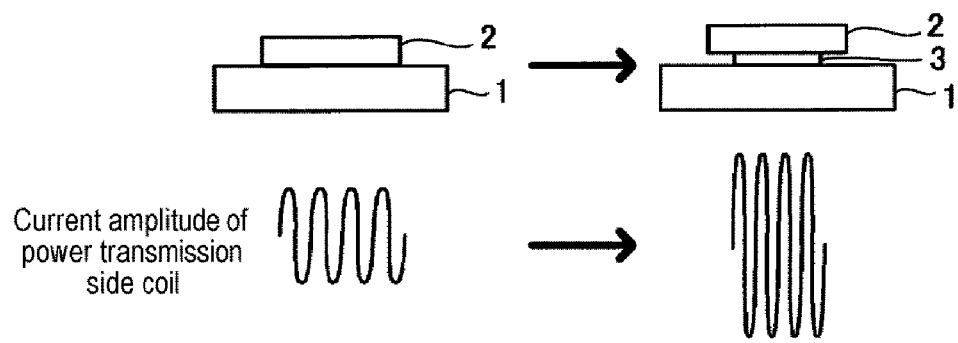
FIGS. 21A and 21B are views for explaining a change in current amplitude of a power transmission side coil when a foreign object is inserted during power transmission.

Referring to FIG. 21A, for example, consideration is given to a case where a foreign object 3 formed as a non-contact IC card is inserted between the power supply base 12 of the power supply device 1 and the electronic device 2 while the power transmission operation is being executed. In this case, the power reception side coil $R_L$ of the electronic device 2 and the coil $J_L$ of the foreign object 3 are magnetically coupled to each other. Thus, the resonance frequency of the resonance circuit RR of the electronic device 2 and the resonance frequency of the resonance circuit JJ of the foreign object 3 deviate from the reference frequency (13.56 MHz). Then, the electric power received by the power reception side coil $R_L$ is reduced and the load of power transmission viewed from the power transmission side $T_L$ is reduced. As a result, the amplitude of the current flowing through the power transmission side coil $T_L$ increases (in this case, the threshold value $V_{TH}$ may be determined through experiments or the like so that equation (1) is established).

Figure 21B:
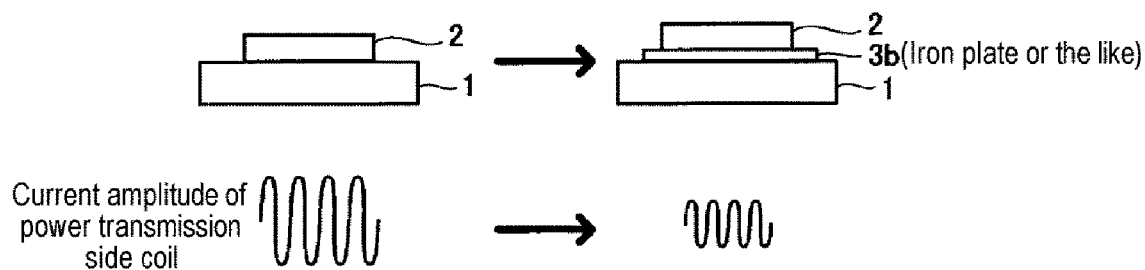

Furthermore, for example, referring to FIG. 21B, when a foreign object 3b such as an iron plate or a ferrite sheet is inserted between the power supply base 12 of the power supply device 1 and the electronic device 2 while the power transmission operation is being executed, a current flows through the foreign object 3b due to the electric and magnetic actions. As a result, the amplitude of the current flowing through the power transmission side coil $T_L$ decreases (in this case, the threshold value $V_{TH}$ may be determined through experiments or the like so that equation (1) is established).

In this way, when the power transmission is performed by the power transmission operation, the power transmission side control circuit 150 controls the continuity of the power transmission by monitoring the change in the current amplitude detection value $V_{mFOD}$. As a result, the power transmission operation is stopped through the mFOD processing under a circumstance unsuitable for continuing the power transmission operation, such as a case where a foreign object is placed on the power supply base 12 after the start of the power transmission operation. Therefore, it is possible to avoid damage or the like of the foreign object due to the continuation of the power transmission operation.

Second Embodiment

A second embodiment of the present disclosure will be described. The second embodiment is an embodiment based on the first embodiment. As for matters not particularly described in the second embodiment, the description of the first embodiment is also applied to the second embodiment unless a conflict arises. In the second embodiment, the description of the second embodiment is given priority as for the matters which are inconsistent between the first and second embodiments.

[Load Change Processing on Electronic Device During Power Transmission]

Although not specifically described in the first embodiment, the power reception side control circuit 250 can perform load change processing that causes a load change at an arbitrary timing during a period in which power transmission is performed. Describing again, the term "load change" refers to the change in the "the magnitude of a load" mentioned above. That is to say, the load change is a change in the magnitude of a load on the power transmission side coil $T_L$ at the time of power transmission and may be said to be a change in magnitude as the load of the electronic device 2 as viewed from the power supply device 1 at the time of power transmission.

When the load change processing is performed during the period in which the power transmission is performed (hereinafter also referred to as a power transmission period), it is determined that the load is changed by the mFOD processing in the power supply device 1 (step S54 in FIG. 20), and the power transmission operation is stopped (step S116 in FIG. 18 or FIG. 26 to be described later). Communication can be made between the power supply device 1 and the electronic device 2 (see steps S101 to S103 of FIG. 18 or FIG. 26 to be described later, and steps S201 to S203 of FIG. 19 or FIG. 27 described later).

Accordingly, the power reception side control circuit 250 can perform the load change processing when it wants to transmit some kinds of information to the power supply device 1 by communication during the power transmission period.

For example, the power reception side control circuit 250 checks the state of the battery 21 during the power transmission period. When the battery 21 is fully charged, the power reception side control circuit 250 stops the power transmission operation in the power supply device 1 by performing the load change processing. Thereafter, when receiving the inquiry signal 510, the power reception side control circuit 250 may cause the response signal 520 to include a power transmission needlessness notification signal indicating that power transmission is unnecessary or a power transmission stop request signal that requests power transmission to stop. Then, the power reception side control circuit 250 may transmit the response signal 520 to the power supply device 1. When the response signal 520 is received (step S103), the power transmission side control circuit 150 can act so as not to execute the processing of step S105 and the subsequent steps.

Alternatively, for example, the power reception side control circuit 250 may check the state of the battery 21 during the power transmission period. When the battery 21 comes close to a fully charged state, the power reception side control circuit 250 may perform the load change processing to reduce the transmitted power. In this case, the power reception side control circuit 250 may stop the power transmission operation in the power supply device 1 by performing the load change processing during the power transmission period. Thereafter, when receiving the inquiry signal 510, the power reception side control circuit 250 may cause the response signal 520 to include a transmission power designation signal requesting to lower the transmission power to a desired power and, then, may transmit the response signal 520 to the power supply device 1. When receiving the response signal 520 (step S103), the power transmission side control circuit 150 may set the magnitude of a power transmission AC voltage, which is to be supplied to the resonance circuit TT in the power transmission operation, to a magnitude based on the transmission power designation signal. The transmission power designation signal is not limited to the one intended to lower the transmission power. That is to say, the transmission power designation signal may be a signal requesting that the transmission power be set to a desired power.

Figure 22:
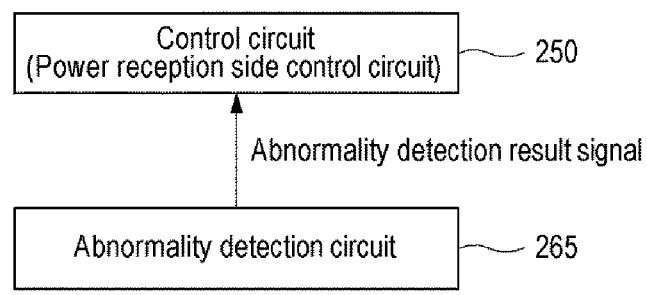
FIG. 22 is a relation diagram of a control circuit and an abnormality detection circuit provided in an electronic device according to a second embodiment of the present disclosure.

In addition, as shown in FIG. 22, the electronic device 2 is provided with an abnormality detection circuit 265 for detecting whether or not an abnormality has occurred in the components of the electronic device 2. An abnormality detection result signal indicating the detection result of the abnormality detection circuit 265 is transmitted to the power reception side control circuit 250. Even when the presence of an abnormality is detected by the abnormality detection circuit 265 during the power transmission period, the power reception side control circuit 250 may execute the load change processing for the purpose of requesting that the power transmission or the like be stopped.

Figure 23:
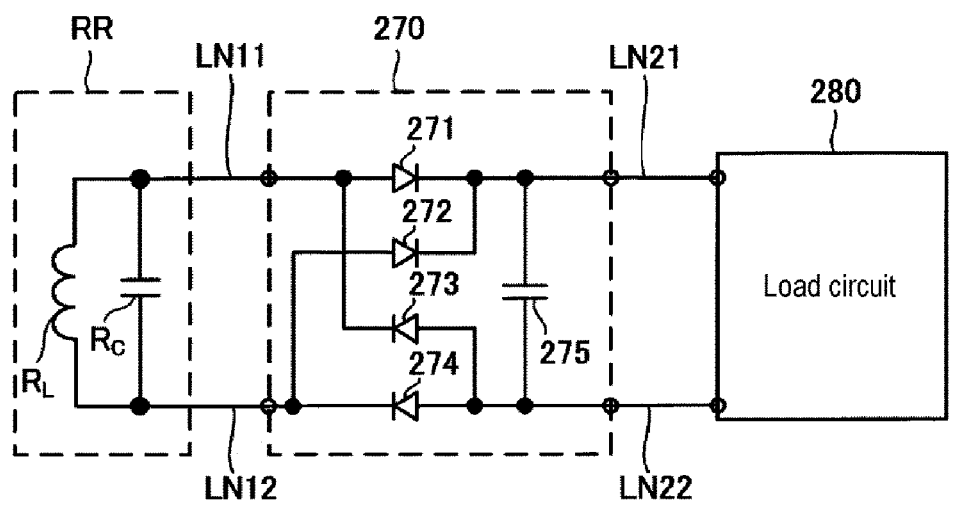
FIG. 23 is a circuit/block diagram showing a part of an electronic device 2 according to the second embodiment of the present disclosure.

A load circuit included in an object for which the presence or absence of an abnormality is to be detected will be described with reference to FIG. 23. FIG. 23 is a circuit/block diagram showing a part of the electronic device 2. The electronic device 2 includes a rectifying/smoothing circuit 270 and a load circuit 280 disposed behind the power reception side resonance circuit RR. The rectifying/smoothing circuit 270 may be considered to be inserted between the switching circuit 210 and the NFC power reception circuit 230, or may be considered to be included in the NFC power reception circuit 230. The load circuit 280 may be considered to be included in the NFC power reception circuit 230, or may be considered to be disposed behind the NFC power reception circuit 230 (for example, may be considered to correspond to the functional circuit 22 shown in FIG. 2 or may be considered to include the functional circuit 22).

The rectifying/smoothing circuit 270 generates DC power by full-wave rectifying and smoothing the AC power received by the power reception side coil $R_L$ of the power reception side resonance circuit RR during the power transmission. The load circuit 280 performs an arbitrary electrical operation based on the DC power generated by the rectifying/smoothing circuit 270 (by consuming the DC power). The charging circuit (not shown) for charging the battery 21 based on the DC power generated by the rectifying/smoothing circuit 270 and the battery 21 may also be considered to be included in the load circuit 280.

FIG. 23 also shows a specific circuit example of the rectifying/smoothing circuit 270. In FIG. 23, there is shown an example in which the power reception side resonance circuit RR is a parallel resonance circuit. However, as described above, the power reception side resonance circuit RR may be a series resonance circuit. In FIG. 23, one end of the power reception side coil $R_L$ and one end of the power reception side capacitor $R_C$ in the power reception side resonance circuit RR are commonly connected to an anode of a diode 271 and a cathode of a diode 273 via a line LN11. The other end of the power reception side coil $R_L$ and the other end of the power reception side capacitor $R_C$ in the power reception side resonance circuit RR are commonly connected to an anode of a diode 272 and a cathode of a diode 274 via a line LN12. The cathodes of the diodes 271 and 272 are commonly connected to a positive electrode of a smoothing capacitor 275, and the anodes of the diodes 273 and 274 are commonly connected to a negative electrode of the smoothing capacitor 275. Therefore, during the power transmission, an alternating current flows through the power reception side coil $R_L$ based on the alternating magnetic field generated by the power transmission side coil $T_L$. The electric power based on the alternating current is full-wave rectified by the rectifying circuits (271 to 274) of the rectifying/smoothing circuit 270 and is accumulated in the smoothing capacitor 275 as electric charges. The voltage attributable to the electric charges accumulated in the smoothing capacitor 275, namely the voltage (ideally a DC voltage) between both electrodes of the smoothing capacitor 275 is supplied to the load circuit 280 as an output voltage of the rectifying/smoothing circuit 270 via a pair of lines LN21 and LN22.

The abnormality detection circuit 265 detects the presence or absence of an abnormality of the load circuit 280 (namely, detects whether or not an abnormality occurs in the load circuit 280), and outputs an abnormality detection result signal indicating the detection result. Incidentally, the abnormality referred to in the following description indicates an abnormality of the load circuit 280 unless specifically mentioned otherwise.

When the magnitude of a physical quantity indicative of the state of the load circuit 280 deviates from a predetermined normal range, the abnormality detection circuit 265 determines that there is an abnormality in the load circuit 280, and outputs an abnormality detection result signal of a first logic value indicating that there is an abnormality. Otherwise, the abnormality detection circuit 265 determines that there is no abnormality in the load circuit 280, and outputs an abnormality detection result signal of a second logical value indicating that there is no abnormality. The physical quantity indicating the state of the load circuit 280 is, for example, a voltage, a current or a temperature. The voltage, the current and the temperature used for determining the presence or absence of an abnormality are referred to as a target voltage, a target current and a target temperature, respectively.

The target voltage may be a voltage applied to a predetermined electronic component or node in the load circuit 280 and includes an input voltage and an output voltage of the load circuit 280. That is, for example, the target voltage may be a voltage inputted to the load circuit 280 from a circuit (for example, a circuit 270) which is disposed inside the electronic device 2 and which is not the load circuit 280, or may be a voltage outputted from the load circuit 280 to a circuit which is disposed inside the electronic device 2 and which is not the load circuit 280. Alternatively, for example, the target voltage may be a voltage generated in the load circuit 280 (for example, an output voltage of a regulator that may be provided in the load circuit 280).

The target current may be a current flowing through a predetermined electronic component or node in the load circuit 280 and includes an input current and an output current of the load circuit 280. That is, for example, the target current may be a current inputted to the load circuit 280 from a circuit (for example, a circuit 270) which is disposed inside the electronic device 2 and which is not the load circuit 280, or may be a current outputted from the load circuit 280 to a circuit which is disposed inside the electronic device 2 and which is not the load circuit 280.

The target temperature may be a temperature of a predetermined portion of the load circuit 280. For example, the target temperature may be a temperature of a transistor constituting a regulator or the like that can be provided in the load circuit 280 (more specifically, a temperature of a package or a heat sink of the transistor), or may be a temperature of an integrated circuit that can be provided in the load circuit 280 (more specifically, a temperature of a package or a heat sink of the integrated circuit).

The power reception side control circuit 250 may adopt the method disclosed in the related art as a method of load change processing, namely as a method of changing the magnitude as the load of the electronic device 2 as viewed from the power supply device 1. Specifically, for example, any one of the following first to fourth load changing methods may be used.

(First Load Changing Method)

Figure 24A:
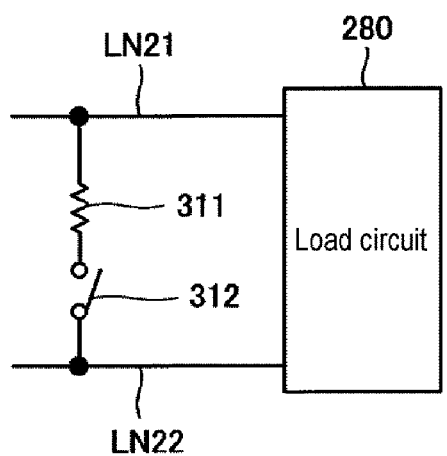
FIGS. 24A and 24B are views showing circuits that implement a load changing method according to the second embodiment of the present disclosure.

In the first load changing method, as shown in FIG. 24A, a series circuit of a resistor 311 and a switch 312 is provided between a pair of lines LN21 and LN22. When the load change processing is not executed, the switch 312 is turned off. On the other hand, when the load change processing is executed, the switch 312 is turned on.

In the power transmission period, the received power of the power reception side resonance circuit RR is supplied to the load circuit 280 via the pair of power lines (LN21 and LN22). When the switch 312 is turned on, the impedance between the pair of power lines (LN21 and LN22) viewed from the power reception side resonance circuit RR decreases as compared with a case where the switch 312 is turned off. The magnitude of the load of the electronic device 2 as viewed from the power supply device 1 (power transmission side coil $T_L$) during power transmission increases as the impedance between the pair of power lines (LN21 and LN22) decreases.

When the magnitude of the load of the electronic device 2 as viewed from the power supply device 1 (power transmission side coil $T_L$) during the power transmission is increased by turning on the switch 312, the amplitude of the current flowing through the power transmission side coil $T_L$ is decreased to such an extent that the amplitude satisfies equation (1) described above. Therefore, if the load change processing is executed by the first load changing method, it is determined that there is a load change in the mFOD processing of the power supply device 1 (step S54 of FIG. 20).

(Second Load Changing Method)

Figure 24B:
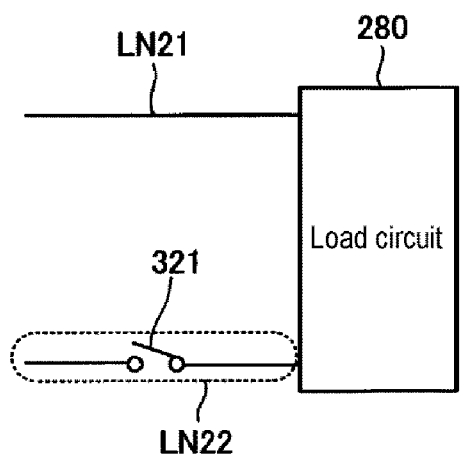

In the second load changing method, as shown in FIG. 24B, a switch 321 is inserted in series on the line LN22. When the load change processing is not executed, the switch 321 is turned on. On the other hand, when the load change processing is executed, the switch 321 is turned off.

In the power transmission period, the received power of the power reception side resonance circuit RR is supplied to the load circuit 280 via the pair of power lines (LN21 and LN22). When the switch 321 is turned off, the impedance between the pair of power lines (LN21 and LN22) as viewed from the power reception side resonance circuit RR is increased as compared with a case where the switch 321 is turned on. The magnitude of the load of the electronic device 2 as viewed from the power supply device 1 (power transmission side coil $T_L$) during power transmission decreases as the impedance between the pair of power lines (LN21 and LN22) increases.

If the magnitude of the load of the electronic device 2 as viewed from the power supply device 1 (power transmission side coil $T_L$) during the power transmission is decreased by turning off the switch 321, the amplitude of the current flowing through the power transmission side coil $T_L$ is increased to such an extent that the amplitude satisfies equation (1) described above. Therefore, if the load change processing is executed by the second load changing method, it is determined that there is a load change in the mFOD processing of the power supply device 1 (step S54 of FIG. 20).

(Third Load Changing Method)

According to the third load changing method, in the load change processing, a resonance frequency changing operation for changing the resonance frequency $f_O$ of the power reception side resonance circuit RR from the reference frequency to the predetermined frequency $f_M$ is executed. The magnitude of the load of the electronic device 2 as viewed from the power supply device 1 (the power transmission side coil $T_L$) during the power transmission is decreased by executing the resonance frequency changing operation. If the magnitude of the load of the electronic device 2 as viewed from the power supply device 1 (the power transmission side coil $T_L$) during the power transmission is decreased due to the resonance frequency changing operation, the amplitude of the current flowing through the power transmission side coil $T_L$ is increased to such an extent that the amplitude satisfies equation (1) described above. Therefore, if the load change processing is executed by the third load changing method, it is determined that there is a load change in the mFOD processing of the power supply device 1 (step S54 of FIG. 20).

(Fourth Load Changing Method)

According to the fourth load changing method, in the load change processing, a coil short-circuiting operation for short-circuiting the power reception side coil $R_L$ of the power reception side resonance circuit RR is executed. The magnitude of the load of the electronic device 2 as viewed from the power supply device 1 (the power transmission side coil $T_L$) during the power transmission is decreased by executing the coil short-circuiting operation. If the magnitude of the load of the electronic device 2 as viewed from the power supply device 1 (the power transmission side coil $T_L$) during the power transmission is decreased due to the coil short-circuiting operation, the amplitude of the current flowing through the power transmission side coil $T_L$ is increased to such an extent that the amplitude satisfies equation (1) described above. Therefore, if the load change processing is executed by the fourth load changing method, it is determined that there is a load change in the mFOD processing of the power supply device 1 (step S54 of FIG. 20).

[Correspondence of a Flag with a Factor that Causes Determination of Presence of a Load Change on the Side of the Power Supply Device]

As described above, due to the load change processing in the electronic device 2 during the power transmission period, it is determined that there is a load change in the power supply device 1. The power supply device 1 and the electronic device 2 are allowed to make communication by way of the stop of the power transmission operation. This is useful by itself. However, considering the existence of the load change processing in the electronic device 2, it is impossible, unless a study is conducted, to know whether the determination of presence of a load change on the side of the power supply device 1 is attributable to the load change processing in the electronic device 2 or attributable to the insertion of the foreign object 3.

In the case where the determination of presence of a load change on the side of the power supply device 1 is attributable to the load change processing in the electronic device 2, the temporarily stopped power transmission operation should be resumed or can be resumed after going through necessary communication. In the case where the determination of presence of a load change on the side of the power supply device 1 is attributable to the insertion of the foreign object 3, the temporarily stopped power transmission operation should not be resumed. In order to satisfy these requirements, a load change flag is introduced in the non-contact power supply system according to the second embodiment.

Figures 25A, 25B:
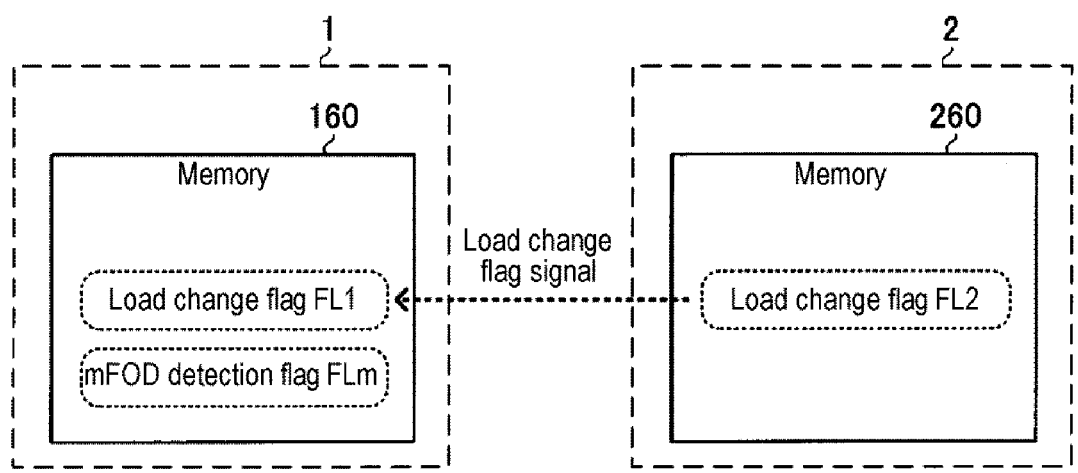
FIG. 25A is a view showing flags held in the respective memories of a power supply device and an electronic device according to the second embodiment of the present disclosure.
FIG. 25B is a view showing initial values of these flags.

As shown in FIG. 25A, as the load change flag, a load change flag FL1 is held in the memory 160 of the power supply device 1. A load change flag FL2 is held in the memory 260 of the electronic device 2. The memory 160 also holds an mFOD detection flag FLm (details of the function of the mFOD detection flag FLm will be described later). ON or OFF is set in each flag. In the load change flag FL1, the state in which ON is set corresponds to a set state of the load change flag FL1, and the state in which OFF is set corresponds to a reset state of the load change flag FL1. The same applies to the load change flag FL2 and the mFOD detection flag FLm. As shown in FIG. 25B, the load change flag FL1 and the mFOD detection flag FLm are set to OFF at the time of starting the power supply device 1, and the load change flag FL2 is set to OFF at the time of functioning of the electronic device 2. The state (ON or OFF state) of each of the load change flag FL1 and the mFOD detection flag FLm is controlled and set by the power transmission side control circuit 150. The state (ON or OFF state) of the load change flag FL2 is controlled and set by the power reception side control circuit 250.

The state of the load change flag FL1 on the side of the power supply device 1 is controlled so as to be in the same state as the load change flag FL2 on the side of the electronic device 2. That is to say, upon receiving the inquiry signal 510, the power reception side control circuit 250 transmits the response signal 520 which includes a load change flag signal indicating the state of the load change flag FL2 (ON or OFF state). Upon receiving the response signal 520, the power transmission side control circuit 150 updates the state of the load change flag FL1 so that the state of the load change flag FL1 coincides with the state of the load change flag FL2 indicated by the load change flag signal (see step S103 of FIG. 26 to be described later).

FIG. 25C shows an example of the relationship between the transmission and reception of the response signal 520 and the flags FL1 and FL2. Incidentally, the response signal 520 is transmitted in response to the reception of the inquiry signal 510. In FIG. 25C, for the sake of simplicity of illustration, the state of transmission and reception of the inquiry signal 510 is not shown. When the electronic device 2 executes the load change processing during the power transmission period starting from the state in which the load change flags FL1 and FL2 are set to OFF, the load change flag FL2 set to ON (see step S242 in FIG. 27 to be described later). Thereafter, in response to the reception of the inquiry signal 510, the power reception side control circuit 250 transmits to the power supply device 1 the response signal 520 which includes a load change flag signal indicating that the load change flag FL2 is ON. Upon receiving the response signal 520 at the power supply device 1, the power transmission side control circuit 150 updates and sets the load change flag FL1 to ON, based on the load change flag signal in the response signal 520 (see step S103 of FIG. 26 to be described later). After transmitting the response signal 520 which includes the load change flag signal indicating that the load change flag FL2 is ON, the power reception side control circuit 250 sets the load change flag FL2 to OFF (see steps S231 and S232 of FIG. 27 to be described later).

Thereafter, upon receiving the inquiry signal 510 again when the load change flag FL2 is OFF, the power reception side control circuit 250 transmits to the power supply device 1 the response signal 520 which includes a load change flag signal indicating that the load change flag FL2 is OFF. Upon receiving the response signal 520 at the power supply device 1, the power transmission side control circuit 150 updates and sets the load change flag FL1 to OFF, based on the load change flag signal in the response signal 520 (see step S103 of FIG. 26 to be described later).

[Operation Flowchart of Power Supply Device and Electronic Device]

Next, the flow of the operation of the power supply device 1 will be described. FIG. 26 is an operation flowchart of the power supply device 1 according to the second embodiment. The operations of the communication circuit 120 and the power transmission circuit 130 are executed under the control of the power transmission side control circuit 150. In the second embodiment, the processes of steps S131 to S134, S141 and S142 are added to the processes of steps S101 to S116 described in the first embodiment. Unless specifically mentioned otherwise, the processes of steps S101 to S116 themselves are the same as those described in the first embodiment. The flow of the operation of the power supply device 1 according to the second embodiment will be described with reference to FIG. 26. In the second embodiment, hereinafter, the existence of a situation in which the power supply device 1 and the electronic device 2 are in the separated state (FIG. 1A) is also taken into consideration.

When the power supply device 1 is started up, in step S101, the power transmission side control circuit 150 first connects the communication circuit 120 to the resonance circuit TT through the control of the switching circuit 110. In the subsequent step S102, the power transmission side control circuit 150 transmits the inquiry signal 510 to the power supply target device by NFC communication using the communication circuit 120 and the resonance circuit TT. Thereafter, in step S103, the power transmission side control circuit 150 waits for reception of the response signal 520.

When the response signal 520 is received by the communication circuit 120 before a predetermined reception waiting time elapses from the transmission of the inquiry signal 510, the power transmission side control circuit 150 analyzes the response signal 520. If the power supply target device is capable of making NFC communication and if electric power is receivable or power transmission is requested, it is determined that there is a power transmission target ("Y" in step S104), and the process proceeds to step S132. If not ("N" in step S104), the process of step S131 is executed and, then, the process returns to step S102. In step S131, the mFOD detection flag FLm is set to OFF. When the communication between the power supply device 1 and the electronic device 2 is impossible, for example, when the power supply device 1 and the electronic device 2 are in a separated state, it is not possible to receive the response signal 520. When the response signal 520 is not received by the communication circuit 120 before a predetermined reception waiting time elapses from the transmission of the inquiry signal 510, the power transmission side control circuit 150 determines that there is no power transmission target. After the mFOD detection flag FLm is set to OFF in step S131, the process returns to step S102.

Furthermore, when the response signal 520 is received in step S103, the response signal 520 includes a load change flag signal indicating the state of the load change flag FL2. The power transmission side control circuit 150 updates the state of the load change flag FL1 so that the state of the load change flag FL1 coincides with the state of the load change flag FL2 indicated by the load change flag signal.

In step S132, the power transmission side control circuit 150 checks whether the load change flag FL1 is ON. If the load change flag FL1 is ON ("Y" in step S132), the process does not proceed to step S133. After the mFOD detection flag FLm is set to OFF in step S134, the process proceeds to step S105. On the other hand, if the load change flag FL1 is OFF in step S132 ("N" in step S132), the process proceeds to step S133. In step S133, the power transmission side control circuit 150 checks whether the mFOD detection flag FLm is ON. When the mFOD detection flag FLm is ON ("Y" in step S133), the process returns to step S101. When the mFOD detection flag FLm is OFF ("N" in step S133), the process proceeds to step S105.

The processes from step S105 to step S115, which are performed after proceeding to step S105, are the same as those of the first embodiment. That is to say, in step S105, the power transmission side control circuit 150 transmits the test request signal 530 to the power supply target device by NFC communication using the communication circuit 120 and the resonance circuit TT. Then, in step S106, the power transmission side control circuit 150 waits for reception of the response signal 540. When the response signal 540 is received by the communication circuit 120, in step S107, the power transmission side control circuit 150 connects the power transmission circuit 130 to the resonance circuit TT through the control of the switching circuit 110. In the subsequent step S108, the power transmission side control circuit 150 performs the pFOD processing.

After the pFOD processing, in step S109, the power transmission side control circuit 150 connects the communication circuit 120 to the resonance circuit TT through the control of the switching circuit 110, and the process proceeds to step S110. In the pFOD processing of step S108, if foreign object presence determination is rendered, the process returns from step S110 to step S102. However, if foreign object absence determination is rendered, the process proceeds from step S110 to step S111.

In step S111, the power transmission side control circuit 150 transmits the authentication signal 550 to the power supply target device by NFC communication using the communication circuit 120 and the resonance circuit TT. Then, in step S112, the power transmission side control circuit 150 waits for reception of the response signal 560. When the response signal 560 is received by the communication circuit 120, in step S113, the power transmission side control circuit 150 connects the power transmission circuit 130 to the resonance circuit TT through the control of the switching circuit 110, and the process proceeds to step S114.

In step S114, the power transmission side control circuit 150 sets the power transmission permission flag to ON and starts the power transmission operation and the mFOD processing. Then, the process proceeds to step S115. The power transmission side control circuit 150 measures the elapsed time from the start point of the power transmission operation. In step S115, the power transmission side control circuit 150 compares the elapsed time with a predetermined time $t_A$ (for example, 10 minutes) and checks the state of the power transmission permission flag. When the elapsed time reaches the predetermined time $t_A$ or when the power transmission permission flag is set to OFF by mFOD processing, the process proceeds to step S141.

In step S141, the power transmission side control circuit 150 checks whether it is determined that load change detection is made in the mFOD processing. If it is determined in step S141 that the load change detection is made in the mFOD processing ("Y" in step S141), the mFOD detection flag FLm is set to ON in step S142. Then, the process proceeds to step S116. If not ("N" in step S141), the process proceeds to step S116 without changing the state of the mFOD detection flag FLm. In step S116, the power transmission side control circuit 150 switches the power transmission permission flag from ON to OFF or keeps the power transmission permission flag OFF, and stops the power transmission operation and the mFOD processing. Then, the process returns to step S101. After returning to step S101, the respective processes starting from step S101 are executed again as described above.

Next, the flow of the operation of the electronic device 2 will be described. FIG. 27 is an operation flowchart of the electronic device 2 according to the second embodiment. The processes starting from step S201 are executed in conjunction with the operation of the power supply device 1 shown in FIG. 26. The operations of the communication circuit 220 and the power reception circuit 230 are executed under the control of the power reception side control circuit 250. In the second embodiment, the processes of steps S231, S232, S241 and S242 are added to the processes of steps S201 to S214 described in the first embodiment. Unless specifically mentioned otherwise, the processes of steps S201 to S214 per se are the same as those described in the first embodiment. The flow of the operation of the electronic device 2 according to the second embodiment will be described with reference to FIG. 27.

When the electronic device 2 is started up, in step S201, the power reception side control circuit 250 first connects the communication circuit 220 to the resonance circuit RR through control of the switching circuit 210. At the time of startup of the electronic device 2, the $f_O$ changing/short-circuiting operation is not executed. In the subsequent step S202, the power reception side control circuit 250 waits for reception of the inquiry signal 510 by using the communication circuit 220. When the inquiry signal 510 is received by the communication circuit 220, in a step S203, the power reception side control circuit 250 analyzes the inquiry signal 510 to generate a response signal 520. The power reception side control circuit 250 transmits the response signal 520 to the power supply device 1 by NFC communication using the communication circuit 220. At this time, the power reception side control circuit 250 checks the state of the battery 21. If the battery 21 is not in a fully charged state and if no abnormality is found in the battery 21, the power reception side control circuit 250 causes the response signal 520 to include a signal indicating that electric power is receivable or transmission of electric power is requested. On the other hand, if the battery 21 is in a fully charged state or if an abnormality is found in the battery 21, the power reception side control circuit 250 causes the response signal 520 to include a signal indicating that electric power is not receivable. In addition, a load change flag signal indicating the state of the load change flag FL2 is also included in the response signal 520 and is transmitted to the power supply device 1.

After transmitting the response signal 520 in step S203, the process proceeds to step S231. In step S231, the power reception side control circuit 250 checks the state of the load change flag FL2. If the load change flag FL2 is ON ("Y" in step S231), the load change flag FL2 is set to OFF in step S232. Then, the process proceeds to step S204. On the other hand, if the load change flag FL2 is OFF ("N" in step S231), the process directly proceeds to step S204.

The processes from step S204 to step S212, which are performed after processing to step S204, are the same as those of the first embodiment. That is to say, in step S204, the power reception side control circuit 250 waits for reception of the test request signal 530. When the test request signal 530 is received by the communication circuit 220, the process proceeds to step S205. In step S205, the power reception side control circuit 250 transmits the response signal 540 to the power supply device 1 by NFC communication using the communication circuit 220. In the subsequent step S206, the power reception side control circuit 250 executes the $f_O$ changing/short-circuiting operation using the resonance state changing circuit 240. That is to say, the resonance frequency $f_O$ is changed from the reference frequency to the frequency $f_M$, or the power reception side coil $R_L$ is short-circuited. The power reception side control circuit 250 measures the elapsed time from the start of execution of the $f_O$ changing/short-circuiting operation (step S207). If the elapsed time reaches a predetermined time $t_M$, the power reception side control circuit 250 stops the $f_O$ changing/short-circuiting operation (step S208). That is to say, the resonance frequency $f_O$ is returned to the reference frequency or the short-circuiting of the power reception side coil $R_L$ is canceled. Thereafter, the process proceeds to step S209. The time $t_M$ is preset so that the execution of the $f_O$ changing/short-circuiting operation is maintained during the period in which the pFOD processing is being executed in the power supply device 1 (i.e., the period in which the test magnetic field is being generated) and so that the $f_O$ changing/short-circuiting operation is rapidly stopped when the period terminates. The time $t_M$ may be designated in the test request signal 530. Although not shown in FIG. 27, if the test request signal 530 has not been received for a predetermined time or longer after proceeding to step S204, the process returns to step S201.

In step S209, the power reception side control circuit 250 waits for reception of the authentication signal 550 by using the communication circuit 220. When the authentication signal 550 is received by the communication circuit 220, in step S210, the power reception side control circuit 250 transmits the response signal 560 responding to the authentication signal 550 to the power supply device 1 by NFC communication using the communication circuit 220. When a foreign object is present on the power supply base 12, the authentication signal 550 is not transmitted from the power supply device 1 (see step S110 of FIG. 26). Therefore, if the authentication signal 550 is not received for a certain time in step S209, the process may return to step S201.

After transmitting the response signal 560, in step S211, the power reception side control circuit 250 connects the power reception circuit 230 to the resonance circuit RR through the control of the switching circuit 210. In the subsequent step S212, the power reception side control circuit 250 starts the power reception operation using the power reception circuit 230.

When the power reception operation is started in step S212, the power reception side control circuit 250 starts measurement of the elapsed time from the start point of the power reception operation. The process proceeds to step S241. After the start of the power reception operation, the power reception side control circuit 250 continuously monitors whether the execution of the load change processing is necessary. If it is determined in step S241 that the load change processing is to be executed ("Y" in step S241), the load change processing is executed in step S242 and the load change flag FL2 is set to ON. Thereafter, the process proceeds to step S214. In step S242, the load change processing is ended after being executed for a certain period of time, for example. The load change processing may be executed just for a time (for example, 1 second) necessary for determining that there is a load change on the side of the power supply device 1.

On the other hand, if it is determined in step S241 that the load change processing is not to be executed ("N" in step S241), the process proceeds to step S213. In step S213, the elapsed time from the start point of the power reception operation is compared with a predetermined time $t_B$. When the elapsed time does not reach the predetermined time $t_B$ ("N" in step S213), the process returns to step S241. On the other hand, when the elapsed time has reached the predetermined time $t_B$ ("Y" in step S213), the process proceeds to step S214.

In step S214, the power reception side control circuit 250 stops the power reception operation, and the process returns to step S201. After returning to step S201, the respective processes starting from step S201 are executed again as described above.

[Flow of Normal Case]

Figure 28:
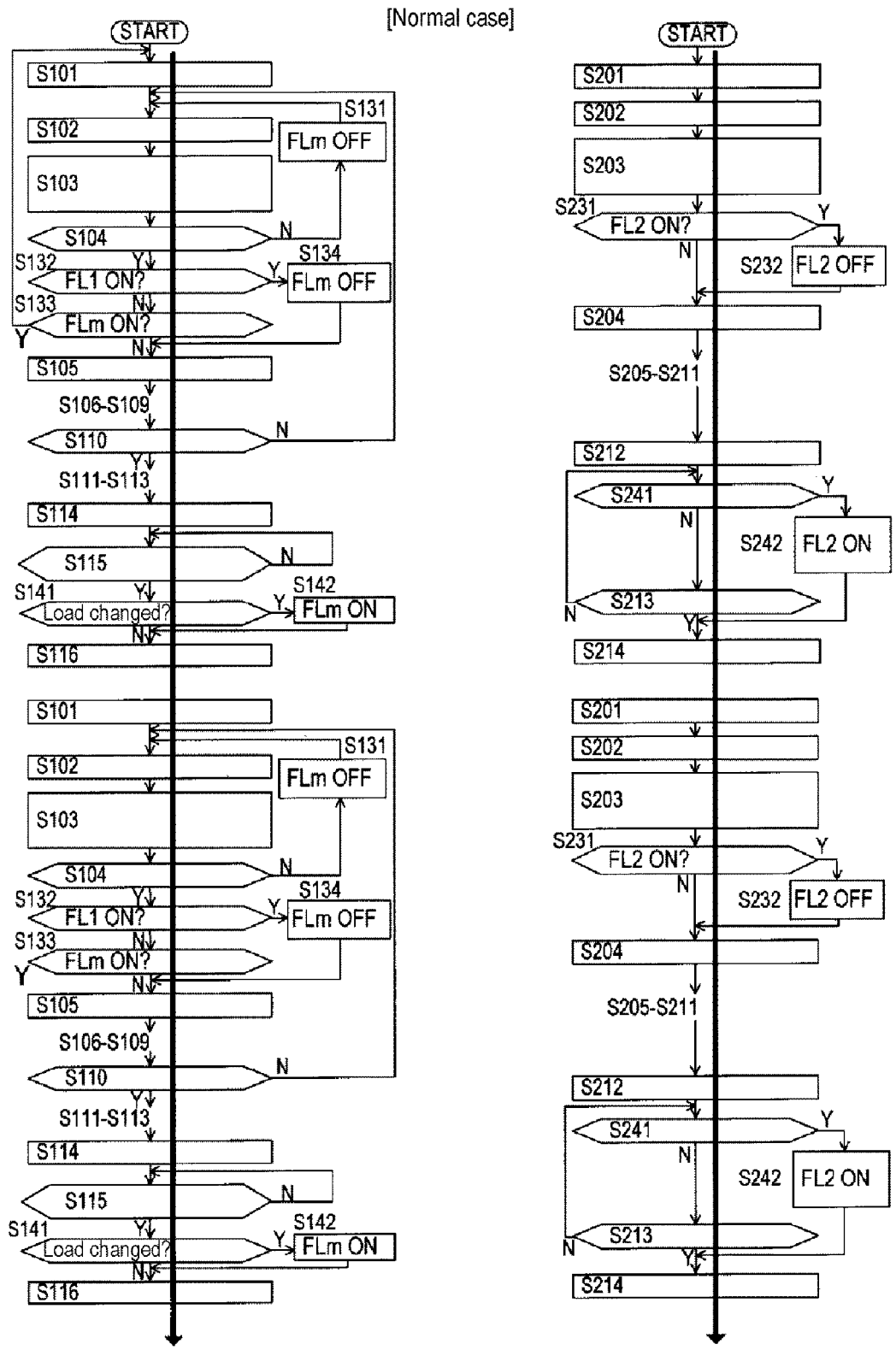
FIG. 28 is a view showing a flow of operations of a power supply device and an electronic device in a normal case according to the second embodiment of the present disclosure.

The flows of the operations of the power supply device 1 and the electronic device 2 in a normal case will be described with reference to FIG. 28. In FIG. 28, the flows of the operations of the power supply device 1 and the electronic device 2 in the normal case are indicated by heavy solid lines with arrows on the left side and the right side, respectively. The normal case refers to a case in which the electronic device 2 is continuously arranged on the power supply base 12 in the reference arrangement state (FIG. 1B), the foreign object 3 is not present, and no load change processing is performed by the electronic device 2. In the normal case, NFC communication between the devices 1 and 2 is made possible.

In the normal case, as shown in FIG. 28 (see also FIGS. 26 and 27), in the power supply device 1, the process starts from S101 and reaches S116 via "Y" in S104, "N" in S132, "N" in S133, "Y" in S110, "Y" in S115 and "N" in S141. Thereafter, the process returns to the step S101 and the process of the step S101 is repeated. In conjunction with this, in the electronic device 2, the process starts from the step S201 and reaches S214 via "N" in S231, "N" in S241 and "Y" in S213. Thereafter, the process returns to step S201 and the process of step S201 is repeated.

[Flow of Case A]

Figure 29A:
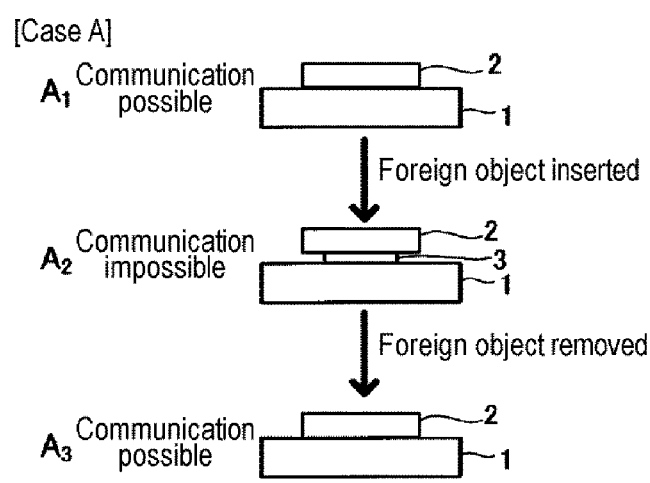
FIGS. 29A to 29D are views showing the state transitions of a power supply device, an electronic device and a foreign object in cases A to D according to the second embodiment of the present disclosure.

The flows of the operations of the power supply device 1 and the electronic device 2 in case A will be described with reference to FIGS. 29A and 30. FIG. 29A shows the state transitions of the power supply device 1, the electronic device 2 and the foreign object 3 in case A. In case A, it is assumed that the load change processing is not performed in the electronic device 2.

As shown in FIG. 29A, in case A, there is first obtained state $A_1$ which is the same as that of the normal case. In state $A_1$, when the electronic device 2 is placed on the power supply base 12 in the reference arrangement state (FIG. 1B), the foreign object 3 is not present, and the load change processing is not performed in the electronic device 2. In case A, however, after state $A_1$, the foreign object 3 such as a metal plate or an IC card is inserted into a gap between the power supply base 12 of the power supply device 1 and the electronic device 2, thereby reaching state $A_2$. In state $A_2$, the foreign object 3 completely blocks the space between the power transmission side coil $T_L$ and the power reception side coil $R_L$, whereby NFC communication between the devices 1 and 2 is impossible. After state $A_2$, when the foreign object 3 is completely removed from the power supply base 12, state $A_3$ is reached. State $A_3$ is the same as state $A_1$. Incidentally, the gap between the power supply base 12 and the electronic device 2 is formed by, for example, a protrusion provided in the power supply base 12 or the housing of the electronic device 2. However, in FIG. 29A, for the sake of avoiding complexity of illustration, the illustration of the protrusion is omitted. The power supply device 1 and the electronic device 2 are illustrated as making contact with each other when the foreign object 3 is not present (the same applies to FIG. 29B, FIG. 29C and FIG. 29D to be described later).

In FIG. 30, the flows of the operations of the power supply device 1 and the electronic device 2 in case A are indicated by heavy solid lines with arrows on the left side and the right side, respectively. In case A, if state $A_1$ is shifted to state $A_2$ during the power transmission period, it is determined that there is a load change in the power supply device 1. The mFOD detection flag FLm becomes ON. The process returns to step S101 after the power transmission is stopped. Since NFC communication between the devices 1 and 2 is impossible, the loop process composed of S102, S103, S104 and S131 is repeated. Thereafter, if the foreign object 3 is removed and if state $A_2$ is shifted to state $A_3$, NFC communication between the devices 1 and 2 becomes possible. Thus, the power transmission is resumed by the power transmission operation and the power reception operation.

[Flow of Case B]

Figure 29B:
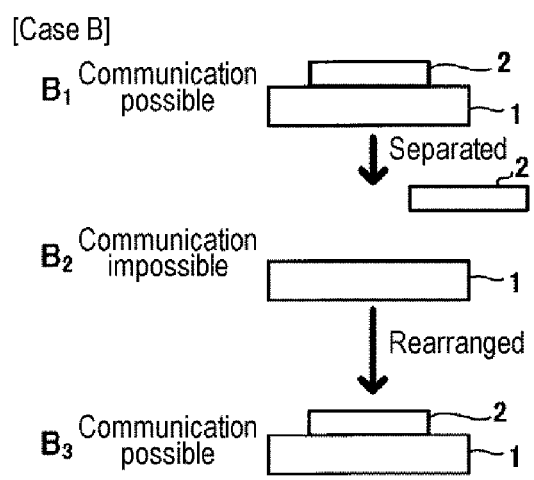

The flows of the operations of the power supply device 1 and the electronic device 2 in case B will be described with reference to FIGS. 29B and 31. FIG. 29B shows the state transitions of the power supply device 1 and the electronic device 2 in case B. In case B, it is assumed that the load change processing is not performed in the electronic device 2. In case B, the foreign object 3 is not present.

As shown in FIG. 29B, in case B, there is first obtained state $B_1$ which is the same as that of the normal case. In state $B_1$, the electronic device 2 is placed on the power supply base 12 in the reference arrangement state (FIG. 1B), the foreign object 3 is not present, and the load change processing is not performed in the electronic device 2. However, in case B, after state $B_1$, the electronic device 2 is removed from the power supply base 12 so as to be in the separated state. State $B_2$ is a state in which the electronic device 2 is in the separated state after state $B_1$. In state $B_2$, NFC communication between the devices 1 and 2 is impossible. After state $B_2$, the electronic device 2 is placed on the power supply base 12 again, thereby reaching state $B_3$. State $B_3$ is the same as state $B_1$.

In FIG. 31, the flows of the operations of the power supply device 1 and the electronic device 2 in case B are indicated by heavy solid lines with arrows on the left side and the right side, respectively. In case B, if state $B_1$ is shifted to state $B_2$ during the power transmission period, it is determined that there is a load change in the power supply device 1. The mFOD detection flag FLm becomes ON. The process returns to step S101 after the power transmission is stopped. Since NFC communication between the devices 1 and 2 is impossible, the loop process composed of S102, S103, S104 and S131 is repeated. Thereafter, if the electronic device 2 is placed on the power supply base 12 again so that state $B_2$ is shifted to state $B_3$, NFC communication between the devices 1 and 2 becomes possible. Thus, the power transmission is resumed by the power transmission operation and the power reception operation.

[Flow of Case C]

Figure 29C:
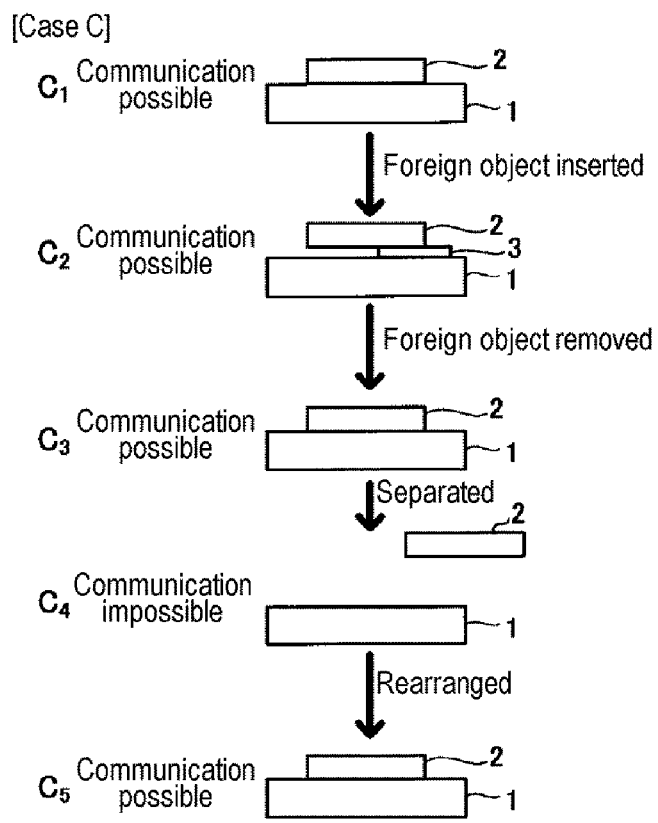

The flows of the operations of the power supply device 1 and the electronic device 2 in case C will be described with reference to FIGS. 29C and 32. FIG. 29C shows the state transitions of the power supply device 1, the electronic device 2 and the foreign object 3 in case C. In case C, it is assumed that the load change processing is not performed in the electronic device 2.

As shown in FIG. 29C, in case C, there is first obtained state $C_1$ which is the same as that of the normal case. In state $C_1$, the electronic device 2 is placed on the power supply base 12 in the reference arrangement state (FIG. 1B), the foreign object 3 is not present, and the load change processing is not performed in the electronic device 2. However, in case C, after state $C_1$, the foreign object 3 such as a metal plate or an IC card is inserted into a gap between the power supply base 12 of the power supply device 1 and the electronic device 2, thereby reaching state $C_2$. In state $C_2$, the foreign object 3 blocks the space between the power transmission side coil $T_L$ and the power reception side coil $R_L$ by about half. As a result, it is determined that there is a load change in the mFOD processing. However, NFC communication between the devices 1 and 2 is possible. Alternatively, state $C_2$ may be a state in which the electronic device 2 and the foreign object 3 are arranged in parallel on the power supply base 12. After state $C_2$, if the foreign object 3 is completely removed from the power supply base 12, state $C_3$ is reached. In case C, after state $C_3$, the electronic device 2 is removed from the power supply base 12 so as to be in the separated state. State $C_4$ is a state in which the electronic device 2 is in the separated state after state $C_3$. In state $C_4$, NFC communication between the devices 1 and 2 is impossible. After state $C_4$, the electronic device 2 is placed on the power supply base 12 again, thereby reaching state $C_5$. States $C_3$ and $C_5$ are the same as state $C_1$.

Figure 32:
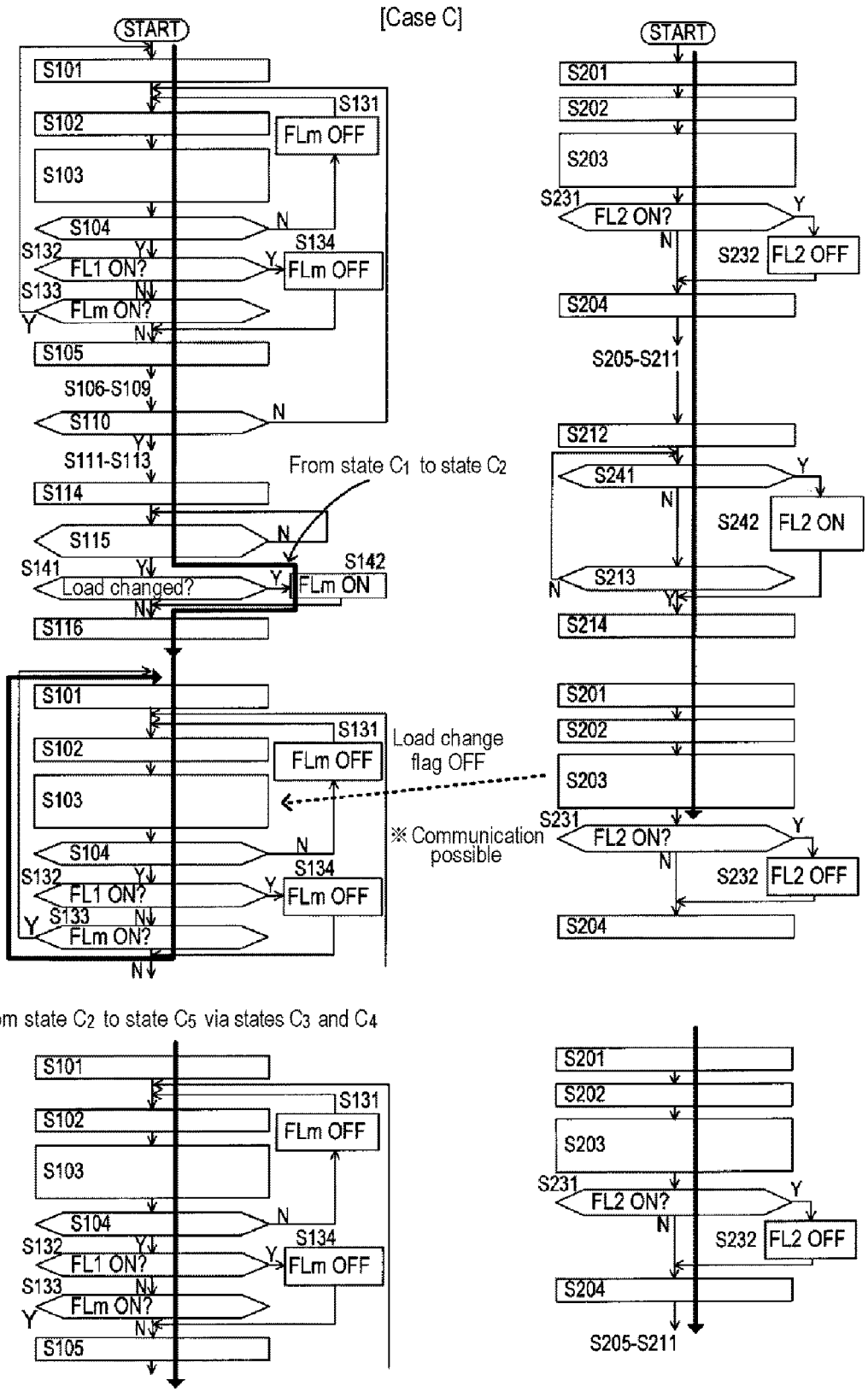
FIG. 32 is a view showing a flow of operations of a power supply device and an electronic device in case C according to the second embodiment of the present disclosure.

In FIG. 32, the flows of the operations of the power supply device 1 and the electronic device 2 in case C are indicated by thick solid lines with arrows on the left side and the right side, respectively. In case C, if state $C_1$ is shifted to state $C_2$ during the power transmission period, it is determined that there is a load change in the power supply device 1. The mFOD detection flag FLm is turned ON. The process returns to step S101 after the power transmission is stopped. At this time, NFC communication between the devices 1 and 2 is possible, the mFOD detection flag FLm is ON, and the load change flag signal included in the response signal 520 from the electronic device 2 indicates that the load change flag FL2 is OFF. Thus, the load change flag FL1 is turned OFF. Therefore, the loop process composed of steps S101, S102, S103, S104, S132 and S133 is repeated. Thereafter, the foreign object 3 is removed so that state $C_2$ is shifted to state $C_3$. However, the mFOD detection flag FLm is kept ON even in state $C_3$. Thus, the loop process described above is repeated.

After state $C_3$, if the electronic device 2 is removed from the power supply base 12 so as to reach state $C_4$ in which NFC communication between the devices 1 and 2 is impossible, it is determined in step S104 that there is no power transmission target. Thus, the mFOD detection flag FLm is turned OFF (step S131). Thereafter, if the electronic device 2 is placed on the power supply base 12 again so that state $C_4$ is shifted to state $C_5$, NFC communication between the devices 1 and 2 becomes possible in a state in which the mFOD detection flag FLm is OFF. Therefore, the power transmission is resumed by the power transmission operation and the power reception operation.

It can be said that state $C_2$ is an abnormal use state. After falling into such an abnormal state, it is necessary to prevent the power transmission from being resumed in a state in which the foreign object 3 remains halfway on the power supply base 12. Thus, from the viewpoint of failsafe, the resumption of power transmission is permitted after waiting for the return to an initial state in which nothing remains on the power supply base 12.

[Flow of Case D]

Figure 29D:
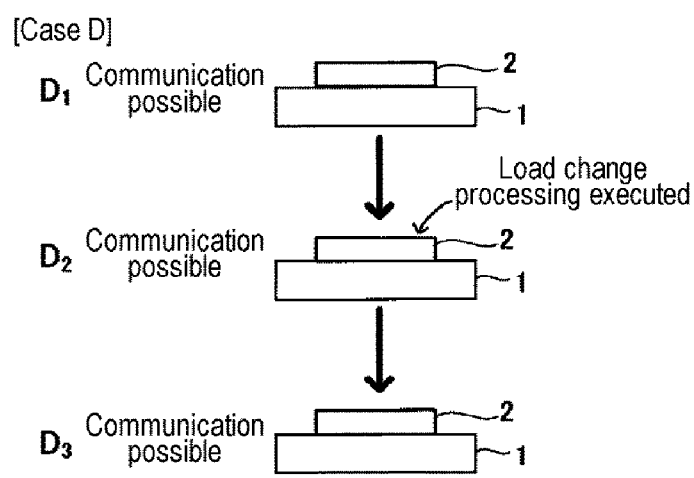

The flows of the operations of the power supply device 1 and the electronic device 2 in case D will be described with reference to FIGS. 29D and 33. FIG. 29D shows the state transitions of the power supply device 1 and the electronic device 2 in case D. In case D, the foreign object 3 is not present.

As shown in FIG. 29D, in case D, there is first obtained state $D_1$ which is the same as that of the normal case. In the state $D_1$, the electronic device 2 is placed on the power supply base 12 in the reference arrangement state (FIG. 1B). The foreign object 3 is not present. The load change processing is not performed in the electronic device 2. In case D, however, after state $D_1$, there is obtained state $D_2$ in which the load change processing is performed during the power transmission period. After completion of the load changing process, state $D_3$ is obtained. State $D_3$ is the same as state $D_1$.

Figure 33:
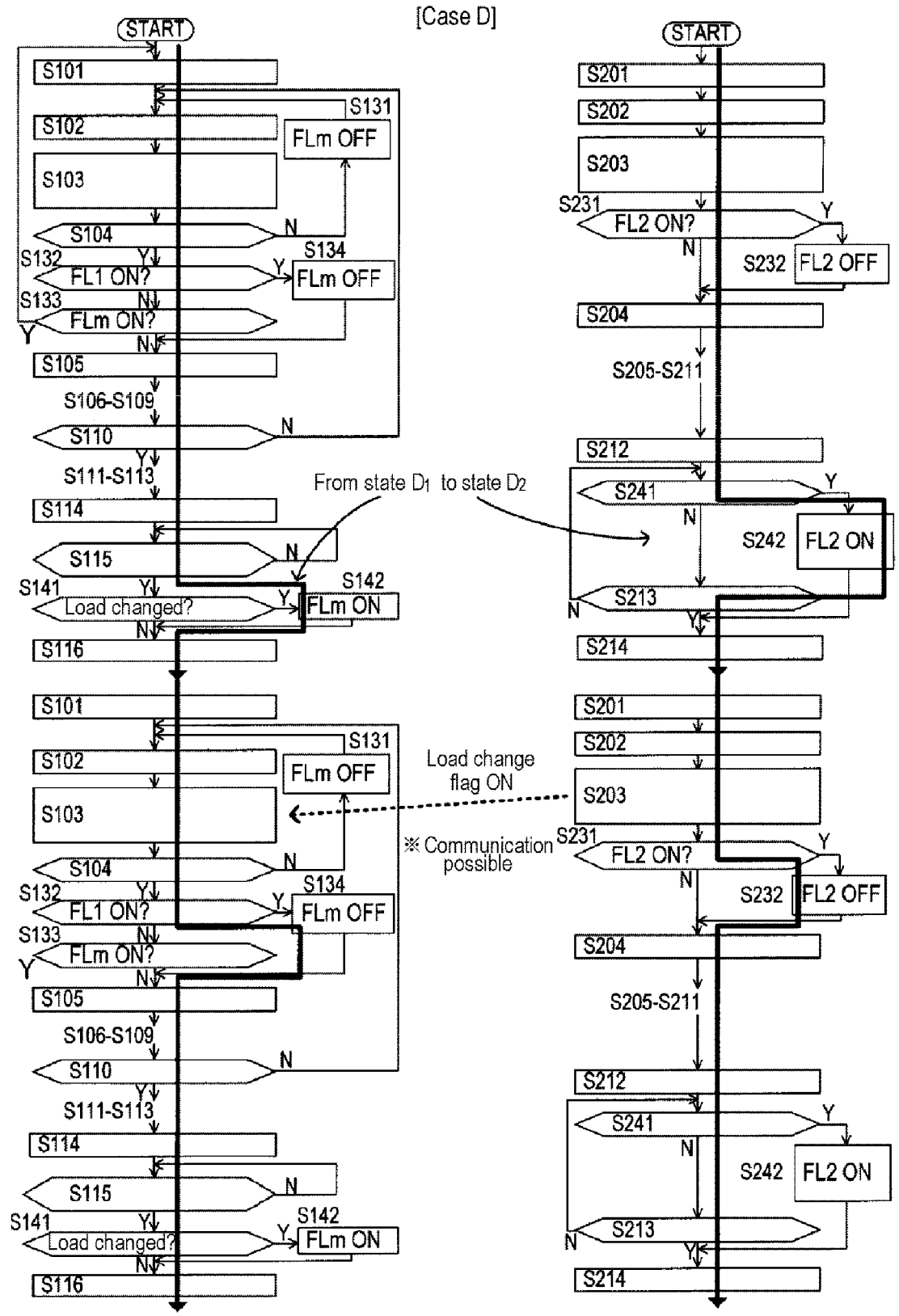
FIG. 33 is a view showing a flow of operations of a power supply device and an electronic device in case D according to the second embodiment of the present disclosure.

In FIG. 33, the flows of the operations of the power supply device 1 and the electronic device 2 in case D are indicated by heavy solid lines with arrows on the left side and the right side, respectively. In case D, if the load change processing is performed in the electronic device 2 during the power transmission period (namely, if state $D_1$ is shifted to state $D_2$), in the electronic device 2, the process returns to step S201 after the load change flag FL2 is set to ON. On the other hand, in the power supply device 1, it is determined that there is a load change. The mFOD detection flag FLm becomes ON. The process returns to step S101 after the power transmission is stopped.

The load change flag signal indicating that the load change flag FL2 is ON is included in the response signal 520 transmitted from the electronic device 2 in response to the inquiry signal 510 in step S101. Therefore, in the power supply device 1, the load change flag FL1 is also updated and set to ON, based on the response signal 520 (step S103). As a result, the process reaches step S105 via "Y" in step S132 and step S134. On the side of the electronic device 2, after transmitting the response signal 520, the process reaches step S204 via step S232. Therefore, it is possible to resume the power transmission by the power transmission operation and the power reception operation.

In case D, however, the following may apply as to whether or not to resume power transmission after reaching state $D_3$.

That is to say, for example, the power reception side control circuit 250 checks the state of the battery 21 during the power transmission period. When the battery 21 is in a fully charged state, the power reception side control circuit 250 performs the load change processing, whereby the power supply device 1 stops the power transmission operation. Thereafter, upon receiving the inquiry signal 510, the response signal 520 including a power transmission needlessness notification signal indicating that power transmission is unnecessary or a power transmission stop request signal for requesting that the power transmission be stopped can be transmitted to the power supply device 1. Upon receiving the response signal 520 including the power transmission needlessness notification signal or the power transmission stop request signal, the power transmission side control circuit 150 may not execute the processes of step S105 and subsequent steps. That is to say, the power transmission side control circuit 150 may not resume the power transmission operation.

Furthermore, for example, the power reception side control circuit 250 may check the state of the battery 21 during the power transmission period. When the battery 21 gets close to the fully charged state, the power reception side control circuit 250 may perform the load change processing in order to reduce the transmitted power. In this case, the power reception side control circuit 250 stops the power transmission operation in the power supply device 1 by performing the load changing process during the power transmission period. Thereafter, upon receiving the inquiry signal 510, the power reception side control circuit 250 may transmit to the power supply device 1 the response signal 520 including a transmitted power designation signal which requires that the transmitted power be reduced to a desired power. When receiving the response signal 520 including the transmitted power designation signal, the power transmission side control circuit 150 resumes the power transmission operation by executing the processes of step S105 and subsequent steps. In this case, the power transmission operation may be resumed after the magnitude of the power transmission AC voltage to be supplied to the resonance circuit TT during the power transmission operation is set to the magnitude based on the transmitted power designation signal. Although described above, the transmitted power designation signal is not limited to the one aimed at lowering the transmitted power. That is to say, the transmitted power designation signal may be a signal which requires that the transmission power be set to desired power.

Furthermore, when the abnormality detection circuit 265 detects an abnormality in the components (including the load circuit 280) of the electronic device 2 during the power transmission period, the power reception side control circuit 250 may perform the load change processing so that the power supply device 1 can stop the power transmission operation. Thereafter, upon receiving the inquiry signal 510, the power reception side control circuit 250 may transmit to the power supply device 1 the response signal 520 which includes a power transmission needlessness notification signal indicating that power transmission is unnecessary, a power transmission stop request signal requesting that the power transmission be stopped, or an abnormality occurrence notification signal indicating that a predetermined abnormality occurs in the electronic device 2 (for example, the load circuit 280). When receiving the response signal 520 including the power transmission needlessness notification signal, the power transmission stop request signal or the abnormality occurrence notification signal, the power transmission side control circuit 150 may not execute the processes of step S105 and the subsequent steps. That is to say, the power transmission side control circuit 150 may not resume the power transmission operation.

In addition, during the power transmission period, the power reception side control circuit 250 may perform the load change processing in order to transmit arbitrary transmission target information to the power supply device 1, and may cause the transmission target information to be included in the response signal 520 transmitted after the load change processing. When receiving the response signal 520 including the transmission target information, the power transmission side control circuit 150 may determine the resumption of the power transmission operation in consideration of the content of the transmission target information. In the case of resuming the power transmission operation, the power transmission side control circuit 150 may appropriately set the magnitude of the power transmission AC voltage.

[Distinguishing of Cases a to D]

Figure 34:
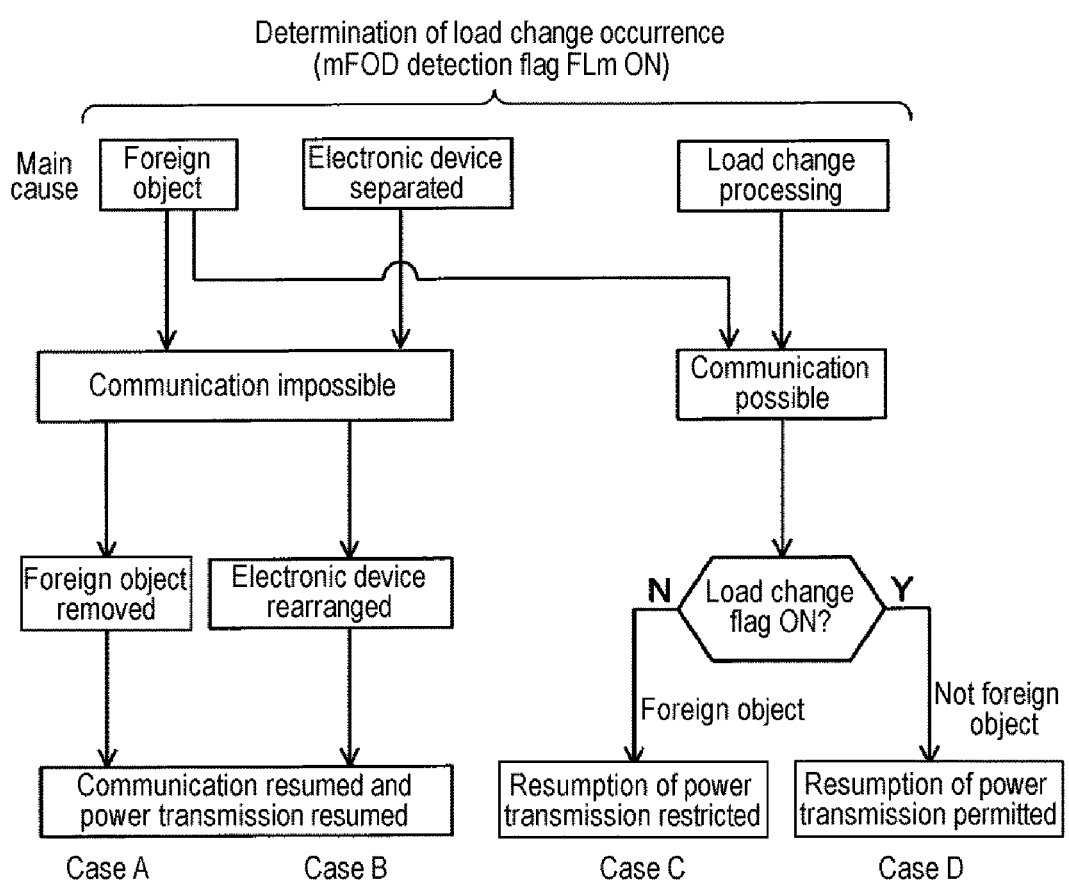
FIG. 34 is a view showing flows of states corresponding to cases A to D according to the second embodiment of the present disclosure.

FIG. 34 shows an outline of a method of distinguishing cases A to D. Main causes by which load change occurrence is determined in the mFOD processing and the mFOD detection flag FLm is set to ON include insertion of the foreign object 3, separation of the electronic device 2 from the power supply base 12, and load change processing performed by the electronic device 2.

When NFC communication between the devices 1 and 2 becomes impossible due to the insertion of the foreign object 3, the NFC communication can be made possible and the power transmission can be resumed by merely removing the foreign object 3 (case A). If the electronic device 2 is separated from the power supply base 12, the NFC communication becomes impossible. However, even in this case, the NFC communication can be made possible and the power transmission can be resumed by merely rearranging the electronic device 2 on the power supply base 12 (case B).

The NFC communication between the devices 1 and 2 may remain possible depending on the state of insertion of the foreign object 3. Even when load change occurrence is determined by the load change processing of the electronic device 2, the NFC communication between the devices 1 and 2 remains possible. Load change flags are used for distinguishing them. That is to say, after determining that there is a load change, if it is found that the load change flags (FL1 and FL2) are OFF, the power transmission side control circuit 150 determines that the main cause of determination of load change occurrence is the insertion of the foreign object 3, and restricts the resumption of power transmission (case C). On the other hand, if it is found that the load change flags (FL1 and FL2) are ON, the power transmission side control circuit 150 determines that the main cause of determination of load change occurrence is the load change processing of the electronic device 2, and permits the resumption of power transmission (case D). However, as described above, even if the main cause of determination of load change occurrence is the load change processing of the electronic device 2, the power transmission may not be resumed in the case where the power transmission needlessness notification signal or the like is received.

Figure 26:
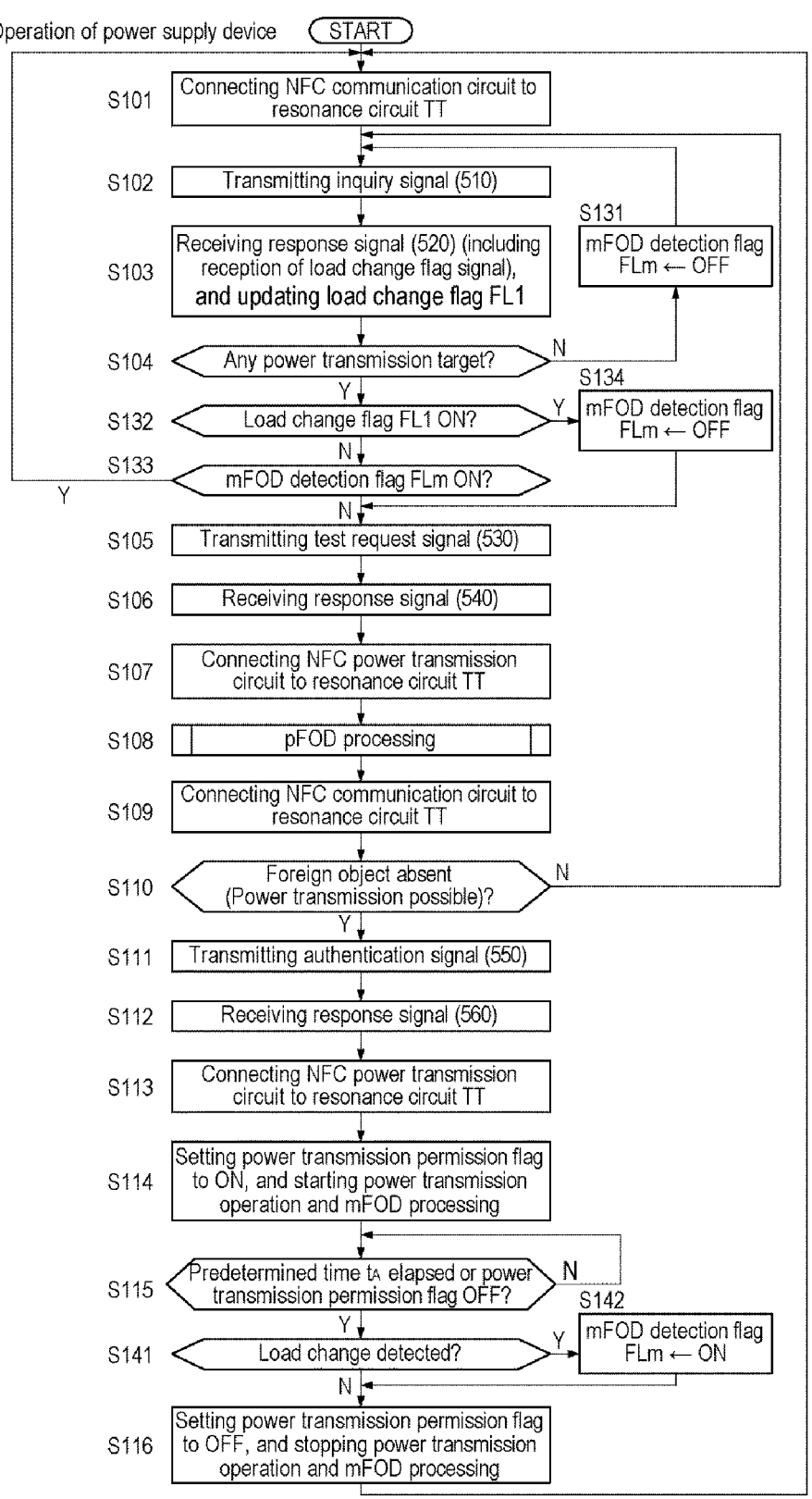
FIG. 26 is an operation flowchart of a power supply device according to the second embodiment of the present disclosure.
Figure 27:
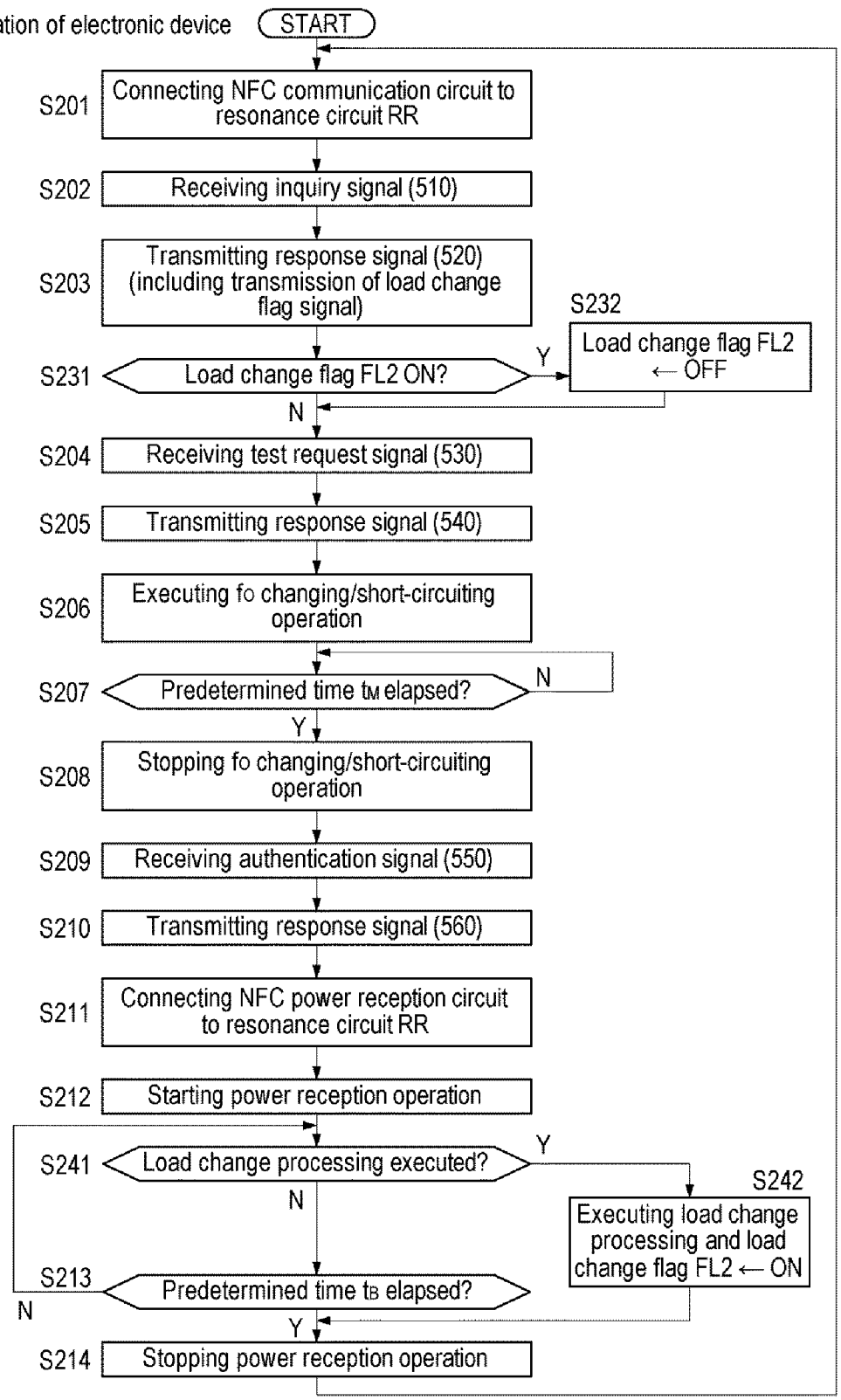
FIG. 27 is an operation flowchart of an electronic device according to the second embodiment of the present disclosure.

As described above, when the load change occurrence is determined based on a change in the current amplitude detection value $V_{mFOD}$ acquired from the load detection circuit 140 during the execution of the power transmission operation (step S54 of FIG. 20), the power transmission side control circuit 150 may execute power transmission stop processing for stopping the power transmission operation (steps S141, S142 and S116 of FIG. 26; the power transmission stop processing itself is realized in step S116). When the load change processing is executed on a side of the electronic device 2 during the power transmission period, the power reception side control circuit 250 transmits to the power supply device 1 a load change signal indicating that the load change processing has been executed by setting the load change flag FL2 to ON (i.e., a load change flag signal indicating that the load change flag FL2 is ON) (see FIGS. 29D and 33: realized by the transmission of the response signal 520 after state $D_2$ of case D). After executing the power transmission stop processing, the power transmission side control circuit 150 may control the resumption of the power transmission operation based on whether the load change signal has been received (by the branch of step S132). The power transmission side control circuit 150 may clearly distinguish whether the main cause of determination of load change occurrence (the main cause of the change in the current amplitude detection value $V_{mFOD}$ during the power transmission period) is the influence of the foreign object 3 or the load change processing of the electronic device 2, based on whether or not the load change signal has been received. Depending on the result of the aforementioned determination, the power transmission side control circuit 150 may properly control whether or not to resume the power transmission.

Specifically, for example, the power transmission side control circuit 150 executes the power transmission stop processing as the mFOD detection flag FLm is set to ON (steps S141, S142 and S116). Thereafter, when receiving the load change signal, the power transmission side control circuit 150 permits the resumption of the power transmission (the process proceeds to S105 via "Y" in S132 and S134). On the other hand, when not receiving the load change signal, the power transmission side control circuit 150 restricts (prohibits) the resumption of power transmission (the process proceeds to S101 via "N" in S132 and "Y" in S133). However, even if the load change signal is received after execution of the power transmission stop processing, the resumption of the power transmission may be restricted when a predetermined signal is received from the electronic device 2. As used herein, the term "predetermined signal" includes at least one of, for example, a power transmission needlessness notification signal, a power transmission stop request signal and an abnormality occurrence notification signal.

In addition, the power transmission side control circuit 150 keeps the mFOD detection flag FLm in an ON state (a set state) when the power transmission stop processing is executed by determining if there is a change in load based on the change in the current amplitude detection value $V_{mFOD}$ (step S142). When the flag FLm is ON, the power transmission side control circuit 150 restricts (prohibits) the resumption of the power transmission. When a change in load is detected, there is a possibility that the foreign object 3 is present on the power supply base 12. However, by setting the flag FLm to ON in response to a determination of a change in load and keeping this state, it is possible to prevent resumption of power transmission despite the presence of the foreign object 3.

However, after executing the power transmission stop processing as the mFOD detection flag FLm is set to ON, if NFC communication between the devices 1 and 2 is possible and if the load change signal is received ("Y" in step S104 and "Y" in step S132), the power transmission side control circuit 150 determines that the determination of a change in load change is caused by the load change processing of the electronic device 2, and permits the resumption of the power transmission while setting the flag FLm to OFF (step S134, step S105 and the subsequent steps). On the other hand, after executing the power transmission stop processing as the mFOD detection flag FLm is set to ON, if NFC communication between the devices 1 and 2 is possible and if the load change signal is not received ("Y" in step S104 and "N" in step S132), the power transmission side control circuit 150 determines that the determination of a load change is caused by the influence of the foreign object 3, and restricts the resumption of the power transmission while keeping the flag FLm in an ON state (the process returns to step S101 via "Y" in step S133). However, thereafter, the flag FLm is set to OFF (reset state) on condition that it is confirmed that NFC communication between the devices 1 and 2 is impossible (the process proceeds to S131 via S104). Thereafter, when it is confirmed that NFC communication between the devices 1 and 2 is possible ("Y" in step S104), the flag FLm is set to OFF. Thus, the resumption of the power transmission is permitted (the process proceeds to step S105 via "N" in step S133).

In the first and second embodiments described above, one power transmission side resonance circuit TT is shared by the communication circuit 120 and the power transmission circuit 130 using time division. However, two power transmission side resonance circuits TT may be provided in the power supply device 1 using the method described in the related art. One of the power transmission side resonance circuits TT may be used as a dedicated resonance circuit for the communication circuit 120, and the other power transmission side resonance circuit TT may be used as a dedicated resonance circuit for the power transmission circuit 130. Similarly, in the first and second embodiments described above, one power reception side resonance circuit RR is shared by the communication circuit 220 and the power reception circuit 230 using time division. However, two power reception side resonance circuits RR may be provided in the electronic device 2 using the method disclosed in the related art. One of the power reception side resonance circuits RR may be used as a dedicated resonance circuit for the communication circuit 220, and the other power reception side resonance circuit RR may be used as a dedicated resonance circuit for the power reception circuit 230. In this case, as disclosed in the related art, the number of the power transmission side resonance circuits TT provided in the power supply device 1 and the number of the power reception side resonance circuits RR provided in the electronic device 2 may be two, respectively. The number of the former may be one and the number of the latter may be two, or vice versa.

In addition, the number of the power transmission side resonance circuits TT connectable to the power transmission circuit 130 may be two or more.

Consideration of the Present Disclosure

The present disclosure specified in the above-described embodiments will now be considered.

A non-contact power supply system $W_1$ according to an aspect of the present disclosure, includes a power transmission device including a power transmission side resonance circuit (TT) having a power transmission side coil ($T_L$) for transmitting electric power; and a power reception device including a power reception side resonance circuit (RR) having a power reception side coil ($R_L$) for receiving the electric power, the non-contact power supply system capable of transmitting and receiving the electric power by a magnetic field resonance method and formed so that communication is possible between the power transmission device and the power reception device, wherein the power transmission device includes a power transmission circuit (130) capable of supplying an AC voltage to the power transmission side resonance circuit, a detection circuit (140) configured to detect an amplitude of a current flowing through the power transmission side coil, and a control circuit (150) configured to perform power transmission control of the electric power by controlling the power transmission circuit, the control circuit is capable of, when power transmission of the electric power is being performed, executing power transmission stop processing (S116) for stopping the power transmission based on a change in an amplitude detection value ($V_{mFOD}$) of the detection circuit, the power reception device is capable of, when the power transmission of the electric power is being performed, executing load change processing for changing a magnitude of a load of the power reception device as viewed from the power transmission device so as to change the amplitude and is configured to, when the load change processing is executed, transmit a load change signal indicating that the load change processing has been executed (a load change flag signal indicating that a load change flag FL2 is ON), to the power transmission device by communication, and the control circuit is configured to, after executing the power transmission stop processing, control resumption of the power transmission based on whether or not the load change signal has been received.

As a result, the control circuit of the power transmission device can clearly distinguish whether the main cause of an amplitude change is the influence of a foreign object or the load change processing of the power reception device, based on whether or not the load change signal has been received. According to the aforementioned result, it is possible to appropriately control whether or not to resume the power transmission. In other words, it is possible to prevent breakage or the like of the foreign object while appropriately coping with various situations.

Furthermore, a power transmission device $W_2$ according to an aspect of the present disclosure capable of transmitting electric power to a power reception device by a magnetic field resonance method and formed so that communication is possible between the power transmission device and the power reception device, includes a power transmission side resonance circuit (TT) including a power transmission side coil ($T_L$) for transmitting the electric power; a power transmission circuit (130) capable of supplying an AC voltage to the power transmission side resonance circuit; a detection circuit (140) configured to detect an amplitude of a current flowing through the power transmission side coil; and a control circuit (150) configured to perform power transmission control of the electric power by controlling the power transmission circuit, wherein the control circuit is capable of, when power transmission of the electric power is being performed, executing power transmission stop processing (S116) for stopping the power transmission based on a change in an amplitude detection value ($V_{mFOD}$) of the detection circuit and is configured to control resumption of the power transmission after execution of the power transmission stop processing, based on whether a load change signal indicating that the load change processing for causing the change in the amplitude and for changing a magnitude of a load of the power reception device as viewed from the power transmission device has been executed by the power reception device (a load change flag signal indicating that a load change flag FL2 is ON) is received from the power reception device.

Specifically, for example, in the non-contact power supply system $W_1$ or the power transmission device $W_2$, after execution of the power transmission stop processing (steps S141, S142 and S116), the control circuit may permit the resumption of the power transmission when the load change signal is received, and may restrict the resumption of the power transmission when the load change signal is not received (the process returns to step S101 via "N" in step S132 and "Y" in step S133).

As a result, it is possible to prevent a possibly present foreign object from being damaged due to the resumption of the power transmission.

However, for example, in the non-contact power supply system $W_1$ or the power transmission device $W_2$, even when receiving the load change signal after execution of the power transmission stop processing, the control circuit may restrict the resumption of the power transmission if a predetermined signal is received from the power reception device through communication.

In the case where the power reception device is requesting to stop the power transmission or the like with a predetermined signal, it is appropriate not to resume the power transmission.

More specifically, for example, in the non-contact power supply system $W_1$ or the power transmission device $W_2$, when the power transmission is being performed, the control circuit may distinguish between a case where the amplitude is changed due to the influence of a foreign object different from the power reception device (a foreign object different from the power reception device and generating a current based on a magnetic field generated in the power transmission side coil) and a case where the amplitude is changed due to the load change processing executed by the power reception device, based on whether or not the load change signal is received.

More specifically, for example, in the non-contact power supply system $W_1$ or the power transmission device $W_2$, the control circuit may keep the amplitude detection value after a lapse of a predetermined time from the start of the power transmission as a reference value and then may control execution/non-execution of the power transmission stop processing by comparing the amplitude detection value obtained during the power transmission with the reference value.

This makes it possible to stop the power transmission when the foreign object enters a power transmission region or when the load change processing is executed by the power reception device, in a state in which the power transmission is being performed.

More specifically, for example, in the non-contact power supply system $W_1$ or the power transmission device $W_2$, the control circuit may execute the power transmission stop processing when a difference between the amplitude detection value obtained during the power transmission and the reference value is equal to or larger than a predetermined threshold value.

More specifically, for example, in the non-contact power supply system $W_1$ or the power transmission device $W_2$, in the power reception device, the electric power received by the power reception side resonance circuit may be supplied to subsequent circuits (including the load circuit 280) via a pair of power lines, and in the load change processing, the power reception device may realize the change in the magnitude of the load of the power reception device as viewed from the power transmission device, by reducing or increasing the impedance between the pair of power lines as viewed from the power reception side resonance circuit (see the first and second load changing methods).

Alternatively, for example, in the non-contact power supply system $W_1$ or the power transmission device $W_2$, in the load change processing, the power reception device may realize the change in the magnitude of the load of the power reception device as viewed from the power transmission device, by changing the resonance frequency of the power reception side resonance circuit from the reference frequency which is the resonance frequency at the time of power reception, or by short-circuiting the power reception side coil which forms the power reception side resonance circuit (see the third and fourth load changing methods).

Furthermore, for example, in the non-contact power supply system $W_1$ or the power transmission device $W_2$, the control circuit may keep a predetermined flag (mFOD detection flag) in a set state (ON) when executing the power transmission stop processing based on a change in the amplitude detection value of the detection circuit and may restrict the resumption of the power transmission when the flag is in the set state.

When the power transmission stop processing is executed, there is a possibility that the foreign object is present in the power transmission region. At this time, the flag is kept in the set state. By restricting the resumption of the power transmission when the flag is in the set state, it is possible to suppress occurrence of such a situation that the power transmission is resumed despite the presence of the foreign object.

More specifically, for example, in the non-contact power supply system $W_1$ or the power transmission device $W_2$, after executing the power transmission stop processing, the control circuit may set the flag to a reset state (OFF) to permit the resumption of the power transmission (corresponding to state $D_3$ of case D) when communication with the power reception device is possible and the load change signal is received ("Y" in step S104 and "Y" in step S132), and may maintain the set state of the flag to restrict the resumption of the power transmission (corresponding to states $C_2$ and $C_3$ of case C) when the communication with the power reception device is possible and the load change signal is not received ("Y" in step S104 and "N" in step S132).

More specifically, for example, in the non-contact power supply system $W_1$ or the power transmission device $W_2$, after executing the power transmission stop processing, the control circuit may maintain the set state of the flag to restrict the resumption of the power transmission when the communication with the power reception device is possible and the load change signal is not received, then may set the flag to the reset state when the communication with the power reception device becomes impossible (to S131 via "N" in S104; corresponding to state $C_4$ of case C), and then may permit the resumption of the power transmission when the communication with the power reception device becomes possible (to step S105 via "N" in step S133; corresponding to state $C_5$ of case C).

More specifically, for example, in the non-contact power supply system $W_1$ or the power transmission device $W_2$, when executing the power transmission stop processing based on the change in the amplitude detection value of the detection circuit, the control circuit may keep a predetermined flag in a set state, then may set the flag to a reset state when communication with the power reception device is impossible, and then may permit the resumption of the power transmission when the communication with the power reception device becomes possible (corresponding to cases A and B).

The power supply device 1 per se in each of the above-described embodiments may function as the power transmission device according to the present disclosure, or a part of the power supply device 1 in each of the above-described embodiments may function as the power transmission device according to the present disclosure. Similarly, the electronic device 2 per se in each of the above-described embodiments may function as the power reception device according to the present disclosure, and a part of the electronic device 2 in each of the above-described embodiments may function as the power reception device according to the present disclosure.

Modifications

The embodiments of the present disclosure may be variously modified as appropriate within the scope of the technical idea disclosed in the claims. The above-described embodiments are nothing more than examples of the embodiments of the present disclosure. The meanings of the terms of the respective components of the present disclosure are not limited to those described in the above embodiments. The specific numerical values shown in the above description are merely examples. As a matter of course, they may be changed to various numerical values. Supplementary notes 1 to 3 are described below as annotation items applicable to the above-described embodiments. The contents described in the respective supplementary notes may be arbitrarily combined as long as there is no inconsistency.

[Supplementary Note 1]

In the embodiments described above, the frequencies and resonance frequencies of various signals are set to 13.56 MHz as the reference frequency. However, 13.56 MHz is a target setting value. These frequencies in actual devices may include errors.

[Supplementary Note 2]

Since the present disclosure is embodied in accordance with the NFC standard, it has been described that the reference frequency is 13.56 MHz. However, the reference frequency may be other than 13.56 MHz. In this regard, the communication and the power transmission between the power supply device and the electronic device, to which the present disclosure is applied, may be the communication and the power transmission according to standards other than NFC.

Even in the case where the reference frequency of the non-contact power supply system according to the present disclosure is set to a frequency (for example, 6.78 MHz) other than 13.56 MHz and the resonance frequency of the resonance circuit JJ in the foreign object 3 formed as a non-contact IC card is 13.56 MHz, when the foreign object 3 is placed on the power supply base 12, a corresponding amount of change is seen in the voltage value $V_D$ in the pFOD processing or the mFOD processing. Therefore, even in such a case, the foreign object 3 can be detected or the determination of load change occurrence can be made by the above-described method.

[Supplementary Note 3]

The target device which is the power reception device or the power transmission device according to the present disclosure may be configured by hardware such as an integrated circuit or the like, or a combination of hardware and software. An arbitrary specific function which is all or a part of the functions realized by the target device may be described as a program. The program may be stored in a flash memory that can be installed in the target device. Then, by executing the program on a program execution device (for example, a microcomputer mountable on the target device), the specific function may be realized. The program may be stored and fixed in an arbitrary recording medium. The recording medium for storing and fixing the program may be mounted on or connected to a device (a server device or the like) differing from the target device.

According to the present disclosure in some embodiments, it is possible to provide a non-contact power supply system and a power transmission device which appropriately cope with various situations and contribute to prevention of breakage or the like of a foreign object.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A non-contact power supply system, comprising:
a power transmission device including a first resonance circuit having a first coil for transmitting electric power; and
a power reception device including a second resonance circuit having a second coil for receiving the electric power,
wherein the non-contact power supply system is configured to transmit and receive the electric power by a magnetic field resonance method, and to communicate between the power transmission device and the power reception device,
wherein the power transmission device includes:
a power transmission circuit for supplying an AC voltage to the first resonance circuit;
a detection circuit configured to detect an amplitude of a current flowing through the first coil; and
a control circuit configured to control the power transmission circuit to perform power transmission control of the electric power,
wherein the control circuit is operable such that, when power transmission of the electric power is performed, power transmission stop processing is executed for stopping the power transmission based on a change in an amplitude detection value of the detection circuit,
wherein the power reception device includes a load change processing circuit that is operable such that, when the power transmission of the electric power is performed, load change processing is executed for changing a magnitude of a load of the power reception device, which is viewed from the power transmission device, so as to change the amplitude of the current, and
wherein the control circuit is configured such that, after executing the power transmission stop processing based on the change in the amplitude detection value detected by the detection circuit, the control circuit
allows resumption of the power transmission if the load change processing circuit executes the load change processing, and
restricts the resumption of the power transmission if the load change processing circuit does not execute the load change processing.

2. The non-contact power supply system of claim 1, wherein the power transmission device includes a first memory, and is configured to be operable to store an amplitude change signal indicating the change in the amplitude detection value in the first memory,
wherein the power reception device includes a second memory, and is configured to store a load change signal indicating the execution of the load change processing for changing the magnitude of the load during the power transmission in the second memory,
wherein the power reception device is configured to perform communication to transmit the load change signal to the first memory after the power transmission stop processing is executed,
wherein the control circuit is configured to control the resumption of the power transmission based on information in the first memory, and is configured to, if the amplitude change signal is present:
allow the resumption of the power transmission, when the load change signal is present; and
restrict the resumption of the power transmission, when the load change signal is not present.

3. The system of claim 2, wherein after execution of the power transmission stop processing, the control circuit allows the resumption of the power transmission when the load change signal is received, and restricts the resumption of the power transmission when the load change signal is not received.

4. The system of claim 3, wherein in a state where the load change signal is received after the execution of the power transmission stop processing, the control circuit restricts the resumption of the power transmission if a predetermined signal is received from the power reception device through communication.

5. The system of claim 2, wherein when the power transmission is performed, the control circuit distinguishes between, based on whether or not the load change signal is received, a case where the amplitude is changed due to an influence of a foreign object different from the power reception device and a case where the amplitude is changed due to the load change processing executed by the power reception device.

6. The system of claim 2, wherein the control circuit sets the amplitude detection value after a lapse of a predetermined time from a start of the power transmission as a reference value, and controls whether to execute the power transmission stop processing by comparing the amplitude detection value obtained during the power transmission with the reference value.

7. The system of claim 2, wherein in the power reception device, the electric power received by the second resonance circuit is supplied to one or more subsequent circuits via a pair of power lines, and wherein in the load change processing, the power reception device causes the change in the magnitude of the load of the power reception device, which is viewed from the power transmission device, by reducing or increasing an impedance between the pair of power lines as viewed from the second resonance circuit.

8. The system of claim 2, wherein in the load change processing, the power reception device causes the change in the magnitude of the load of the power reception device, which is viewed from the power transmission device, by changing a resonance frequency of the second resonance circuit from a reference frequency that is a resonance frequency set for receiving the electric power, or by short-circuiting the second coil in the second resonance circuit.

9. The system of claim 2, wherein the control circuit keeps a predetermined flag in a set state when the power transmission stop processing is executed based on the change in the amplitude detection value of the detection circuit, and restricts the resumption of the power transmission when the flag is in the set state.

10. The system of claim 9, wherein after executing the power transmission stop processing, the control circuit sets the flag to a reset state to allow the resumption of the power transmission when communication with the power reception device is operable and the load change signal is received, and keeps the set state of the flag to restrict the resumption of the power transmission when the communication with the power reception device is operable and the load change signal is not received.

11. The system of claim 10, wherein after keeping the set state of the flag to restrict the resumption of the power transmission, the control circuit sets the flag to the reset state when the communication with the power reception device is not operable, and then allows the resumption of the power transmission when the communication with the power reception device becomes operable.

12. The system of claim 9, wherein after keeping the predetermined flag in the set state, the control circuit sets the flag to a reset state when communication with the power reception device is not operable, and then allows the resumption of the power transmission when the communication with the power reception device becomes operable.

13. A non-contact power supply system, comprising:
a power transmission device including a first resonance circuit having a first coil for transmitting electric power; and
a power reception device including a second resonance circuit having a second coil for receiving the electric power,
wherein the non-contact power supply system is configured to transmit and receive the electric power by a magnetic field resonance method, and to communicate between the power transmission device and the power reception device,
wherein the power transmission device includes:
a power transmission circuit for supplying an AC voltage to the first resonance circuit;
a detection circuit configured to detect an amplitude of a current flowing through the first coil; and a control circuit configured to control the power transmission circuit to perform power transmission control of the electric power, wherein the control circuit is operable such that, when power transmission of the electric power is performed, power transmission stop processing is executed for stopping the power transmission based on a change in an amplitude detection value of the detection circuit, wherein the power reception device is operable such that, when the power transmission of the electric power is performed, load change processing is executed for changing a magnitude of a load of the power reception device, which is viewed from the power transmission device, so as to change the amplitude of the current, and is configured to, when the load change processing is executed, perform communication to transmit a load change signal indicating that the load change processing is executed to the power transmission device, wherein the control circuit is configured to, after executing the power transmission stop processing, control resumption of the power transmission based on whether or not the load change signal is received, wherein the control circuit sets the amplitude detection value after a lapse of a predetermined time from a start of the power transmission as a reference value, and controls whether to execute the power transmission stop processing by comparing the amplitude detection value obtained during the power transmission with the reference value, and wherein the control circuit executes the power transmission stop processing when a difference between the amplitude detection value obtained during the power transmission and the reference value is equal to or greater than a predetermined threshold value.

14. A power transmission device for transmitting electric power to a power reception device, which includes a load change processing circuit operable to execute load change processing for changing a magnitude of a load of the power reception device that is viewed from the power transmission device, by a magnetic field resonance method and communicating with the power reception device, comprising:

a first resonance circuit including a first coil for transmitting the electric power;

a power transmission circuit for supplying an AC voltage to the first resonance circuit;

a detection circuit configured to detect an amplitude of a current flowing through the first coil; and a control circuit configured to control the power transmission circuit to perform power transmission control of the electric power, wherein the control circuit is operable such that, when power transmission of the electric power is performed, power transmission stop processing is executed for stopping the power transmission based on a change in an amplitude detection value of the detection circuit, and wherein the control circuit is configured such that, after executing the power transmission stop processing based on the change in the amplitude detection value detected by the detection circuit, the control circuit
allows resumption of the power transmission if the load change processing circuit executes the load change processing; and
restricts the resumption of the power transmission if the load change processing circuit does not execute the load change processing.

15. The power transmission device of claim 14, further comprising a first memory, wherein the power transmission device is configured to be operable to store an amplitude change signal indicating the change in the amplitude detection value and a load change signal indicating execution of the load change processing in the first memory, wherein the control circuit is configured to control the resumption of the power transmission based on information in the first memory, and configured to, if the amplitude change signal is present:
allow the resumption of the power transmission if the load change signal is present; and
restrict the resumption of the power transmission if the load change signal is not present.

16. A power reception device configured to be operable to receive electric power from a power transmission device that transmits the electric power by a magnetic field resonance method and communicating with the power transmission device, the power reception device comprising a memory for receiving the electric power, wherein the power transmission device is configured to be operable to execute load change processing for changing a magnitude of a load of the power reception device, which is viewed from the power transmission device, during power transmission, and storing a load change signal indicating the execution of the load change processing in the memory, and wherein the power reception device is configured to, after the power transmission from the power transmission device is stopped, perform communication to transmit the load change signal to the power transmission device based on the change of the magnitude of the load.

* * * * *